(12) United States Patent
McClanahan et al.

(10) Patent No.: US 9,222,698 B2
(45) Date of Patent: Dec. 29, 2015

(54) HEATER FOR VAPORIZING LIQUIDS

(71) Applicant: Gaumer Company, Inc., Houston, TX (US)

(72) Inventors: Jack L. McClanahan, Montgomery, TX (US); Craig S. Tiras, Houston, TX (US)

(73) Assignee: Gaumer Company, Inc., Houston, TX (US)

( * ) Notice: Subject to any disclaimer, the term of this patent is extended or adjusted under 35 U.S.C. 154(b) by 72 days.

(21) Appl. No.: 14/252,965

(22) Filed: Apr. 15, 2014

(65) Prior Publication Data

US 2014/0219644 A1 Aug. 7, 2014

Related U.S. Application Data

(63) Continuation of application No. 13/217,807, filed on Aug. 25, 2011, now Pat. No. 8,728,219, which is a continuation-in-part of application No. 12/584,610, filed on Sep. 9, 2009, now Pat. No. 8,391,696, and a continuation-in-part of application No. 12/584,626, filed on Sep. 9, 2009, now Pat. No. 8,521,014, and a continuation-in-part of application No. 12/584,640, filed on Sep. 9, 2009, now Pat. No. 8,295,692, which is a continuation-in-part of application No. 12/399,811, filed on Mar. 6, 2009, now Pat. No. 8,103,156, which is a continuation-in-part of application No. 12/029,957, filed on Feb. 12, 2008, now abandoned.

(60) Provisional application No. 60/889,324, filed on Feb. 12, 2007.

(51) Int. Cl.

| F24H 6/00 | (2006.01) |
|---|---|
| B01D 3/02 | (2006.01) |
| B01D 3/14 | (2006.01) |
| B01D 1/00 | (2006.01) |
| B01D 19/00 | (2006.01) |
| F02M 21/06 | (2006.01) |
| F28F 9/22 | (2006.01) |
| F28F 13/06 | (2006.01) |
| F24H 1/10 | (2006.01) |

(52) U.S. Cl.
CPC ............... *F24H 6/00* (2013.01); *B01D 1/0011* (2013.01); *B01D 1/0023* (2013.01); *B01D 1/0076* (2013.01); *B01D 3/02* (2013.01); *B01D 3/143* (2013.01); *B01D 19/0063* (2013.01); *F02M 21/06* (2013.01); *F24H 1/103* (2013.01); *F28F 9/22* (2013.01); *F28F 13/06* (2013.01); *F28F 2009/228* (2013.01); *Y02T 10/32* (2013.01)

(58) Field of Classification Search
CPC .. B01D 1/0011; B01D 1/0017; B01D 1/0023; B01D 1/0064; B01D 1/0076; B01D 1/0082; B01D 1/04; B01D 1/30; B01D 1/305; B01D 3/02; B01D 3/04; B01D 3/14; B01D 3/143; B01D 3/146; B01D 3/148; B01D 19/0036; B01D 19/0063; B01D 19/0084; F24H 1/101; F24H 1/102; F24H 1/103; F24H 6/00; B01B 1/005; C02F 1/04; C02F 1/043
See application file for complete search history.

(56) References Cited

U.S. PATENT DOCUMENTS

| 1,098,573 A | 6/1914 | Hauser |
| 3,074,216 A * | 1/1963 | Loebel ............................ 96/190 |

(Continued)

*Primary Examiner* — Robert Clemente
(74) *Attorney, Agent, or Firm* — Bracewell & Giuliani LLP

(57) ABSTRACT

A method of heating fluids that includes heating liquids within a lower portion of a vessel, using first immersion heaters and heating a gas within an upper portion of the vessel using second immersion heaters. Liquid levels in the lower portion of the vessel are controlled. Heating the gas includes heating gas within the upper portion of the common vessel within another vessel positioned within the upper portion of the common vessel.

18 Claims, 34 Drawing Sheets

(56) References Cited

U.S. PATENT DOCUMENTS

| | | | |
|---|---|---|---|
| 3,248,305 A | * | 4/1966 | Williamson .................. 202/180 |
| 3,712,073 A | * | 1/1973 | Arenson ........................ 62/50.2 |
| 3,726,713 A | | 4/1973 | Hawk et al. |
| 3,871,734 A | | 3/1975 | Murtland |
| 4,163,371 A | | 8/1979 | Groninger |
| 4,781,607 A | | 11/1988 | Rumbaugh |
| 4,877,489 A | * | 10/1989 | Lloyd .......................... 202/181 |
| 4,895,528 A | | 1/1990 | Choiniere et al. |
| 5,070,940 A | | 12/1991 | Conner et al. |
| 5,216,743 A | | 6/1993 | Seitz |
| 5,396,574 A | | 3/1995 | Base et al. |
| 5,483,040 A | | 1/1996 | Fortune |
| 5,577,925 A | | 11/1996 | Schnatzmeyer et al. |
| 5,590,240 A | | 12/1996 | Rezabek |
| 5,923,819 A | * | 7/1999 | Ross et al. .................... 392/441 |
| 6,145,597 A | | 11/2000 | Kobylinski |
| 6,364,933 B1 | | 4/2002 | Heath |
| 6,551,379 B2 | | 4/2003 | Heath |
| 6,592,641 B2 | | 7/2003 | Alvin et al. |
| 6,816,669 B2 | | 11/2004 | Zimmer et al. |
| 6,972,841 B2 | | 12/2005 | Krempl et al. |
| 6,994,589 B2 | | 2/2006 | Schliese |
| 7,145,114 B2 | | 12/2006 | Wakamatu et al. |
| 7,164,851 B2 | | 1/2007 | Sturm et al. |
| 7,204,724 B2 | | 4/2007 | Holtze |
| 7,318,735 B2 | | 1/2008 | Fannin et al. |
| 7,372,007 B1 | | 5/2008 | McClanahan et al. |
| 7,442,239 B2 | | 10/2008 | Armstrong et al. |
| 7,554,064 B1 | | 6/2009 | Fannin et al. |
| 7,616,873 B1 | | 11/2009 | Seitz |
| 2009/0217581 A1 | | 9/2009 | McClanahan et al. |
| 2010/0050518 A1 | | 3/2010 | McClanahan et al. |
| 2010/0058761 A1 | | 3/2010 | McClanahan et al. |
| 2010/0059121 A1 | | 3/2010 | McClanahan et al. |
| 2010/0061710 A1 | | 3/2010 | McClanahan et al. |
| 2010/0170210 A1 | | 7/2010 | McClanahan et al. |
| 2011/0116777 A1 | | 5/2011 | Tiras |
| 2011/0139765 A1 | | 6/2011 | McClanahan et al. |
| 2011/0168691 A1 | | 7/2011 | McClanahan et al. |

\* cited by examiner

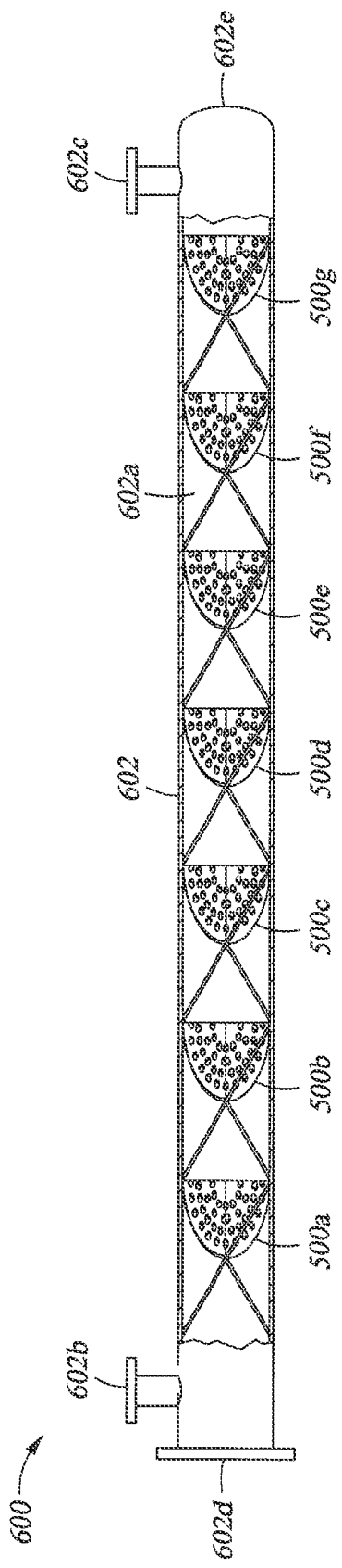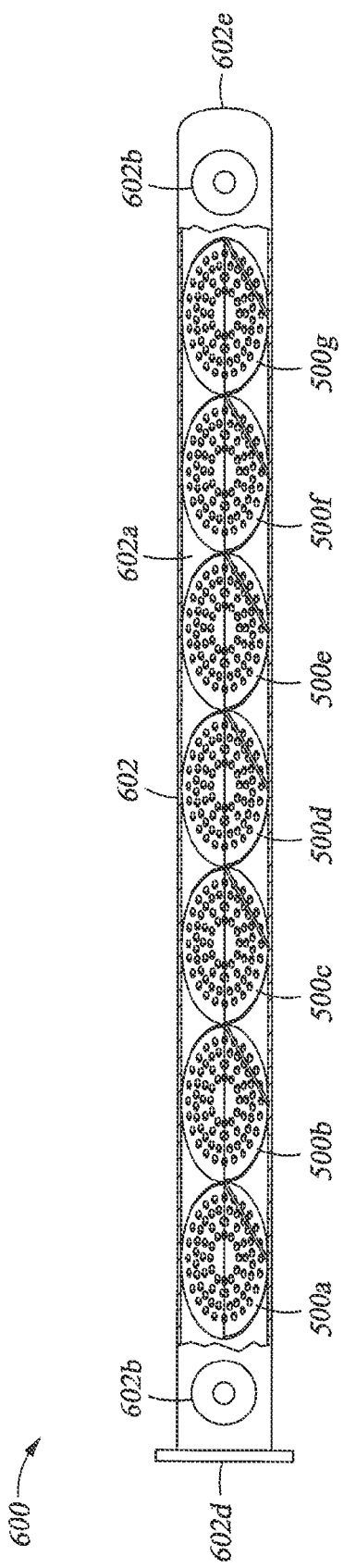

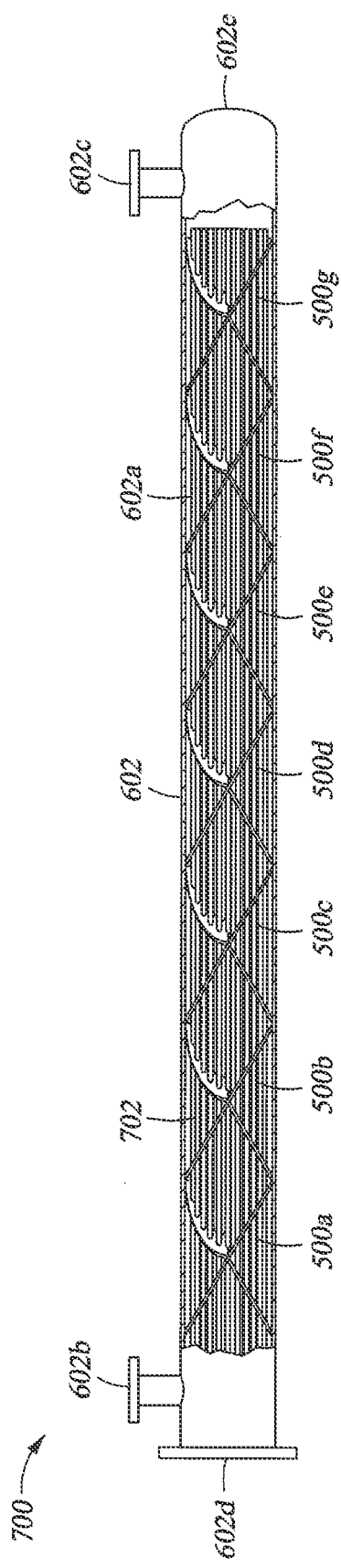
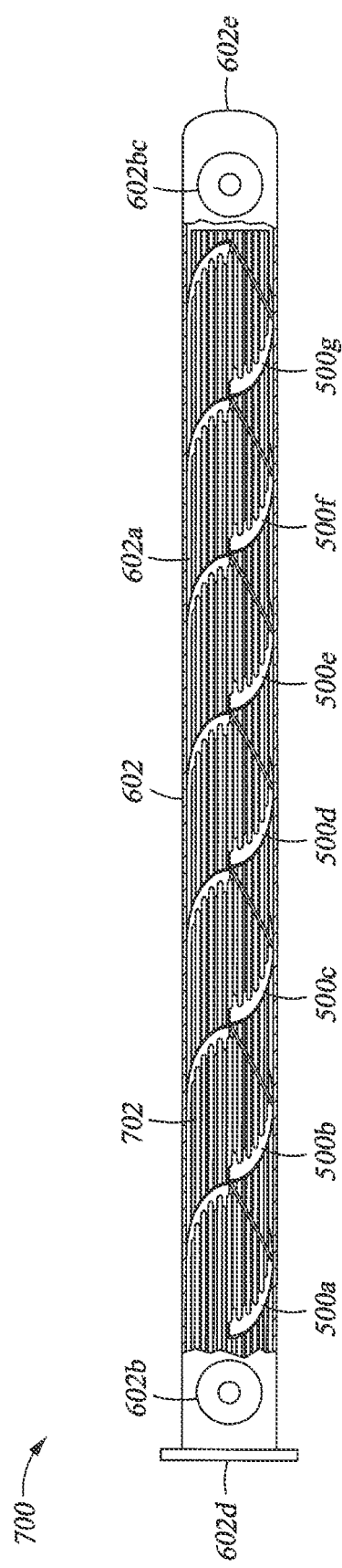
Fig. 17
Fig. 18

HEATER FOR VAPORIZING LIQUIDS

CROSS-REFERENCE TO RELATED APPLICATIONS

This application is a continuation of U.S. utility patent application Ser. No. 13/217,807, filed Aug. 25, 2011, which was a continuation in part of U.S. utility patent application Ser. Nos. 12/584,610, 12/584,626 and 12/584,640, respectively, filed on Sep. 9, 2009, Sep. 9, 2009 and Sep. 9, 2009, respectively, which were continuations in part of U.S. utility patent application Ser. No. 12/399,811, filed on Mar. 6, 2009, which was a continuation in part of U.S. utility patent application Ser. No. 12/029,957, filed on Feb. 12, 2008, which claimed priority to U.S. provisional patent application Ser. No. 60/889,324, filed on Feb. 12, 2007, the disclosures of which are incorporated herein by reference in their entireties and for all purposes.

BRIEF DESCRIPTION OF THE DRAWINGS

FIG. 14 is a side view of an embodiment of the invention that includes a plurality of scissor baffle assemblies.

FIG. 15 is a top view of an embodiment of the invention that includes a plurality of scissor baffle assemblies.

FIG. 17 is a side view of an embodiment of the invention that includes a plurality of scissor baffle assemblies and heating elements.

FIG. 18 is a top view of an embodiment of the invention that includes a plurality of scissor baffle assemblies and heating elements.

DETAILED DESCRIPTION OF THE INVENTION

Figure 1:
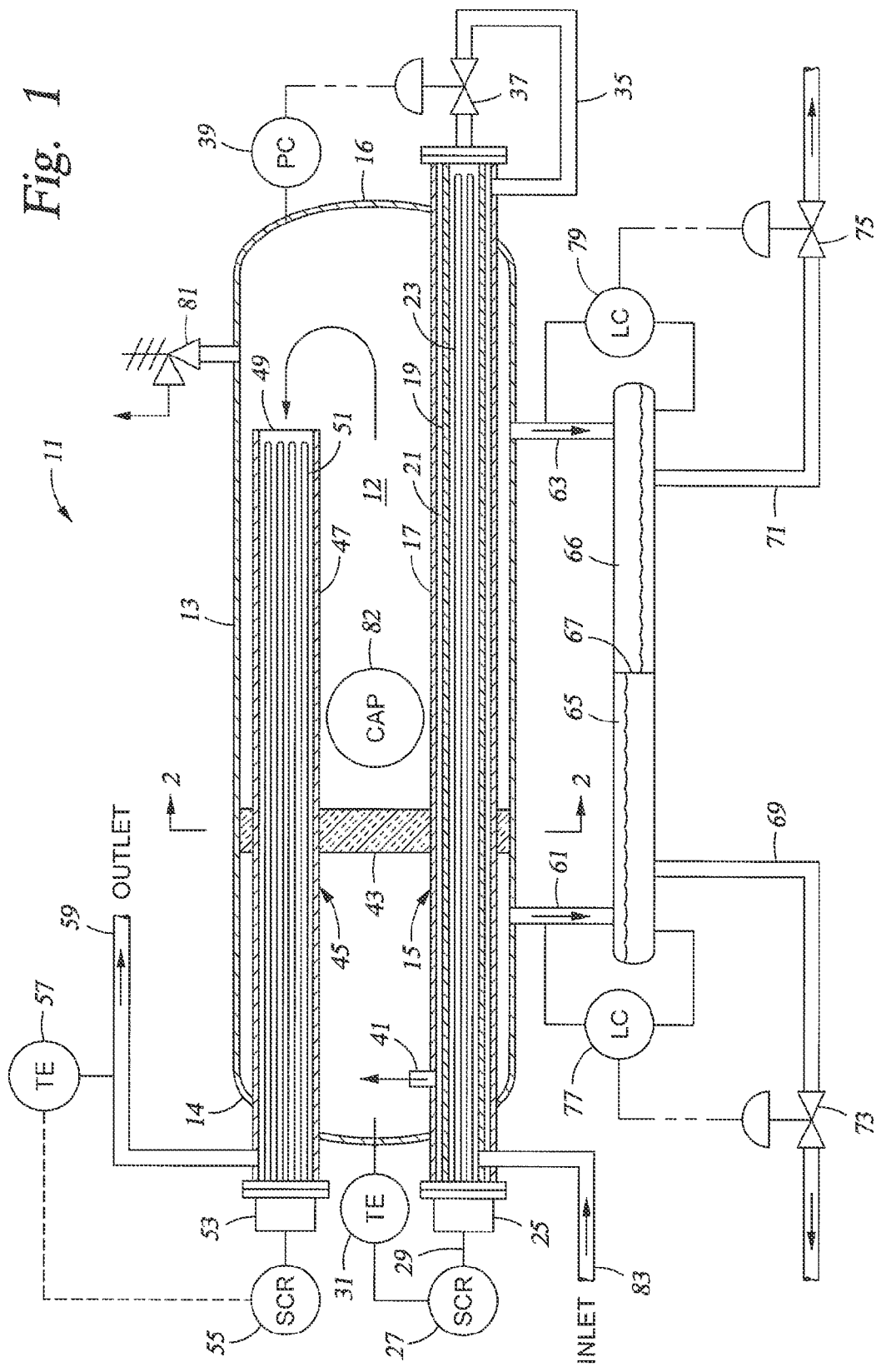
FIG. 1 is a schematic sectional view of an apparatus constructed in accordance with an exemplary embodiment of the invention.

Referring to FIG. 1, fuel gas conditioning system 11 includes a pressure vessel 13 having an interior chamber 12. Pressure vessel 13 is preferably cylindrical and has two closed ends 14, 16. The length of pressure vessel 13 considerably greater than its diameter. In this example, the longitudinal axis of pressure vessel 13 is horizontal.

A pre-heater unit 15 is mounted in pressure vessel 13 with its axis parallel and offset from the longitudinal axis of pressure vessel 13. Pre-heater unit 15 has a length somewhat greater than the length of pressure vessel 13 in this example, with its ends protruding past ends 14, 16 of pressure vessel 13. Pre-heater unit 15 has an outer tubular housing 17 and a concentric inner tubular housing 19, defining an annulus 21 between housings 17, 19. A plurality of electrical heater elements 23 extend longitudinally within inner housing 19.

Heater elements 23 are conventional elements, each comprising a metal tube containing an electrical resistance wire electrically insulated from the tube. In this embodiment, heater elements 23 are U-shaped, each having its terminal ends mounted within a connector housing 25 located exterior of end 14 of pressure vessel 13. The bent portions of heater elements 23 are located near the opposite end of pre-heater unit 15. A power controller 27 supplies power via wires 29 to electrical heater elements 23. Power controller 27 varies the power in response to temperature sensed by a temperature sensor 31 that is located within chamber 12 in pressure vessel 13.

Pre-heater unit 15 has an inlet 33 that leads to the interior of inner housing 19 of pre-heater unit 15 in the portion of pre-heater unit 15 exterior of pressure vessel end 14. In the embodiment of FIG. 1, an external conduit loop 35 is located on the opposite end of pre-heater unit 15, exterior of pressure vessel end 16. External loop 35 leads from the interior of inner housing 19 to annulus 21. A variable expansion valve 37 is located in external loop 35 for reducing the pressure of the gas flowing through external loop 35, which also results in cooling of the gas. Expansion valve 37 varies the amount of pressure drop in response to a pressure sensor 39 located within pressure vessel chamber 12.

Annulus 21 has an outlet 41 located within pressure vessel chamber 12 near end 14. A mist or coalescing filter 43 is located within pressure vessel chamber 12 approximately halfway between ends 14, 16 of pressure vessel 13. Coalescing filter 43 collects liquid mist from the gas flowing from annulus outlet 41 towards the pressure vessel end 16.

A super-heater 45 is mounted in pressure vessel chamber 12. Super-heater 45 has an elongated tubular housing 47 that has an axis parallel with the axis of pre-heater unit 15 and offset from the axis of pressure vessel 13. Super-heater 45 is located above pre-heater unit 15 in this example and has a length that is less than the length of pre-heater unit 15. Super-heater 45 has an inlet 49 in housing 47, inlet 49 being within pressure vessel chamber 12 and closer to pressure vessel end 16 than end 14. Super-heater 45 has a plurality of electrical resistance heater elements 51 located within housing 47.

Electrical resistance heater elements 51 may be of the same type as electrical resistance heater elements 23 of pre-heater unit 15. Preferably, each is U-shaped with both of its terminal ends mounted within an a connector housing 53, which is external of end 14 of pressure vessel 13. A power controller 55 supplies power to electrical resistance heater elements 51. Power controller 55 controls the power in response to temperature sensed by a temperature sensor 57 located within an outlet 59 of super-heater 45. In this embodiment, outlet 59 leads from a portion of super-heater housing 47 that is external of pressure vessel 13.

Pressure vessel 13 has at least one drain 61 for draining liquid that condenses within chamber 13 upstream of filter 43 as a result of the pressure drop. A second drain 63 drains liquid that separates from the gas as a result of flowing through filter 43. Drains 61, 63 are located on opposite sides of filter 43 and lead downward from a lower point on the sidewall of pressure vessel 13. Each drain 61, 63 leads to a separate sump 65, 66. In this example, sumps 65, 66 are compartments of a single tubular pressure vessel and separated from each other by a sealed plate 67. Outlets 69, 71 lead from the bottom of sumps 65, 66 to liquid control valves 73, 75. Each liquid control valve 73, 75 has a level controller 77, 79, respectively. Level controllers 77, 79 are conventional devices to open valves 73, 75 when the levels of liquid within sumps 65, 66 reach a selected amount, so as to discharge the liquid from sumps 65, 66. Other automatic drain arrangements are feasible.

Pressure vessel 13 has a pressure relief valve 81 in communication with its chamber 12. Pressure relief valve 81 is a conventional device to relieve pressure in the event that it reaches an excessive amount. Preferably, pressure vessel 13 has an access port 82 with a removable cap. Access port 82 is located in its sidewall in this embodiment. Access port 82 is of a size selected to allow a worker to enter chamber 12 for maintenance, particularly for removing and installing coalescing filter 43, which must be done periodically.

Figure 2:
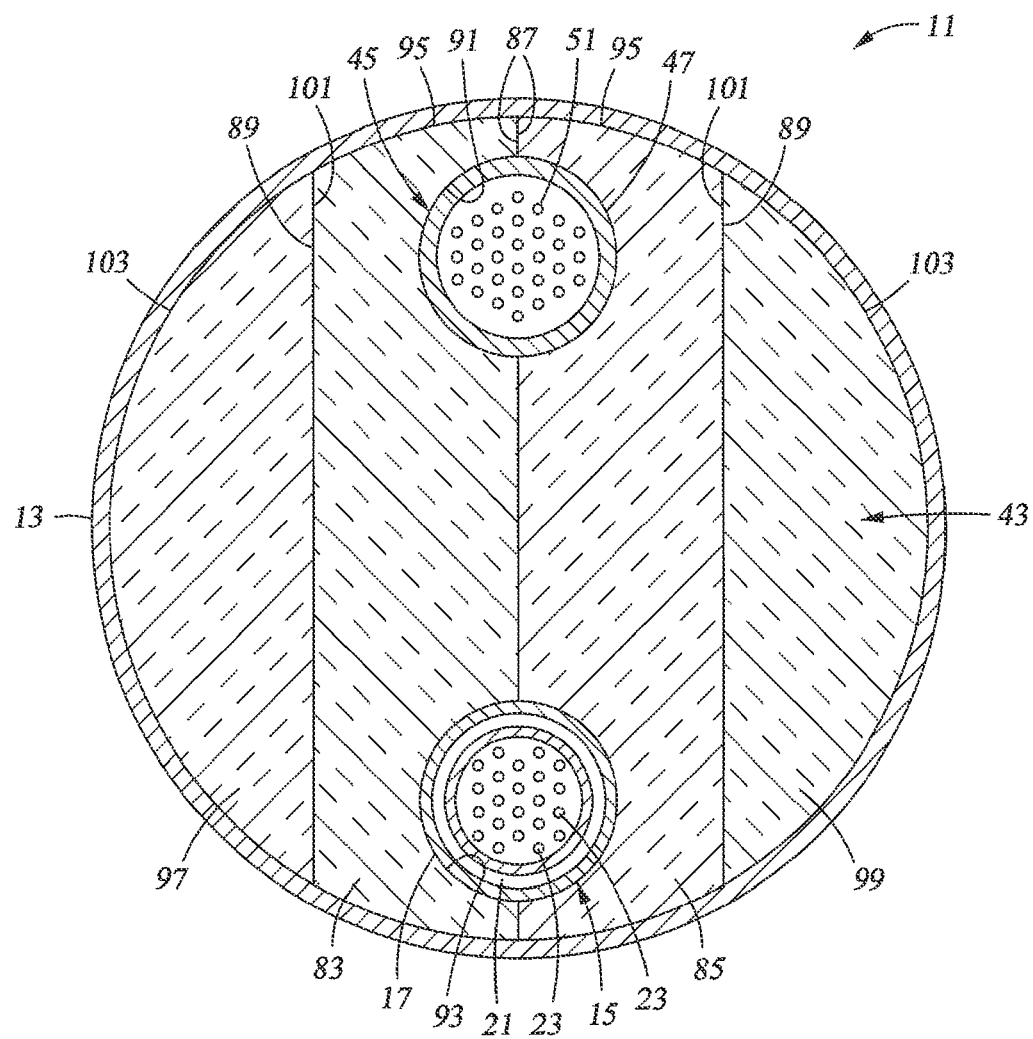
FIG. 2 is a sectional view of the apparatus of FIG. 1 taken along the line 2-2 of FIG. 1.

Referring to FIG. 2, coalescing filter 43 comprises an assembly of compressible pieces or segments that define an outer diameter that sealingly engages the inner diameter of pressure vessel 13. The multiple pieces of coalescing filter 43 are sized so that each will pass through access port 82 (FIG. 1). These pieces include in this example a pair of central segments 83, 85 having inner edges 87 and outer edges 89 that are straight and parallel with each other. Inner edges 87 sealingly abut each other. Each inner edge 87 has a semi-cylindrical recess 91 for engaging super-heater 45. Each inner edge 87 has a semi-cylindrical recess 93 for fitting around pre-heater unit 15. Each central segment 83, 85 has outer diameter portions 95 on opposite ends that are partially cylindrical and sealingly engage the inner diameter of pressure vessel 13.

Coalescing filter 43 also has two side segments 97, 99 in this embodiment. Each side segment 97, 99 has a straight inner edge 101 that abuts one of the outer edges 89 of one of the central segments 83, 85. Each side segment 97 has an outer diameter portion 103 that seals against the inner diameter of pressure vessel 13. Segments 83, 85, 97 and 99 are compressible so as to exert retentive forces against each other and against pressure vessel 13 to hold them in place. Retainers (not shown) may also be employed to hold the segments of coalescing filter 43 in position.

Fuel gas conditioning system 11 serves to condition fuel gas for gas turbines. Gas turbines, particularly low pollution types, require a dry feed gas that has a selected amount of superheat, such as 50 degrees above its dew point curve. The term "superheat" is a conventional industry term to refer to a range where the pressure and temperature of the fuel gas are above a range where condensation can occur. Referring to FIG. 1, feed gas enters inlet 49 at a pressure that may be, for example, 1,000 to 1,300 psig and at a temperature from 60-80° F.° F. The feed gas flows through inner housing 19 of pre-heater unit 15, which increases the temperature of the feed gas a selected amount over the temperature of the incoming gas. For example, the temperature may be approximately 100-120° F.° F. as it exits inner housing 19, and the pressure would be approximately the same as at inlet 49.

This preheated gas then flows through expansion valve 37, causing a pressure drop to a selected level below the dew point curve, as monitored by pressure sensor 39. For example, if the intake pressure is 1,000 to 1,300 psig, the pressure may drop to approximately 450-500 psig. The temperature will also drop to perhaps 60-80° F., and at this temperature and pressure, the gas will be below its dew point curve. The lower pressure cooler gas flows back through annulus 21 in preheater unit 15, which adds additional heat. At annulus outlet 41, the pressure may still be around 450-550 psig and the temperature may be 70-100° F., but still below the dew point. Controller 27 controls the power to heater elements 23 to maintain a desired temperature at outlet 41 as monitored by sensor 31.

Because the drop in pressure at expansion valve 37 caused the gas to be below its dew point, some of the liquids contained within the gas will condense in chamber 14 upstream of filter 43. Also, liquids will be separated from the gas by coalescing filter 43 as the gas flows through coalescing filter 43. The liquids collect on the bottom of pressure vessel 13 and flow through outlets 61, 63 into sumps 65, 66 and out through valves 73, 75.

After passing through filter 43, the gas flows toward pressure vessel end 16 and enters inlet 49 of super-heater 45. Electrical resistance heater elements 51 add heat to the dry gas in an amount that will place the temperature of the gas well above its dew point curve, such as by 50 degrees. The gas, now in a superheated condition, flows out outlet 59 at for example 110-130° F.° F. and 450-550 psig. The gas from outlet 59 flows into a conventional gas turbine (not shown).

Figure 3:
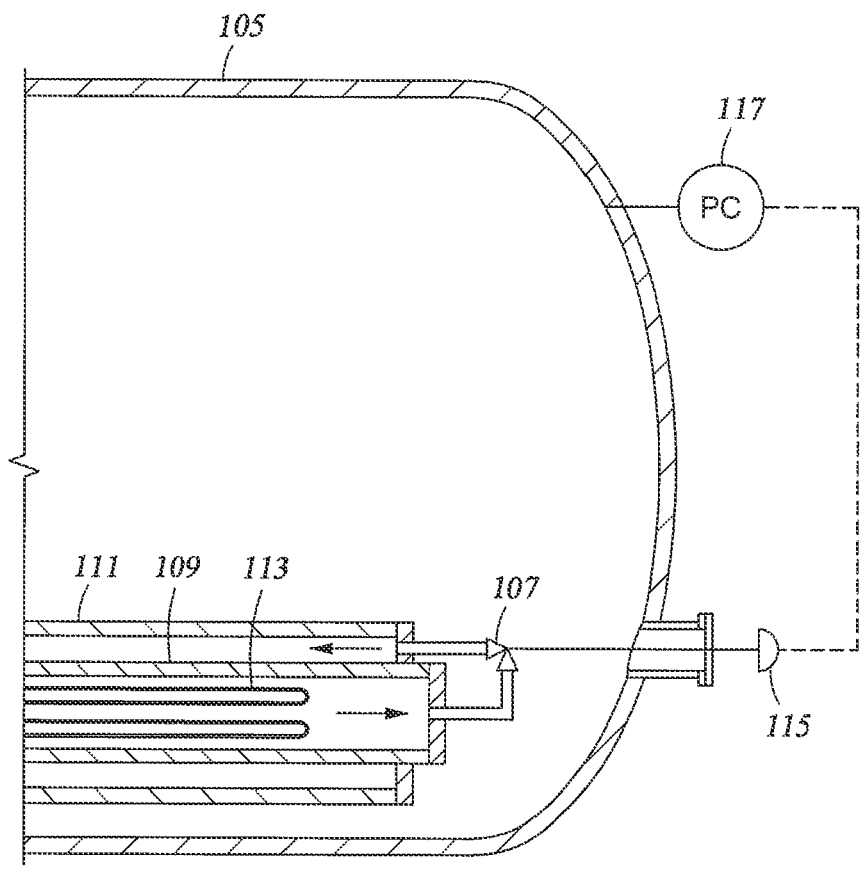
FIG. 3 is a sectional view of a portion of an alternate embodiment of an apparatus in accordance with an exemplary embodiment of the invention.

FIG. 3 shows a portion of an alternate embodiment wherein pressure vessel 105 contains an expansion valve 107 within its interior. In the first embodiment, expansion valve 37 is located on the exterior of pressure vessel 13. In FIG. 3, preheater inner housing 109 and outer housing 11 have one end within pressure vessel 105 instead of on the exterior as in the first embodiment. Heater elements 113 are contained within inner housing 109 as in the first embodiment. A valve actuator 115 controls the orifice of expansion valve 107. Valve actuator 115 varies the pressure drop in response to pressure sensed by a pressure sensor 117 located within the interior of pressure vessel 105. The second embodiment operates in the same manner as the first embodiment.

The gas conditioner is compact as the components are principally contained within a single pressure vessel. This arrangement reduces the amount of space required and the external flowlines connecting the various components.

Figure 4:
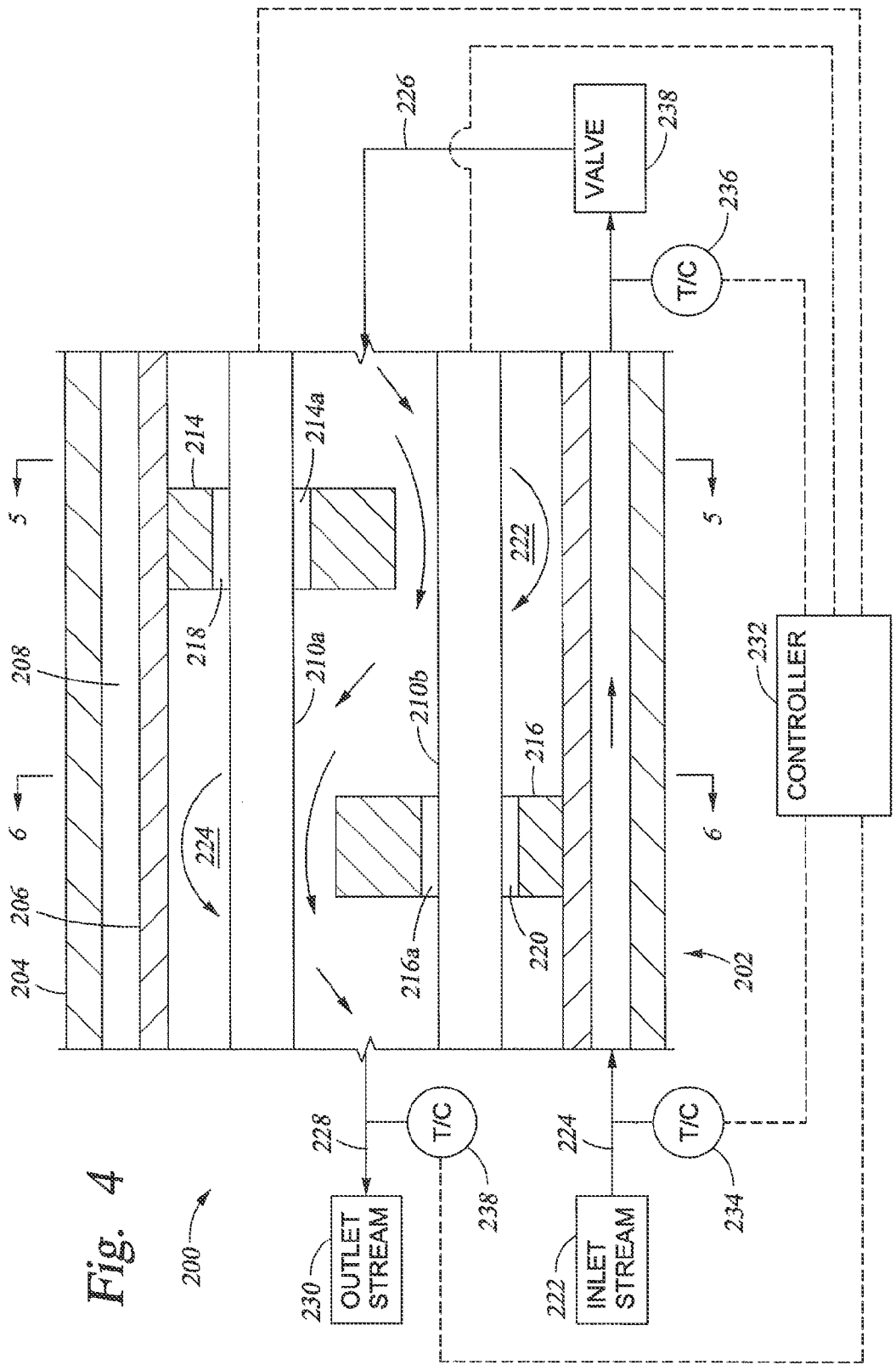
FIG. 4 is a fragmentary cross sectional and schematic illustration of an alternate exemplary embodiment of a fuel gas conditioning system.
Figure 5:
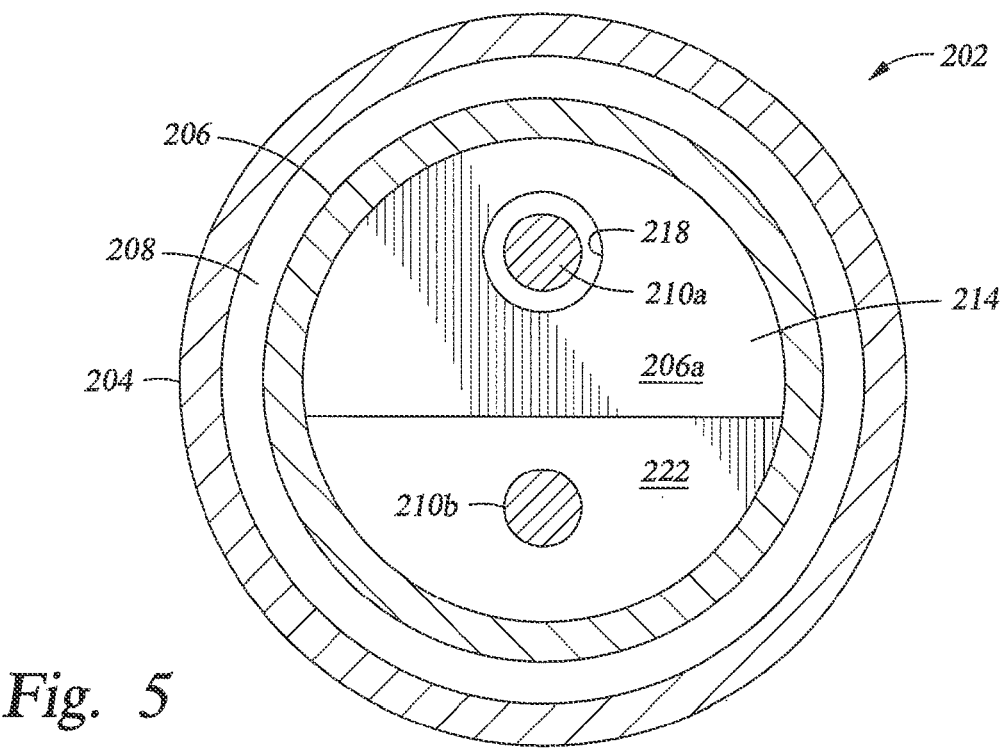
FIG. 5 is a fragmentary cross sectional illustration of the embodiment of FIG. 4.
Figure 6:
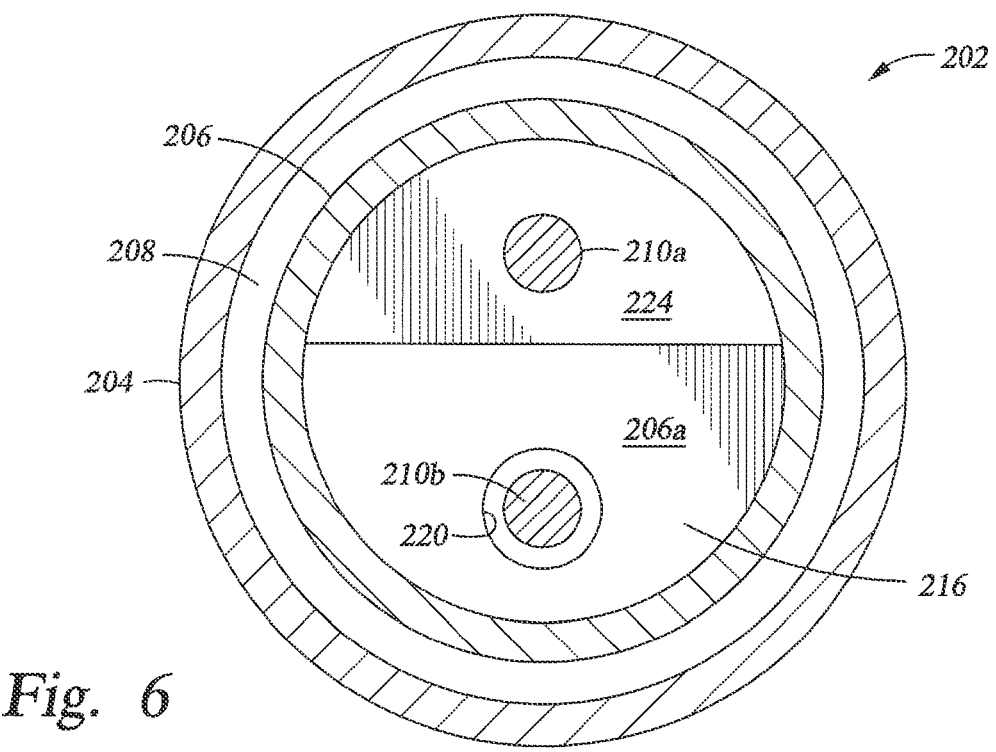
FIG. 6 is a fragmentary cross sectional illustration of the embodiment of FIG. 4.

Referring now to FIGS. 4, 5 and 6, an exemplary embodiment of a fuel gas conditioning system 200 includes a preheater assembly 202 that includes an outer tubular housing 204 and an inner tubular housing 206 that defines a longitudinal passage 206a that is positioned and supported within the outer tubular housing. An annulus 208 is thereby defined between the outer and inner tubular housings, 204 and 206. Heating elements, 210a and 210b, are positioned and supported within the passage 206a of the inner tubular housing 206. In an exemplary embodiment, the heating element 210a extends through and is positioned within an upper portion of the inner tubular housing 206 and the heating element 210b extends through and is positioned within a lower portion of the inner tubular housing 206. In an exemplary embodiment longitudinally spaced apart baffles, 214 and 216, are received within and are coupled to the inner tubular housing 206.

The baffle 214 defines a longitudinal passage 214a for receiving a portion of the heating element 210a and the baffle 216 defines a longitudinal passage 216a for receiving a portion of the heating element 210b. In an exemplary embodiment, the baffle 214 includes a peripheral arcuate portion that engages and mates with an upper portion of the interior surface of the inner tubular housing 206 and the baffle 216 includes a peripheral arcuate portion that engages and mates with an lower portion of the interior surface of the inner tubular housing. In this manner, an annular axial flow passage 218 is defined between the heating elements 210a and the baffle 214 and an annular axial flow passage 220 is defined between the heating element 210 and the baffle 216. Furthermore, in this manner, a lower axial flow passage 222 is defined between the lower periphery of the baffle 214 and the interior surface of the lower portion of the inner tubular housing 206 and an upper axial flow passage 224 is defined between the lower periphery of the baffle 216 and the interior surface of the upper portion of the inner tubular housing 206. In this manner, the flow of fluidic materials in an axial direction through the inner tubular housing 206 may flow through the annular passages, 218 and 220, and in a serpentine path by virtue of the apart axial flow passages 222 and 224.

In an exemplary embodiment, the inside diameters of the longitudinal passages, 214a and 216a, of the spaced apart baffles, 214 and 216, are about 1/16 to 1/8 inch greater than the outside diameters of the heating elements, 210a and 210b, that pass therethrough.

In an exemplary embodiment, the outer tubular housing 204 may be fabricated from, for example, a lower carbon steel tube having a wall thickness of about 0.280 inches and the inner tubular housing 206 may be fabricated from, for example, an H grade stainless steel having a wall thickness of about 0.134 inches. In an exemplary embodiment, the longitudinal spacing of the baffles, 214 and 216, may, for example, be about equal to the internal diameter of the inner tubular housing 206. In an exemplary embodiment, the heating elements 210a and 210b, may, for example, be conventional electrical operating heating elements such as, for example, heating elements commercially available from Gaumer Process in Houston, Tex.

A source 222 of an inlet stream of fluidic material is operably coupled to one end of the annulus 208 by a conduit 224 for conveying the inlet stream of fluidic materials into the annulus and a conduit 226 is operably coupled to another end of the annulus for conveying fluidic materials from the other end of the annulus into an end of the passage 206a. A conduit 228 is operably coupled to another end of the passage 206a for conveying fluidic materials from the other end of the passage into an outlet stream 230. In this manner, fluidic materials flow through the preheater assembly 202 by entering one end of the annulus 208, traveling through to the other end of the annulus, exiting the other end of the annulus through the conduit 226, entering one end of the passage 206a, passing through the passage, including passing through the annular axial passages, 218 and 220, and the axial passages, 222 and 224, and finally exiting the other end of the passage 206a into the passage 228 into an outlet stream 230. Thus, fluidic materials flow in one axial direction within the annulus 208 and in an opposite axial direction within the passage 206a.

In an exemplary embodiment, the source 222 of an inlet stream of fluidic material may, for example, include gaseous, liquid, ambient air, and/or natural gas materials and the outlet 230 may, for example, be used to provide a fuel source for a gas turbine.

In an exemplary embodiment, a controller 232 is operably coupled to the heating elements, 210a and 210b, for controlling the operation of the heating elements. In an exemplary embodiment, the controller 232 is further operably coupled to thermocouples, 234, 236 and 238, that in turn are operably coupled to the fluidic materials within the conduits, 224, 226 and 228. In this manner, the controller 232 may monitor the operating temperature of the fluidic materials within the conduits, 224, 226 and 228. In an exemplary embodiment, the controller 232 is also operably coupled to a flow control valve 238 for controlling the flow of fluidic materials through the conduit 226.

In an exemplary embodiment, during operation, fluidic materials from the source 222 are conveyed into one end of the annulus 208 by the conduit 224. Within the conduit 208, the fluidic materials are preheated by heat transmitted into the annulus through the walls of the inner tubular housing 206. Thus, in an exemplary embodiment, the operating temperature of the fluidic materials at the end of the annulus 208 are increased as they pass from the end of the annulus to the other end of the annulus. The fluidic materials then exit the other end of the annulus 208 and are conveyed to the end of the passage 206a by the conduit 226. Within the passage 206a, the fluidic materials are heated further by their interaction with the heating elements, 210a and 210b. The heating of the fluidic materials within the passage 206a by the heating elements, 210a and 210b, is significantly enhanced by forcing the fluidic materials to pass through the annular passages, 218 and 220, and the serpentine flow in the axial direction due to the baffles, 214 and 216. As a result, the operating temperature of the fluidic materials at the end of the passage 206a are significantly increased as they pass through the passage to the other end of the passage. The fluidic materials then exit the other end of the passage 206a and are conveyed to the outlet stream 230 by the conduit 228.

In an exemplary embodiment, the system 200 includes a plurality of baffles 214 which are interleaved with a plurality of baffles 216. In an exemplary embodiment, the system 200 includes a plurality of heating elements, 210a and 210b.

In a first exemplary experimental embodiment, the system 200 of FIGS. 4, 5 and 6 was operated and yielded the following results:

| Elements of the system 200 | Parameter Value |
| --- | --- |
| The outer tubular housing 204 | 6 inch, schedule 40, carbon steel pipe |
| The inner tubular housing 206 | 5 inch, schedule 10, 304H stainless steel pipe |
| Number, spacing and outside diameter of heating elements 210 | 9, 5 inches, and 0.475 inches |
| Number of baffles, 214 and 216 | 10 baffles 214 interleaved with 10 baffles 216 |
| Temperature and mass flow rate of inlet stream 218 | 70° F. and 293 lbs/hour |
| Temperature of outlet stream 226 | 1200° F. |
| Heat transfer coefficient of the system 200 | 25.31 btu/hr*ft$^2$*° F. |

In a second exemplary experimental embodiment, the system 200 of FIGS. 4, 5 and 6 was operated, without the baffles, 214 and 216, and yielded the following results:

| Elements of the system 200 | Parameter Value |
| --- | --- |
| The outer tubular housing 204 | 6 inch, schedule 40, carbon steel pipe |
| The inner tubular housing 206 | 5 inch, schedule 10, 304H stainless steel pipe |
| Number, spacing and outside diameter of heating elements 210 | 9, 1.5 inches, and 0.475 inches |
| Number of baffles, 214 and 216 | N/A |
| Temperature and mass flow rate of inlet stream 218 | 70° F. and 293 lbs/hour |
| Temperature of outlet stream 226 | 1200° F. |
| Heat transfer coefficient of the system 200 | 4 btu/hr*ft$^2$*° F. |

In a third exemplary experimental embodiment, the system 200 of FIGS. 4, 5 and 6 was operated and yielded the following results:

| Elements of the system 200 | Parameter Value |
| --- | --- |
| The outer tubular housing 204 | 14 inch, standard carbon steel pipe |
| The inner tubular housing 206 | 12 inch, schedule 10, 304H stainless steel pipe |
| Number, spacing and outside diameter of heating elements 210 | 48, 1.5 inches, and 0.475 inches |
| Number of baffles, 214 and 216 | 5 baffles 214 interleaved with 5 baffles 216 |
| Temperature and mass flow rate of inlet stream 218 | 80° F. and 1880 lbs/hour |
| Temperature of outlet stream 226 | 1000° F. |
| Heat transfer coefficient of the system 200 | 72.07 btu/hr*ft$^2$*° F. |

In a fourth exemplary experimental embodiment, the system 200 of FIGS. 4, 5 and 6 was operated, without the baffles, 214 and 216, and yielded the following results:

| Elements of the system 200 | Parameter Value |
| --- | --- |
| The outer tubular housing 204 | 14 inch, standard carbon steel pipe |
| The inner tubular housing 206 | 12 inch, schedule 10, 304H stainless steel pipe |
| Number, spacing and outside diameter of heating elements 210 | 48, 1.5 inches, and 0.475 inches |
| Number of baffles, 214 and 216 | N/A |
| Temperature and mass flow rate of inlet stream 218 | 80° F. and 1880 lbs/hour |
| Temperature of outlet stream 226 | 1000° F. |
| Heat transfer coefficient of the system 200 | 12.2 btu/hr*ft$^2$*° F. |

In a fifth exemplary experimental embodiment, the system 200 of FIGS. 4, 5 and 6 was operated and yielded the following results:

| Elements of the system 200 | Parameter Value |
| --- | --- |
| The outer tubular housing 204 | 14 inch, standard carbon steel pipe |
| The inner tubular housing 206 | 12 inch, schedule 10, 304H stainless steel pipe |
| Number, spacing and outside diameter of heating elements 210 | 36, 1.5 inches, and 0.475 inches |
| Number of baffles, 214 and 216 | 13 baffles 214 interleaved with 13 baffles 216 |
| Temperature and mass flow rate of inlet stream 218 | 80° F. and 1135 lbs/hour |
| Temperature of outlet stream 226 | 800° F. |
| Heat transfer coefficient of the system 200 | 57.8 btu/hr*ft$^2$*° F. |

In a sixth exemplary experimental embodiment, the system 200 of FIGS. 4, 5 and 6 was operated, without the baffles, 214 and 216, and yielded the following results:

| Elements of the system 200 | Parameter Value |
| --- | --- |
| The outer tubular housing 204 | 14 inch, standard carbon steel pipe |
| The inner tubular housing 206 | 10 inch, schedule 10, 304H stainless steel pipe |
| Number, spacing and outside diameter of heating elements 210 | 36, 1.5 inches, and 0.475 inches |
| Number of baffles, 214 and 216 | N/A |
| Temperature and mass flow rate of inlet stream 218 | 80° F. and 1135 lbs/hour |
| Temperature of outlet stream 226 | 800° F. |
| Heat transfer coefficient of the system 200 | 9.8 btu/hr*ft$^2$*° F. |

In a seventh exemplary experimental embodiment, the system 200 of FIGS. 4, 5 and 6 was operated and yielded the following results:

| Elements of the system 200 | Parameter Value |
|---|---|
| The outer tubular housing 204 | 10 inch, schedule 40, carbon steel pipe |
| The inner tubular housing 206 | 8 inch, schedule 10, 304H stainless steel pipe |
| Number, spacing and outside diameter of heating elements 210 | 24, 1.5 inches, and 0.475 inches |
| Number of baffles, 214 and 216 | 13 baffles 214 interleaved with 13 baffles 216 |
| Temperature and mass flow rate of inlet stream 218 | 348° F. and 1628 lbs/hour |
| Temperature of outlet stream 226 | 800° F. |
| Heat transfer coefficient of the system 200 | 53.23 btu/hr*ft$^2$*° F. |

In a eighth exemplary experimental embodiment, the system 200 of FIGS. 4, 5 and 6 was operated, without the baffles, 214 and 216, and yielded the following results:

| Elements of the system 200 | Parameter Value |
|---|---|
| The outer tubular housing 204 | 10 inch, schedule 40, carbon steel pipe |
| The inner tubular housing 206 | 8 inch, schedule 10, 304H stainless steel pipe |
| Number, spacing and outside diameter of heating elements 210 | 24, 1.5 inches, and 0.475 inches |
| Number of baffles, 214 and 216 | N/A |
| Temperature and mass flow rate of inlet stream 218 | 348° F. and 1628 lbs/hour |
| Temperature of outlet stream 226 | 800° F. |
| Heat transfer coefficient of the system 200 | 9.2 btu/hr*ft$^2$*° F. |

The exemplary test results of the system 200 that demonstrated an increased heat transfer for the system 200 with the baffles, 214 and 216, versus the system without the baffles were unexpected.

In an exemplary embodiment, one or more of the baffles, 216 and 218, within the system 200 may be omitted.

In an exemplary embodiment, during the operation of the system 200, the heat generated by the heating elements 210 is transmitted by a combination of radiation, conduction and convection to the interior surface of the inner tubular housing 206. As a result, the operating temperature of the inner tubular housing 206 is increased and the fluidic material that flows within the annular passage 208 may be pre-heated by heat transmitted from the exterior surface of the inner tubular housing 206 to the annular passage by a combination of radiation, conduction and convection. Furthermore, as a result, the material composition of the outer tubular housing 204 that is required for typical operating conditions does not have to be as tolerant of heat and temperature as the inner tubular housing 206. For example, for typical operating conditions of the system 200, the outer tubular housing 204 may be fabricated from a carbon steel pipe while the inner tubular housing 206 may be fabricated from a high temperature stainless steel pipe.

In an exemplary embodiment, the counter flow of the fluidic materials within the system 200, through the inner passage 206a in a first axial direction, and the outer annular passage 208 in a second opposite axial direction, enhances heat transfer to the fluidic material that pass through the system and thereby decreases the response time within the system to changes in operating conditions such as, for example, step changes in one or more of the flow rate, the operating temperature(s), and the fluid composition.

In an exemplary embodiment, the use of outer and inner tubular housings, 204 and 206, in which the inner tubular housing houses the heating elements 210 and contains the radiant energy generated by the heating elements, permits the composition of the outer tubular housing to be less tolerant of high temperature operating conditions and thereby composed of a typically less expensive and lighter weight material.

In an exemplary embodiment, the use of outer and inner tubular housings, 204 and 206, in which the inner tubular housing houses the heating elements 210 and contains the radiant energy generated by the heating elements, and the counter flow and forced convection of the fluidic materials within the system 200, through the inner passage 206a in a first direction, and the outer annular passage 208 in a second opposite direction, enhances heat transfer.

In an exemplary embodiment, one or more aspects of the system of FIGS. 1, 2 and 3 may be combined in whole, or in part, with one or more aspects of the systems of FIGS. 4, 5 and 6.

Figure 7:
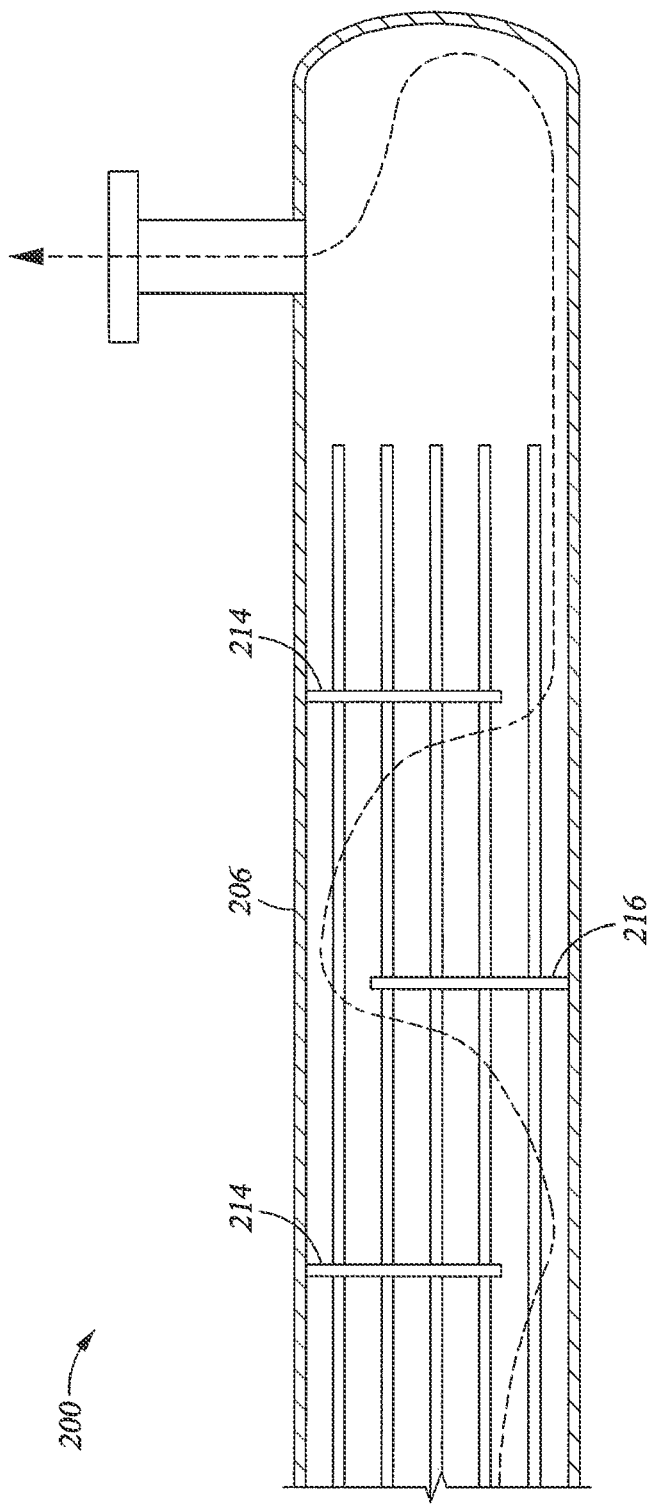
FIG. 7 is a graphical illustration of exemplary experimental results obtained during the operation of the embodiment of FIG. 4.

In an exemplary experimental embodiment, as illustrated in FIG. 7, operation of the system 200 of FIG. 4 provided a serpentine flow pattern within the inner tubular housing 206 due to the presence of the baffles, 214 and 216.

Figure 8:
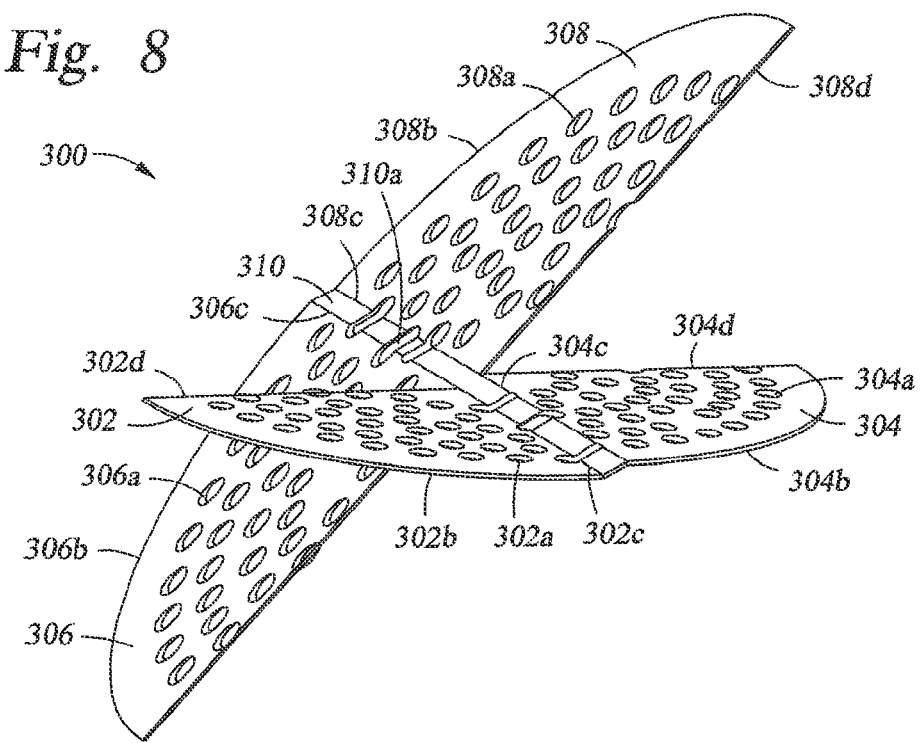
FIG. 8 is a perspective view of an exemplary embodiment of a scissor baffle assembly.

Referring now to FIG. 8, an exemplary embodiment of a baffle assembly 300 includes a first baffle element 302, a second baffle element 304, a third baffle element 306, a fourth baffle element 308, and a hinge 310 that is coupled to each of the first, second, third and fourth baffle elements. The first, second, third, and further baffle elements, 302, 304, 306 and 308, each define one or more passageways, 302a, 304a, 306a and 308a, respectively, and the hinge 310 at least partially defines one or more passageways 310a.

The first baffle element 302 includes an outer peripheral portion 302b having an arcuate shape, an inner peripheral portion 302c that is pivotally coupled to one side of the hinge 310 having a linear shape, and a side peripheral portion 302d having a linear shape. The second baffle element 304 includes an outer peripheral portion 304b having an arcuate shape, an inner peripheral portion 304c that is pivotally coupled to another side of the hinge 310 having a linear shape, and a side peripheral portion 304d having a linear shape. The third baffle element 306 includes an outer peripheral portion 306b having an arcuate shape, an inner peripheral portion 306c that is pivotally coupled to the one side of the hinge 310 having a linear shape, and a side peripheral portion 306d having a linear shape. The fourth baffle element 308 includes an outer peripheral portion 308b having an arcuate shape, an inner peripheral portion 308c that is pivotally coupled to the other side of the hinge 310 having a linear shape, and a side peripheral portion 308d having a linear shape. In an exemplary embodiment, the outer peripheral surfaces of the first, second, third, and fourth baffle elements, 302, 304, 306 and 308, respectively, and the hinge 310, together define a circular shape.

In an exemplary embodiment, the radius of curvatures of the arcuate shaped outer peripheral portions 302b, 304b, 306b and 308b, of the first, second, third and fourth baffle elements, 302, 304, 306 and 308, respectively, are substantially constant and equal to one another. In an alternative embodiment, one or more of the radius of curvatures of the arcuate shaped outer peripheral portions 302b, 304b, 306b and 308b, of the first, second, third and fourth baffle elements, 302, 304, 306 and 308, respectively, may be variable and/or not equal to one or more of the other radius of curvatures.

In an exemplary embodiment, because of the pivotal connections of the first, second, third and fourth baffle elements, 302, 304, 306 and 308, respectively, to the hinge 310, the first, second, third and fourth baffle elements may each be independently positioned in corresponding plane which may, for example, be different from one another.

In an exemplary embodiment, the angular spacing between the first, second, third and fourth baffle elements, 302, 304, 306 and 308, respectively, ranges from about 15 to 75 degrees.

Figure 9:
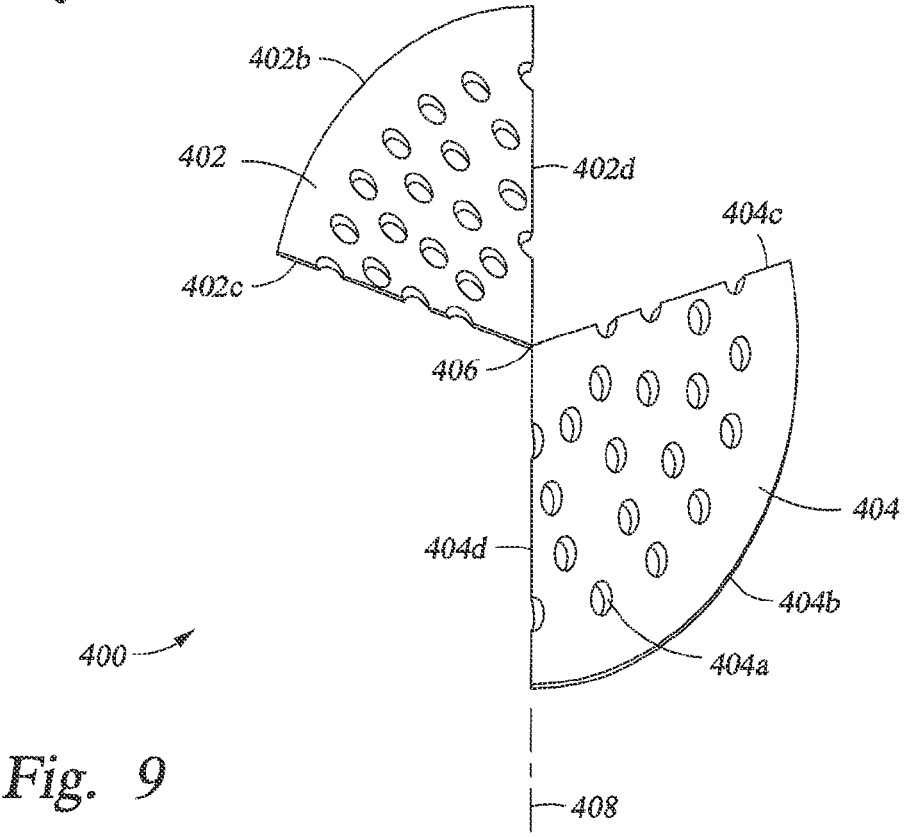
FIG. 9 is a perspective view of an exemplary embodiment of a scissor baffle assembly.

Referring now to FIG. 9, an exemplary embodiment of a baffle assembly 400 includes a first baffle element 402, a second baffle element 404, and a hinge 406 that is coupled to each of the first and second baffle elements. The first and second baffle elements, 402 and 404, each define one or more passageways, 402a and 404a, respectively.

The first baffle element 402 includes an outer peripheral portion 402b having an arcuate shape, an inner peripheral portion 402c having a linear shape, and a side peripheral portion 402d having a linear shape. The second baffle element 404 includes an outer peripheral portion 404b having an arcuate shape, an inner peripheral portion 404c having a linear shape, and a side peripheral portion 404d having a linear shape.

In an exemplary embodiment, the outer peripheral surfaces of the first and second fourth baffle elements, 402 and 404, respectively, together define a semi-circular shape.

In an exemplary embodiment, the radius of curvatures of the arcuate shaped outer peripheral portions 402b and 404b of the first and second baffle elements, 402 and 404, respectively, are substantially constant and equal to one another. In an alternative embodiment, one or more of the radius of curvatures of the arcuate shaped outer peripheral portions 402b and 404b of the first and second baffle elements, 402 and 404, respectively, may be variable and/or not equal to one or more of the other radius of curvatures.

In an exemplary embodiment, because of the pivotal connections of the first and second baffle elements, 402 and 404, respectively, to the hinge 406, the first and second baffle elements may each be independently pivoted about an axis of rotation 408 to corresponding planes which may, for example, be different from one another.

In an exemplary embodiment, the angular spacing between the first and second baffle elements, 402 and 404, respectively, ranges from about 15 to 75 degrees.

Figure 10:
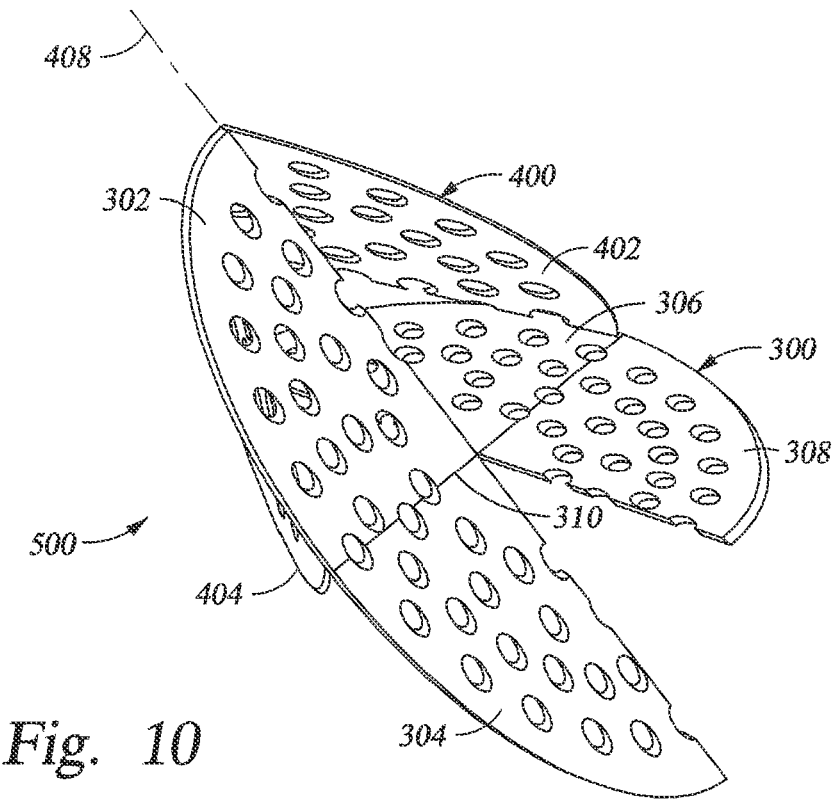
FIG. 10 is a perspective view of an exemplary embodiment of a scissor baffle assembly.
Figure 11:
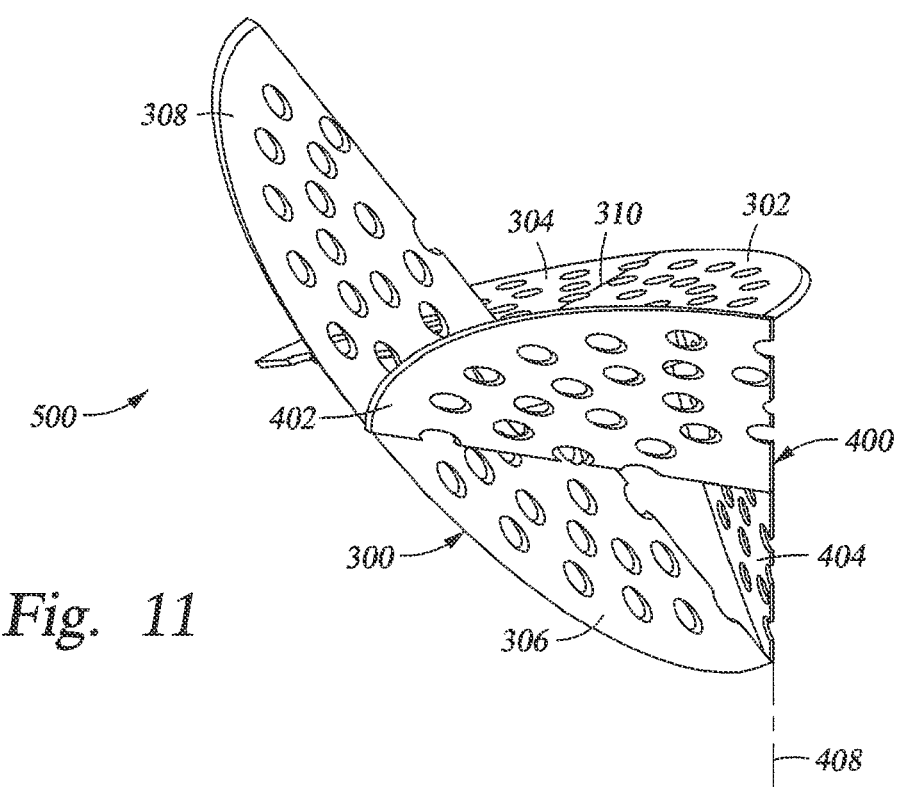
FIG. 11 is a perspective view of an exemplary embodiment of a scissor baffle assembly.
Figure 12:
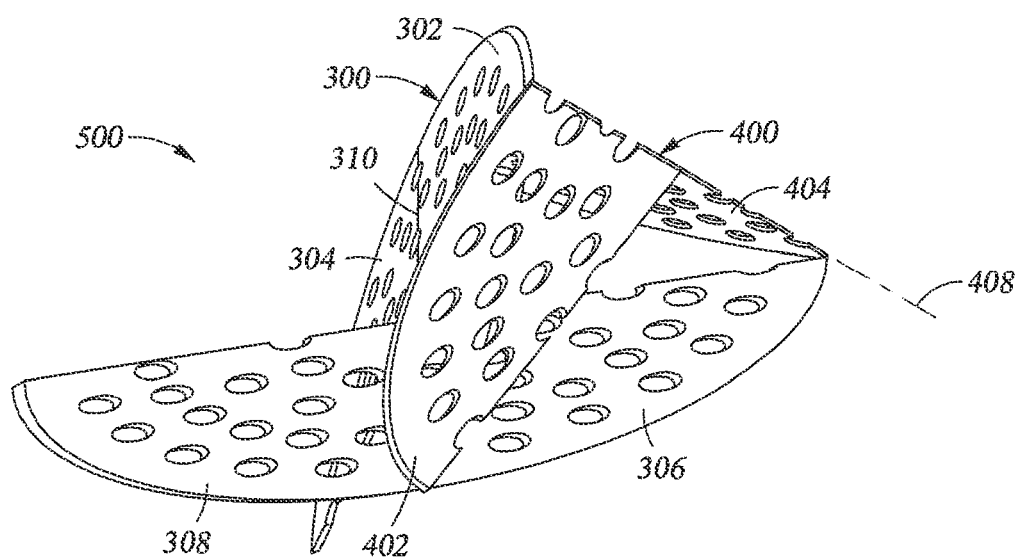
FIG. 12 is a perspective view of an exemplary embodiment of a scissor baffle assembly.

Referring now to FIGS. 10-12, an exemplary embodiment of a baffle assembly 500 includes the baffle assembly 300 and the baffle assembly 400 positioned proximate one another. In an exemplary embodiment, in the baffle assembly 500, the first and second baffle elements, 302 and 304, respectively, of the baffle assembly 300 are positioned in a common plane, and the third and fourth baffle elements, 306 and 308, respectively, of the baffle assembly 300 are positioned in another common plane. In an exemplary embodiment, in the baffle assembly 500, the first and second baffle elements, 402 and 404, respectively, of the baffle assembly 400 are positioned in different planes. In an exemplary embodiment, in the baffle assembly 500, the common plane of the first and second baffle elements, 302 and 304, respectively, of the baffle assembly 300, the common plane of the third and fourth baffle elements, 306 and 308, respectively, of the baffle assembly 300, the plane of the first baffle element 402 of the baffle assembly 400, and the plane of the second baffle element 404 of the baffle assembly 400 are all different from one another. In an exemplary embodiment, in the baffle assembly 500, the longitudinal axis of the hinge 310 of the baffle assembly 300 is positioned in a different orientation from the axis of rotation 408 of the baffle assembly 400.

Figure 13:
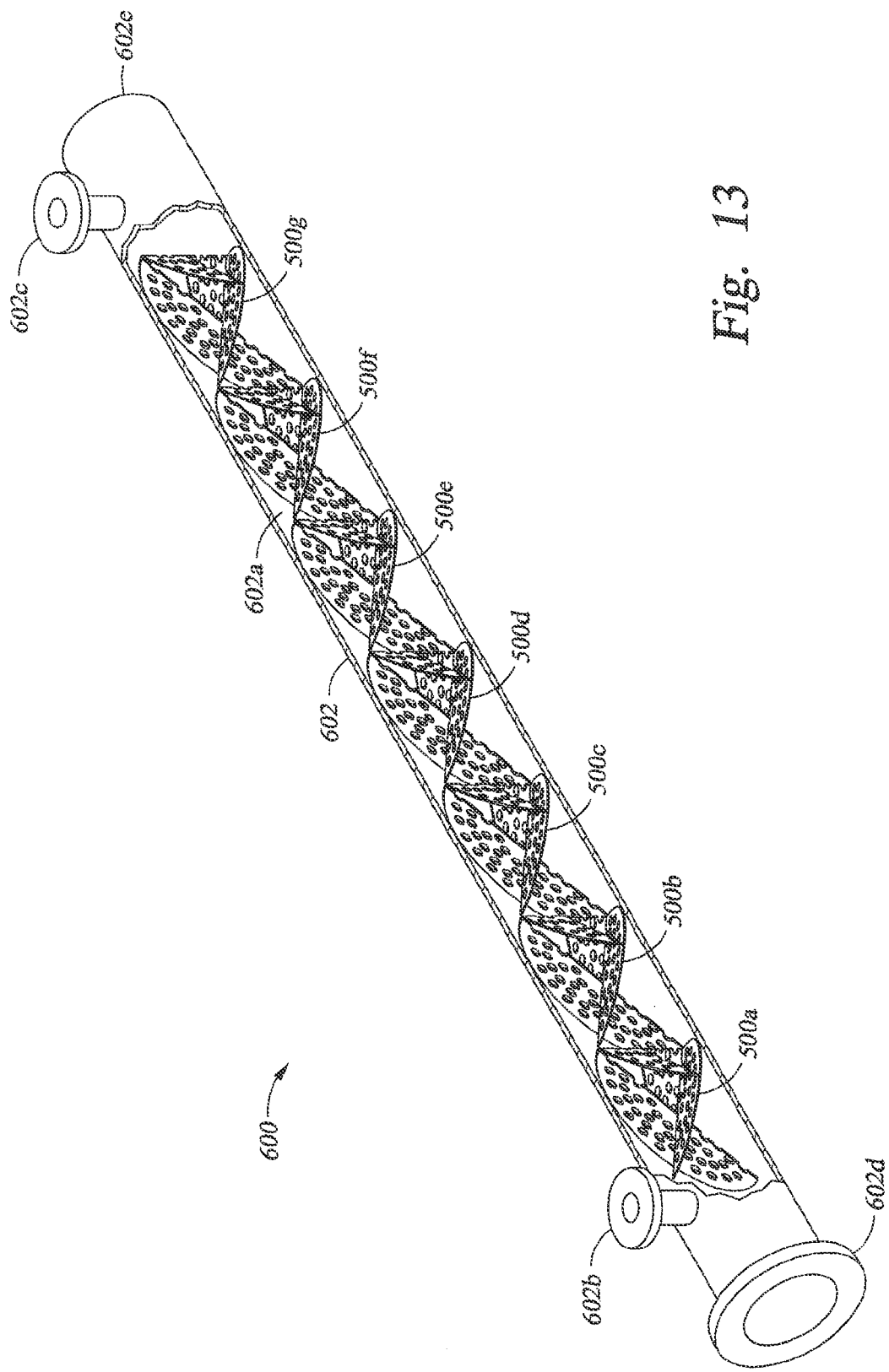
FIG. 13 is a perspective view of an embodiment of the invention that includes a plurality of scissor baffle assemblies.
Figure 16:
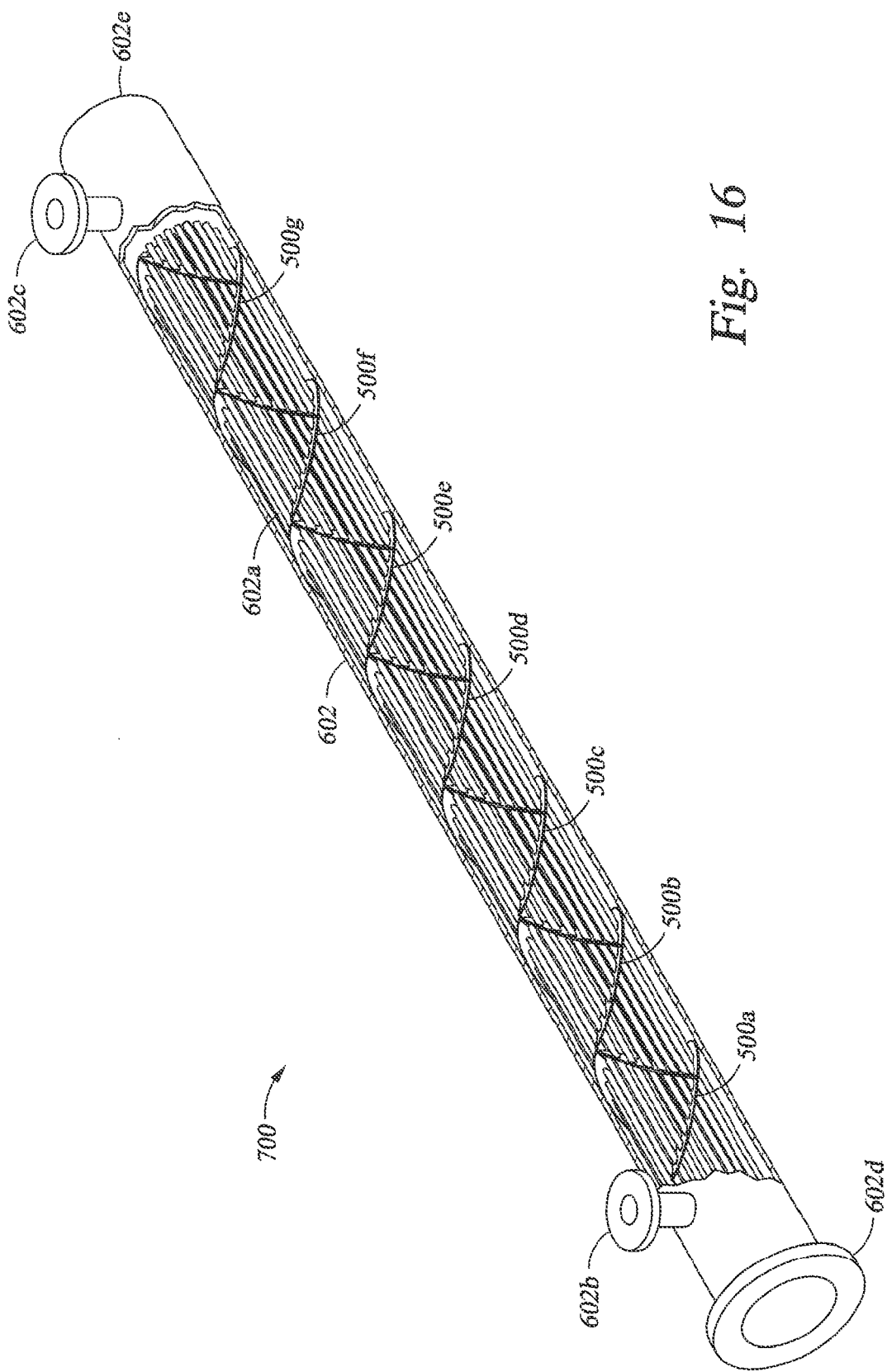
FIG. 16 is a perspective view of an embodiment of the invention that includes a plurality of scissor baffle assemblies and heating elements.
Figure 19:
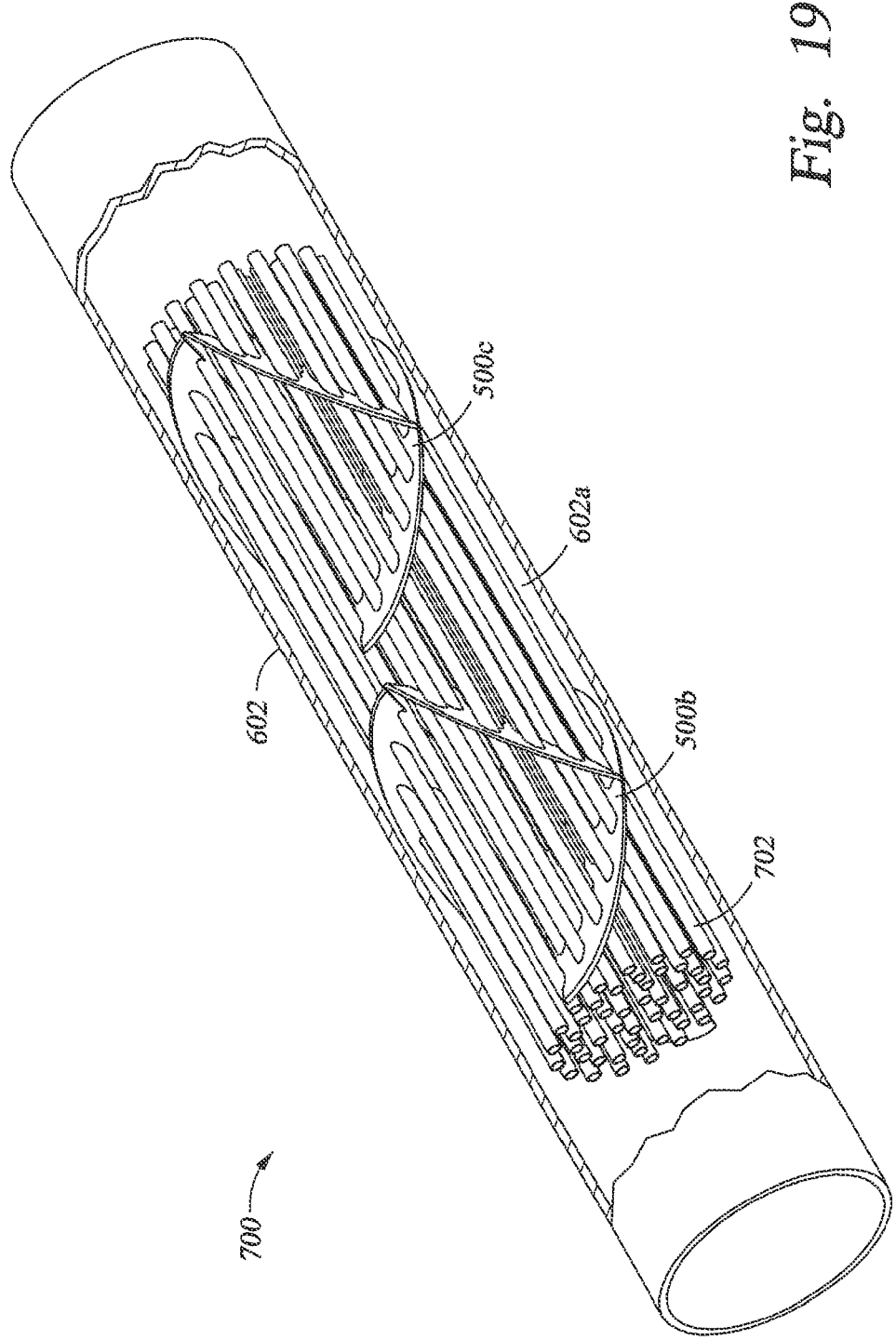
FIG. 19 is a fragmentary perspective view of an embodiment of the invention that includes a plurality of scissor baffle assemblies and heating elements.

Referring now to FIGS. 13-15, an assembly 600 is shown that includes a tubular housing 602 that defines a longitudinal passageway 602a, a radial passage 602b and a radial passage 602c and includes an open end 602d and closed end 602e. A plurality of the baffle assemblies 500a-500g, all substantially identical to the baffle assembly 500, are positioned proximate to one another within the passageway 602a of the tubular housing 602 extend from a location proximate the radial passage 602b to a location proximate the radial passage 602c. In an exemplary embodiment, at least a portion of one or more of the arcuate outer peripheral portions, 302b, 304b, 306b, 308b, 402b and 404b, of the baffle assemblies, 300 and 400, mate with the interior surface of the tubular housing 602.

Referring now to FIGS. 16-19, as assembly 700 is shown in which a plurality of heating elements 702 are positioned within the tubular housing 602 of the assembly 600, with each of the heating elements passing through corresponding passageways, 302a, 304a, 306a, 308a, 402a and 404a, of the baffle assemblies 500. In an exemplary embodiment, the heating elements 702 extend in a longitudinal direction within the housing 602 and are parallel to one another within the housing. In an exemplary embodiment, the heating elements 702 extend from the open end 602d of the housing to a positioned proximate the radial passage 602c. In an exemplary embodiment, the outside diameter of the heating elements 702 are less than the inside diameters of the corresponding passageways, 302a, 304a, 306a, 308a, 402a and 404a, in the baffle assemblies 500. In an exemplary embodiment, the design and operation of the heating elements 702 is substantially identical to the heating elements 210.

Figure 20:
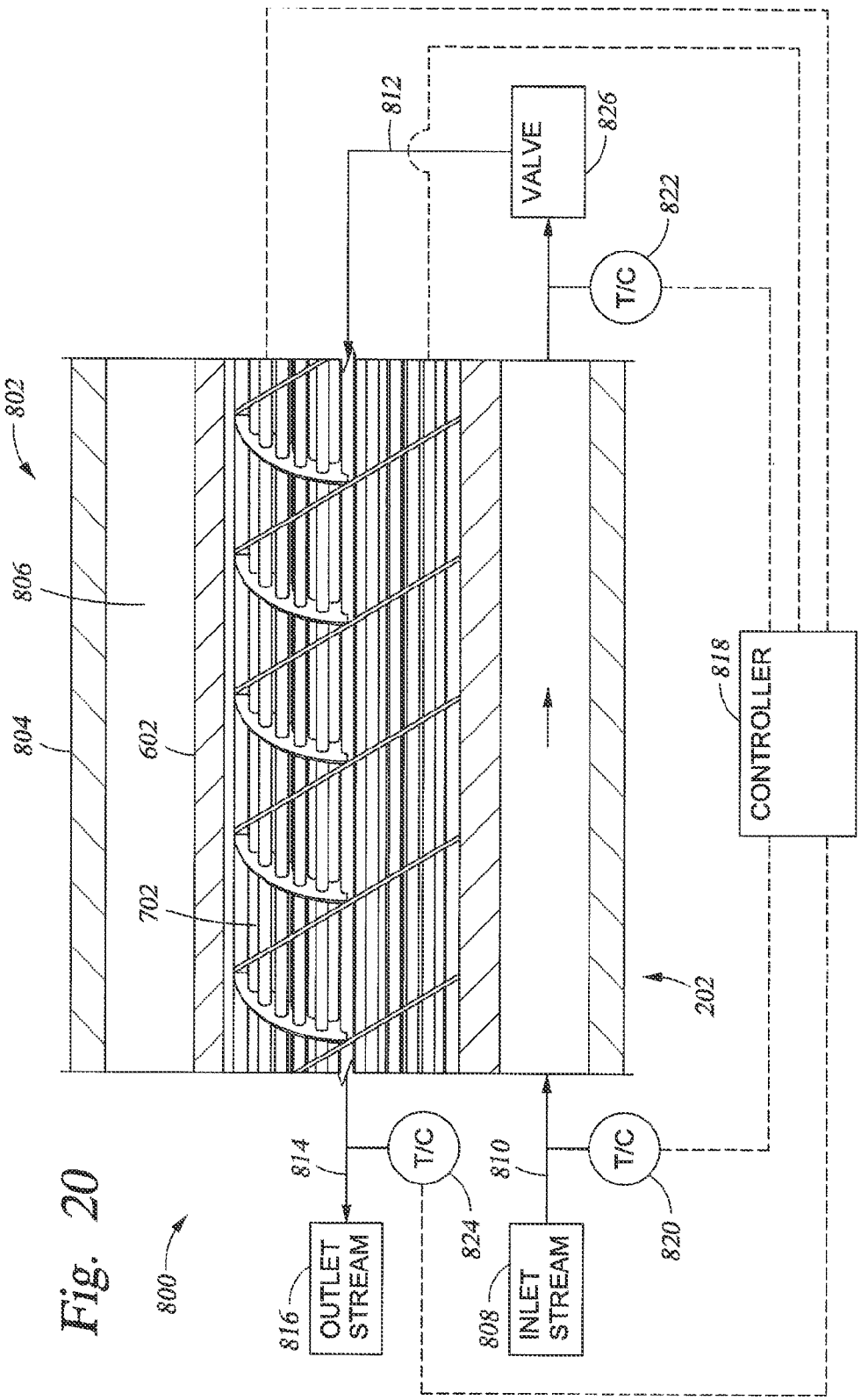
FIG. 20 is a fragmentary cross sectional and schematic illustration of an alternate embodiment of a fuel gas conditioning system.

Referring now to FIG. 20, an exemplary embodiment of a fuel gas conditioning system 800 includes a preheater assembly 802 in which the assembly 700, including the baffle assemblies 500, tubular housing 602, and heating elements 702, as described and illustrated above with reference to FIGS. 16-19, is positioned and supported within an outer tubular housing 804. An annulus 806 is thereby defined between the outer and inner tubular housings, 804 and 602.

A source 808 of an inlet stream of fluidic material is operably coupled to one end of the annulus 806 by a conduit 810 for conveying the inlet stream of fluidic materials into the annulus and a conduit 812 is operably coupled to another end of the annulus for conveying fluidic materials from the other end of the annulus into an end of the passage 602a of the housing 602. In an exemplary embodiment, the conduit 812 may, for example, be either the radial passage 602b or 602c of the housing 602.

A conduit 814 is operably coupled to another end of the passage 602a of the housing 602 for conveying fluidic materials from the other end of the passage into an outlet stream 816. In an exemplary embodiment, the conduit 814 may, for example, be either the radial passage 602b or 602c of the housing 602. In this manner, fluidic materials flow through the preheater assembly 802 by entering one end of the annulus 806, traveling through to the other end of the annulus, exiting the other end of the annulus through the conduit 812, entering one end of the passage 602a of the housing 602, passing through the passage, and finally exiting the other end of the passage 602a of the housing 602 into the passage 814 into an outlet stream 816. Thus, fluidic materials flow in one axial direction within the annulus 806 and in an opposite axial direction within the passage 602a of the housing 602.

In an exemplary embodiment, the source 808 of an inlet stream of fluidic material may, for example, include gaseous, liquid, ambient air, and/or natural gas materials and the outlet 816 may, for example, be used to provide a fuel source for a gas turbine.

In an exemplary embodiment, a controller 818 is operably coupled to the heating element 702 for controlling the operation of the heating elements. In an exemplary embodiment, the controller 818 is further operably coupled to thermocouples, 820, 822 and 824, that in turn are operably coupled to the fluidic materials within the conduits, 810, 812 and 814. In this manner, the controller 818 may monitor the operating temperature of the fluidic materials within the conduits, 820, 822 and 824. In an exemplary embodiment, the controller 818 is also operably coupled to a flow control valve 826 for controlling the flow of fluidic materials through the conduit 812.

In an exemplary embodiment, during operation of the fuel gas conditioning system 800, fluidic materials from the source 808 are conveyed into one end of the annulus 806 by the conduit 810. Within the annulus 806, the fluidic materials are preheated by heat transmitted into the annulus through the walls of the inner tubular housing 602. Thus, in an exemplary embodiment, the operating temperature of the fluidic materials at the end of the annulus 806 are increased as they pass from the end of the annulus to the other end of the annulus. The fluidic materials then exit the other end of the annulus 806 and are conveyed to the end of the passage 602a of the tubular housing 602 by the conduit 812. Within the passage 602a of the housing 602, the fluidic materials are heated further by their interaction with the heating elements 702. The heating of the fluidic materials within the passage 602a of the housing 602 by the heating elements 702 is significantly enhanced by forcing the fluidic materials to pass through the flow passages defined by the baffle assemblies 500. As a result, the operating temperature of the fluidic materials at the end of the passage 602a of the housing 602 are significantly increased as they pass through the passage to the other end of the passage. The fluidic materials then exit the other end of the passage 602a and are conveyed to the outlet stream 816 by the conduit 814.

In an exemplary embodiment, during operation of the during operation of the fuel gas conditioning system 800, the flow passages defined by the baffle assemblies 500 constantly shear the fluidic materials thereby causing the fluidic materials to pass over the heating elements 702 at an angle as opposed to having the fluidic materials running along the length of the heating elements thereby enhancing the heating transfer from the heating elements to the fluidic material. In an exemplary embodiment, during operation of the during operation of the fuel gas conditioning system 800, the flow passages defined by the baffle assemblies 500 constantly mix the fluidic materials around the heating elements 702 thereby enhancing the heating transfer from the heating elements to the fluidic material.

Figure 21:
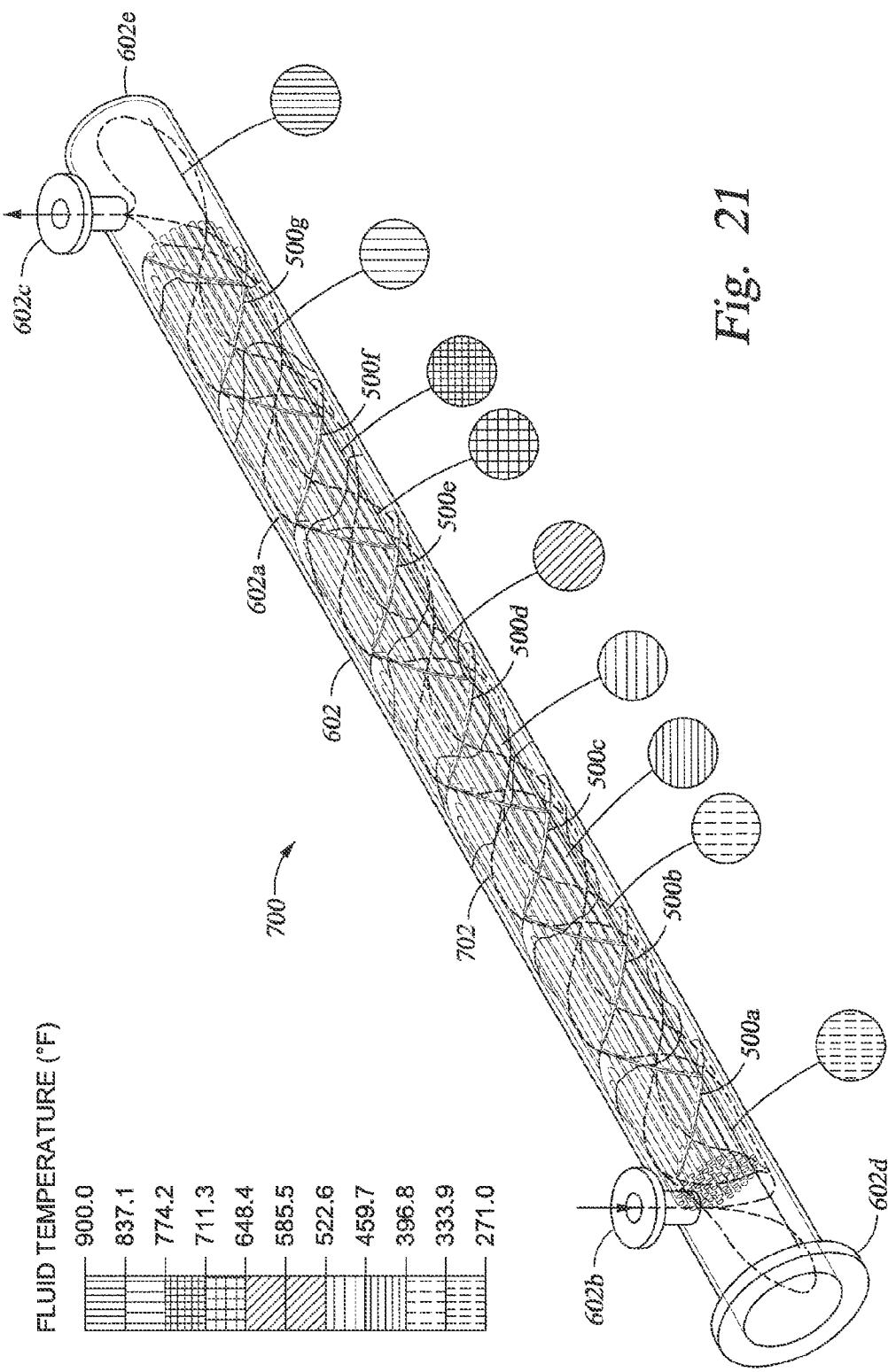
FIG. 21 is a fragmentary perspective view of an experimental embodiment of the fuel gas conditioning system of FIG. 20 that illustrates the operating temperature of the fluidic material.
Figure 22:
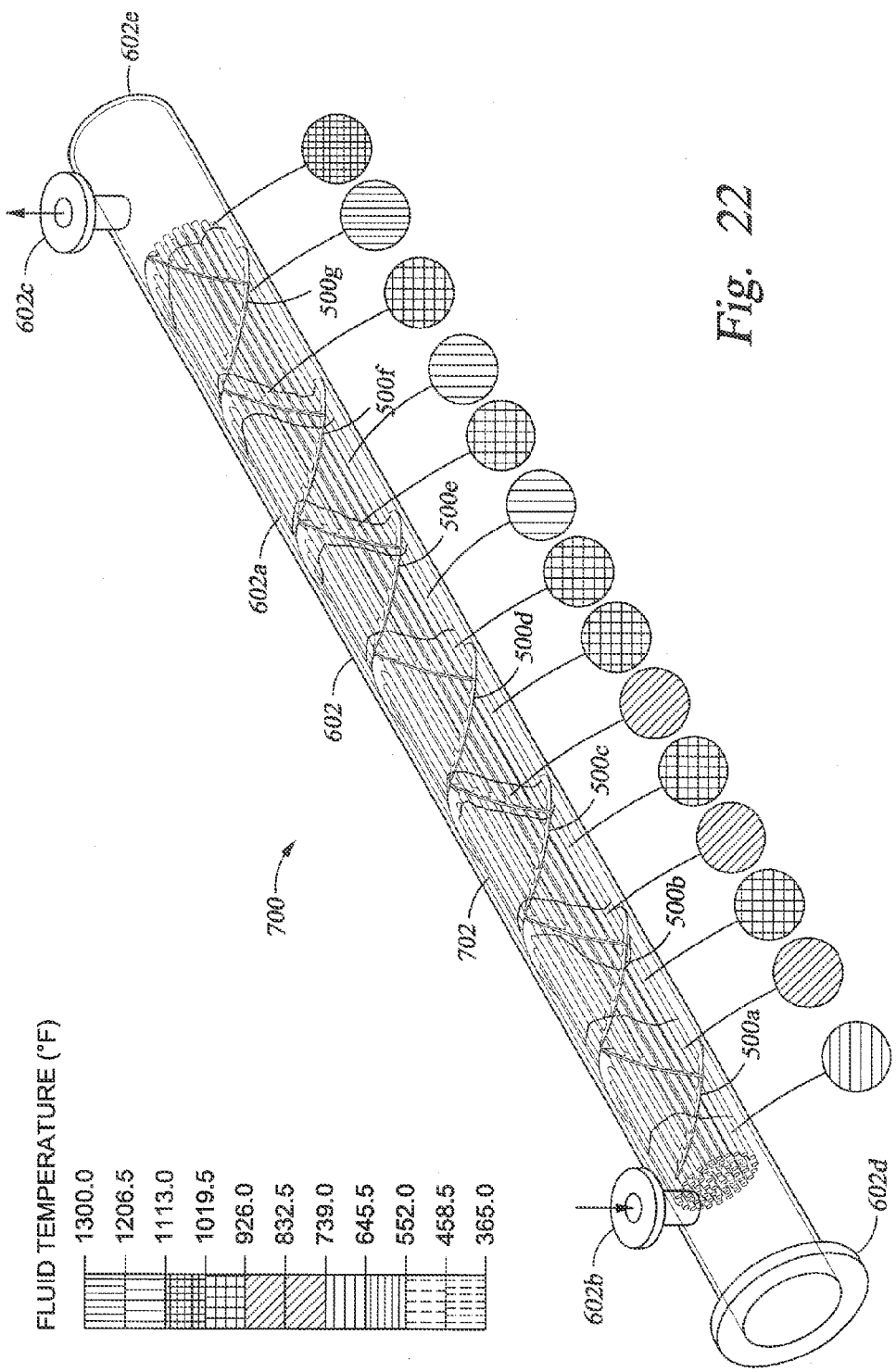
FIG. 22 is a fragmentary perspective view of an experimental embodiment of the fuel gas conditioning system of FIG. 20 that illustrates the operating temperature of the heating elements.
Figure 23:
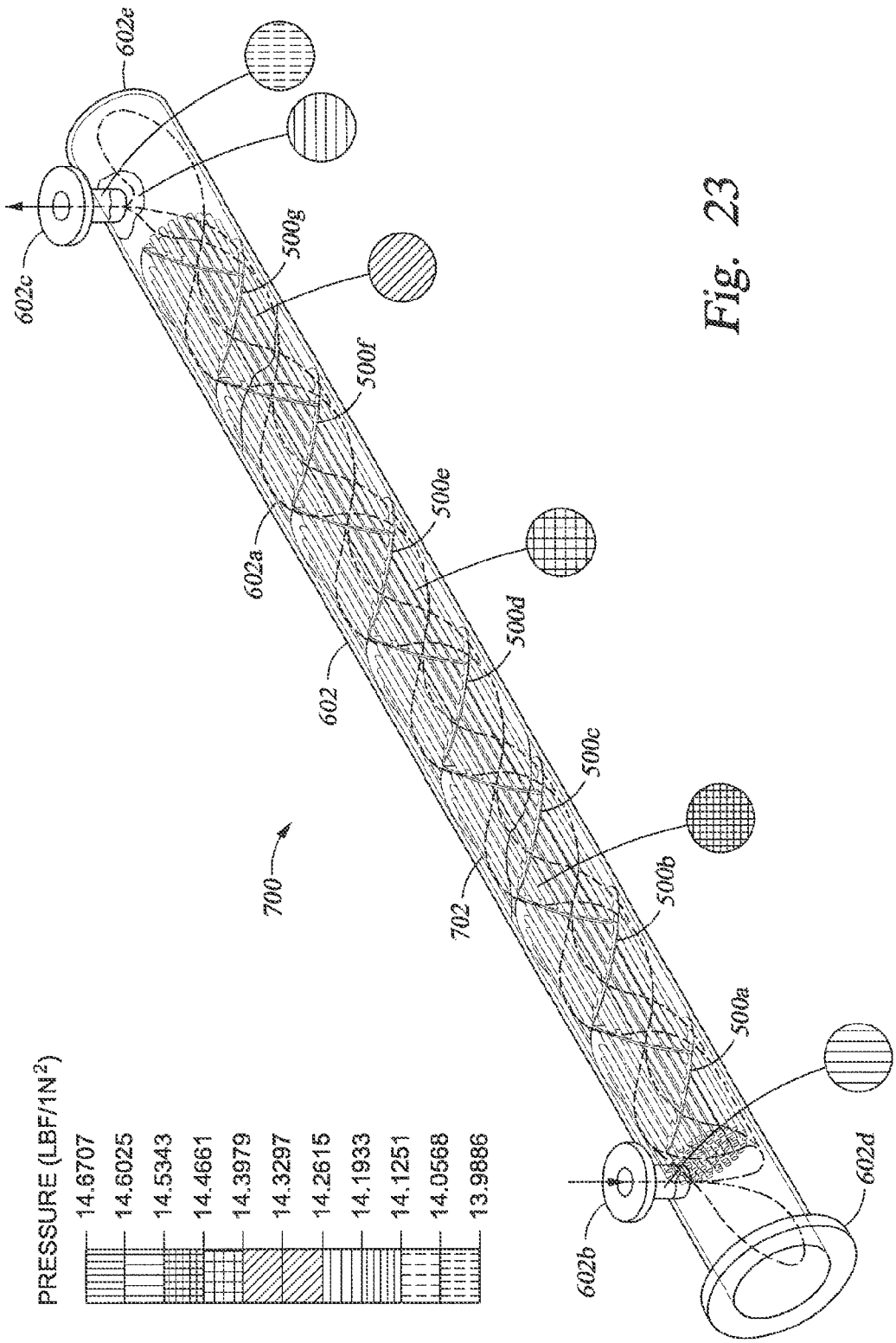
FIG. 23 is a fragmentary perspective view of an experimental embodiment of the fuel gas conditioning system of FIG. 20 that illustrates the operating pressure of the fluidic material.

Referring to FIGS. 21-23, in an exemplary experimental embodiment of the fuel gas conditioning system 800, the operating temperatures of the fluidic materials within the tubular housing 602, the operating temperatures of the heating elements 702 within the tubular housing, and the operating pressures of the fluidic materials within the tubular housing were generated in a computer generated simulation of the operation of the fuel gas conditioning system.

In several exemplary experimental embodiments, the systems 11, 200 and 800 were operated, using predictive computer models of the systems with differing sets of operating parameters, and the results compared, as summarized below:

| | Heat Transfer Coefficient (Btu/(hr*ft$^2$* °F.)) | | |
| --- | --- | --- | --- |
| | System 11 | System 200 | System 800 |
| Operating Parameter Set 1 | 8.87 | 28.8 | 12.3 |
| Operating Parameter Set 2 | 4.42 | 31.4 | 14 |
| Operating Parameter Set 3 | 15.74 | 72 | 33 |

| | Operating Temperature of the Heating Elements (° F.) | | |
| --- | --- | --- | --- |
| | System 11 | System 200 | System 800 |
| Operating Parameter Set 1 | 1207 | 869 | 1090 |
| Operating Parameter Set 2 | 1654 | 942 | 1147 |
| Operating Parameter Set 3 | 987 | 638 | 757 |

The exemplary tabular experimental results for the systems 11, 200 and 800 presented above were unexpected results.

As demonstrated by the exemplary experimental results above, the heat transfer coefficient was highest for the system 200 and lowest for the system 11 when the fluidic materials were being heated by the heating elements, 210 and 702, respectively. However, the range of operating temperatures within the fluidic materials within the system 800 was less than that for the system 200 when the fluidic materials were being heated by the heating elements, 210 and 702, respectively. As a result, the variation in the operating temperatures of the fluidic materials within the system 800 while being heated by the heating elements 702 was less than the variation in the operating temperatures of the fluidic materials within the system 200 while being heated by the heating elements 210. As a result, in the system 800, the heating elements 702 may be operated at a higher operating temperature since stresses that might other damage the heating elements, such as wide temperature variations in the fluidic materials being heated thereby, are reduced versus the system 200.

The exemplary experimental results summarized above further demonstrated that fluidic materials within the system 11 tend to flow in a longitudinal direction along the exterior surfaces of the heating elements, 23 and 51.

The exemplary experimental results summarized above further demonstrated that fluidic materials within the system 200 generally tend to flow in a direction approximately transverse to the exterior surfaces of the heating elements 210. However, as a result, the heat transfer from the heating elements 210 to the fluidic materials may not be uniform which can result in regions within the fluidic materials having different operating temperatures.

The exemplary experimental results summarized above further demonstrated that fluidic materials within the system 800 uniformly tend to flow in a direction approximately transverse to the exterior surfaces of the heating elements 702. In the exemplary experimental embodiment of the system 800, the fluid materials were deflected by the baffle assemblies 500 at angles ranging from 15 to 75 degrees. As a result, the heat transfer from the heating elements 702 to the fluidic materials is typically uniform which results in uniform operating temperatures within the fluidic materials. As a result, the operating temperatures of the heating elements 702 may be significantly higher and the operation of the heating elements is more reliable and failure rates are reduced.

Figure 24:
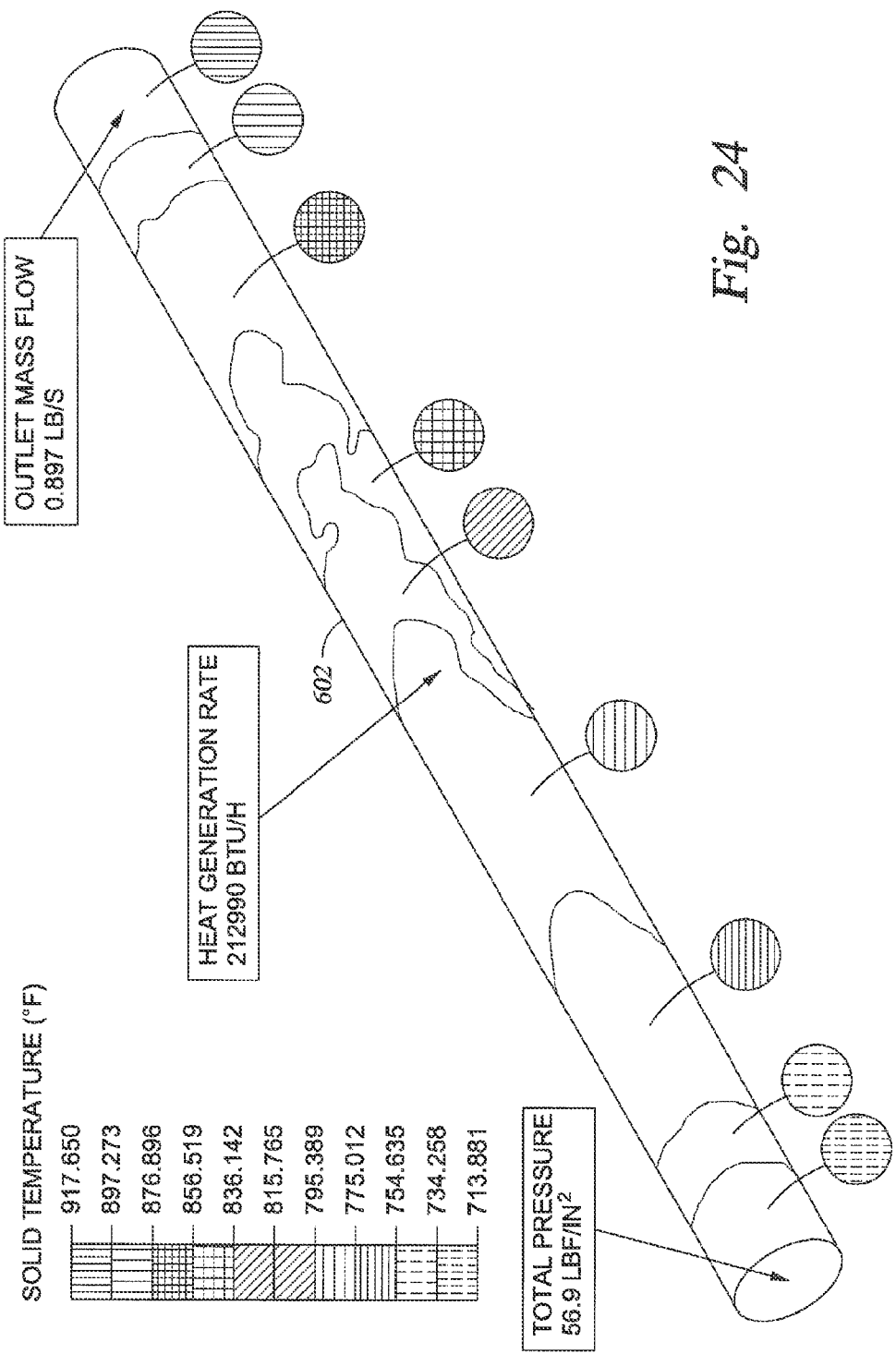
FIG. 24 is a fragmentary perspective view of an experimental embodiment of the fuel gas conditioning system of FIG. 20 that illustrates the operating temperature of the walls of an inner tubular housing that contains heating elements.

In an exemplary experimental embodiment, as illustrated in FIG. 24, the system 800, using the operating parameter set 1, as also summarized above, the operating temperature of the wall of the tubular housing 602 ranged from about 713° F. near the inlet to about 917° F. near the outlet and the heat generation of the heating elements 702 within the tubular housing was about 212,990 Btu/hr. Furthermore, the operating pressure of the fluidic materials near the inlet of the tubular housing 602 was about 56.9 lbf/in$^2$ and the mass flow rate of the fluidic materials near the outlet of the tubular housing was about 0.897 lb/second.

Figure 25:
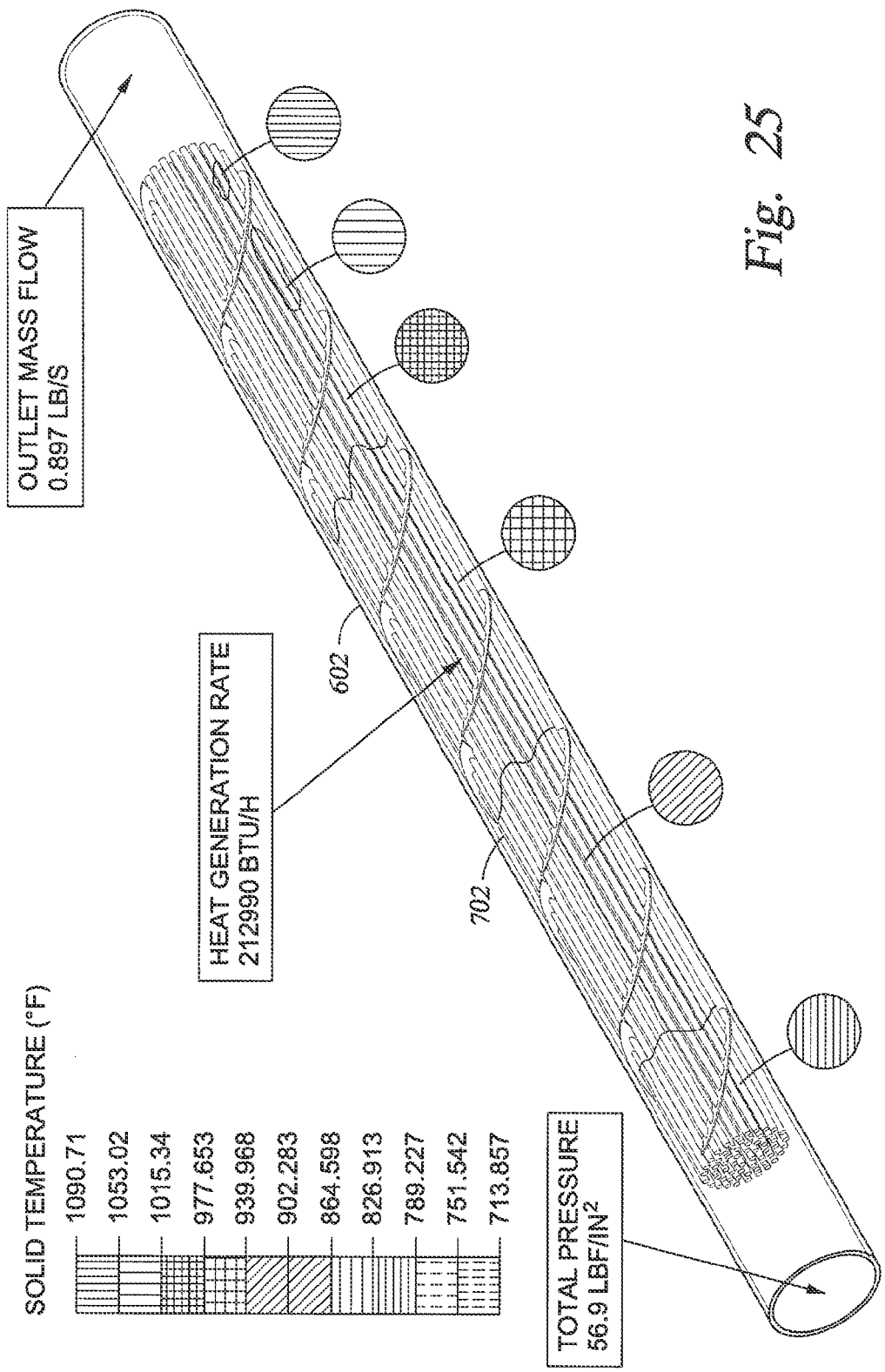
FIG. 25 is a fragmentary perspective view of an experimental embodiment of the fuel gas conditioning system of FIG. 20 that illustrates the operating temperature of the heating elements within an inner tubular housing.

In an exemplary experimental embodiment, as illustrated in FIG. 25, the system 800, using the operating parameter set 1, as also summarized above, the operating temperature of the heating elements 702 within the tubular housing 602 ranged from about 713° F. near the inlet to about 1090° F. near the outlet. Furthermore, as demonstrated in FIG. 25, in the system 800, the operating temperature of the heating elements 702 increase in a substantial even fashion in a direction from the inlet to the outlet of the tubular housing 602.

Figure 26:
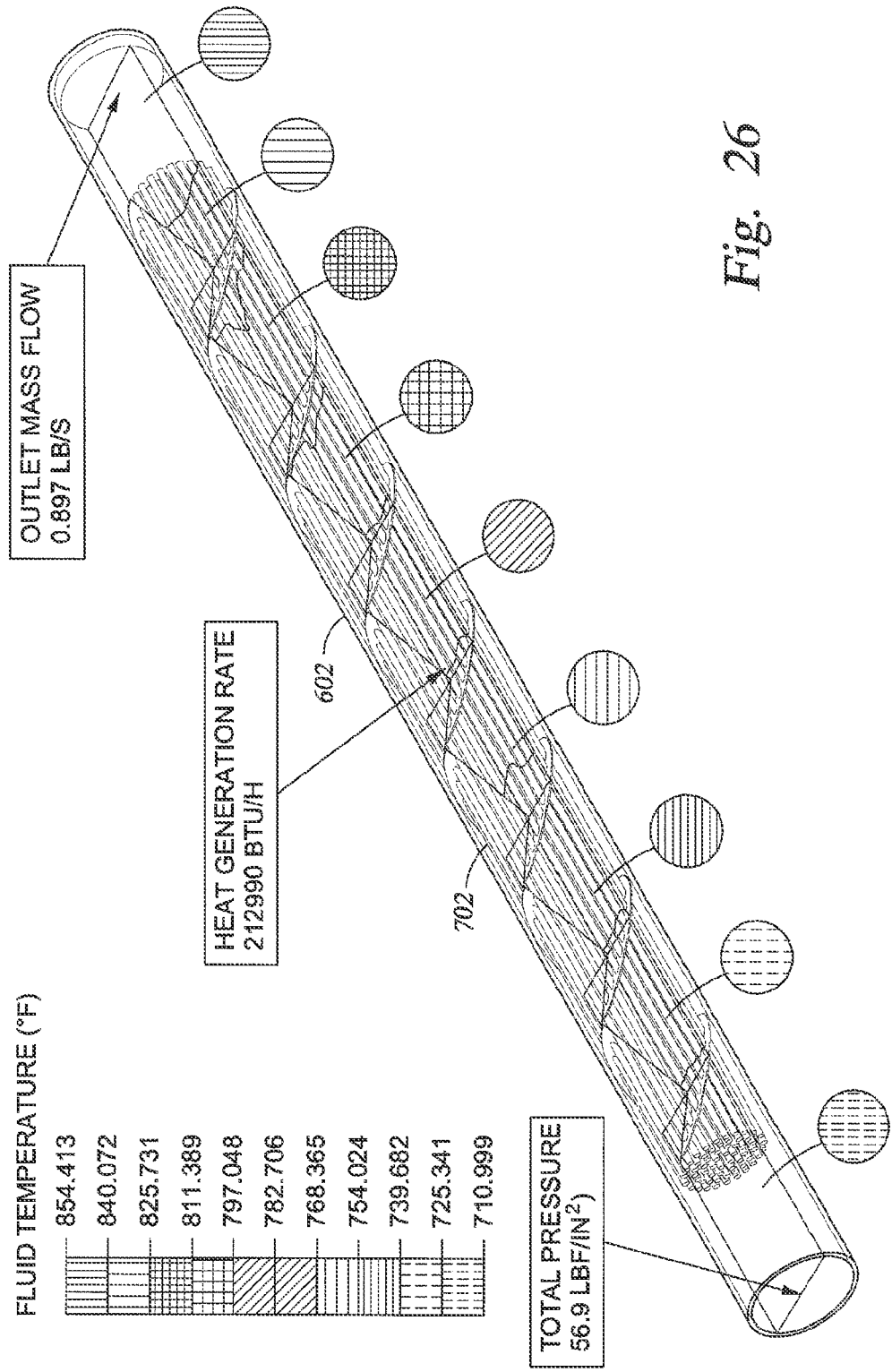
FIG. 26 is a fragmentary perspective view of an experimental embodiment of the fuel gas conditioning system of FIG. 20 that illustrates the operating pressure of the fluidic material that is heated by heating elements within an inner tubular housing.

In an exemplary experimental embodiment, as illustrated in FIG. 26, the system 800, using the operating parameter set 1, as also summarized above, the operating temperature of the fluidic materials within the tubular housing 602 ranged from about 710° F. near the inlet to about 854° F. near the outlet.

Figure 27:
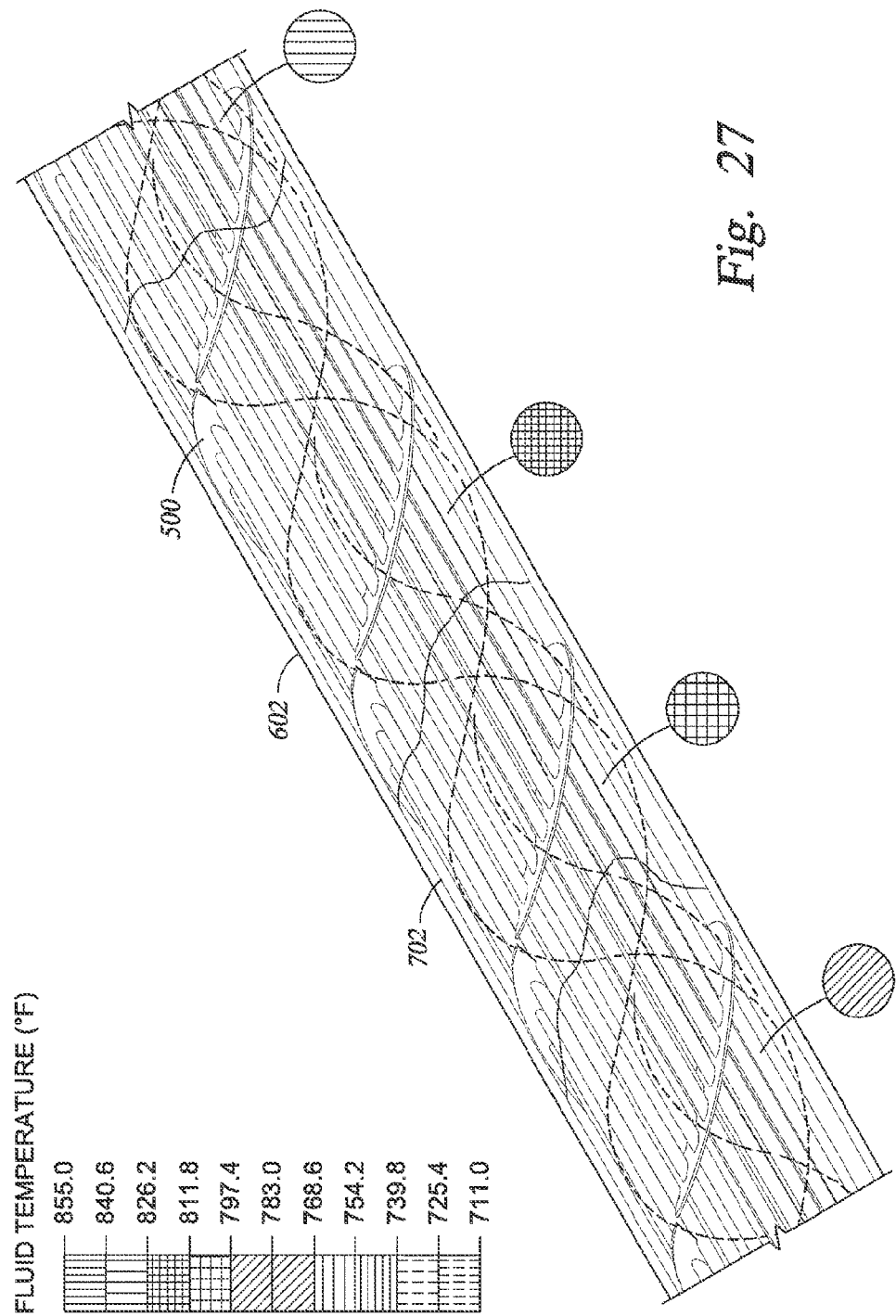
FIG. 27 is a fragmentary perspective view of an experimental embodiment of the fuel gas conditioning system of FIG. 20 that illustrates the flow paths of the fluidic material that is heated by heating elements within an inner tubular housing.

In an exemplary experimental embodiment, as illustrated in FIG. 27, the system 800, using the operating parameter set 1, as also summarized above, the fluidic materials within the tubular housing 602 are deflected by the baffle assemblies 500 to flow in directions substantially transverse to the heating elements 702.

Figure 28:
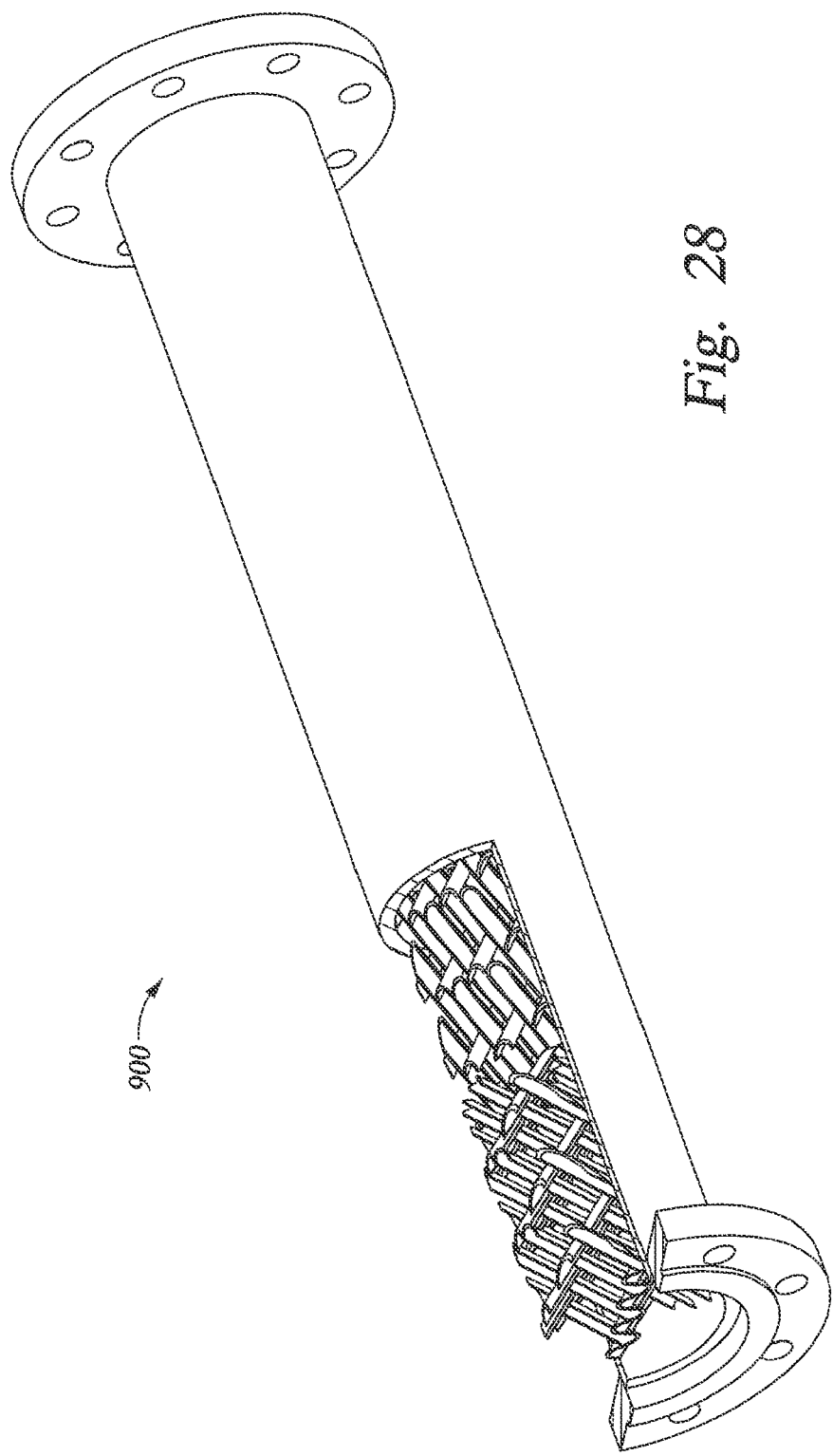
FIGS. 28-30 are illustrations of exemplary embodiments of baffle assemblies.
Figure 29:
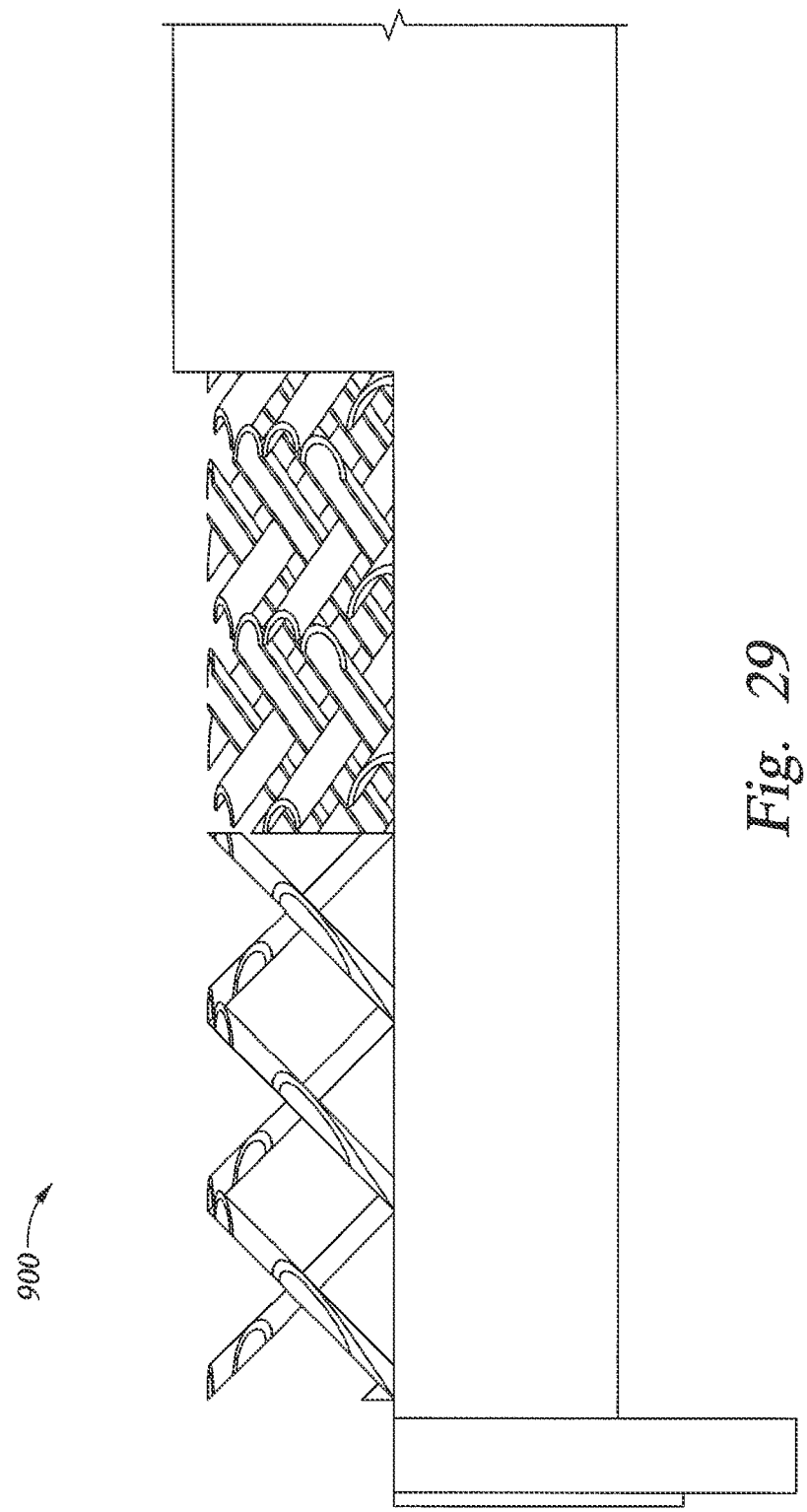
Figure 30:
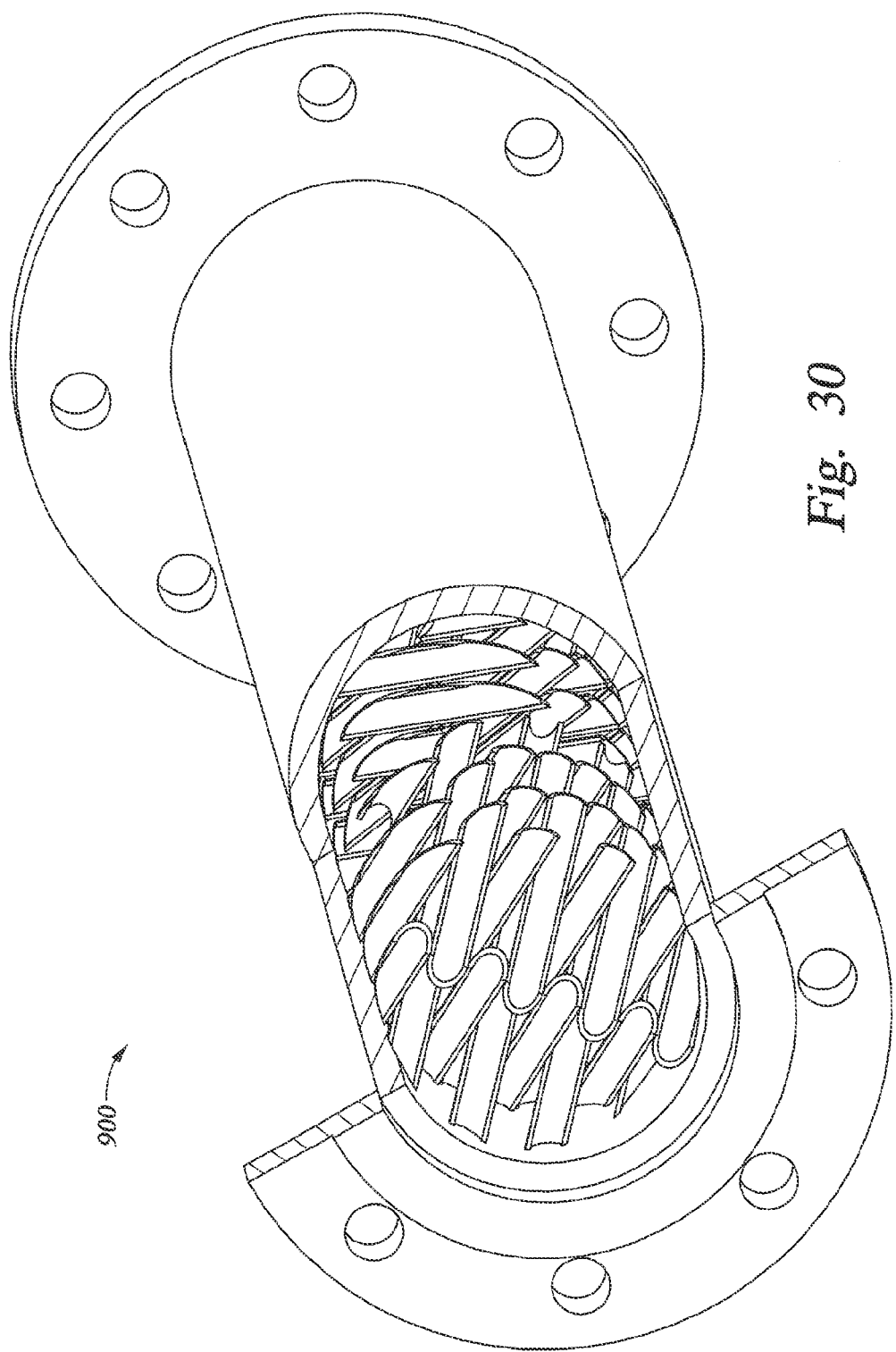

Referring now to FIGS. 28-30, several exemplary embodiments of tubular housings that include baffle assemblies 900 for shearing the flow of fluidic materials therein are illustrated. The baffle assemblies 900 include commercially available static mixers that cause shearing of fluids flowing through the flow passages defined by the baffle assemblies.

Figure 31:
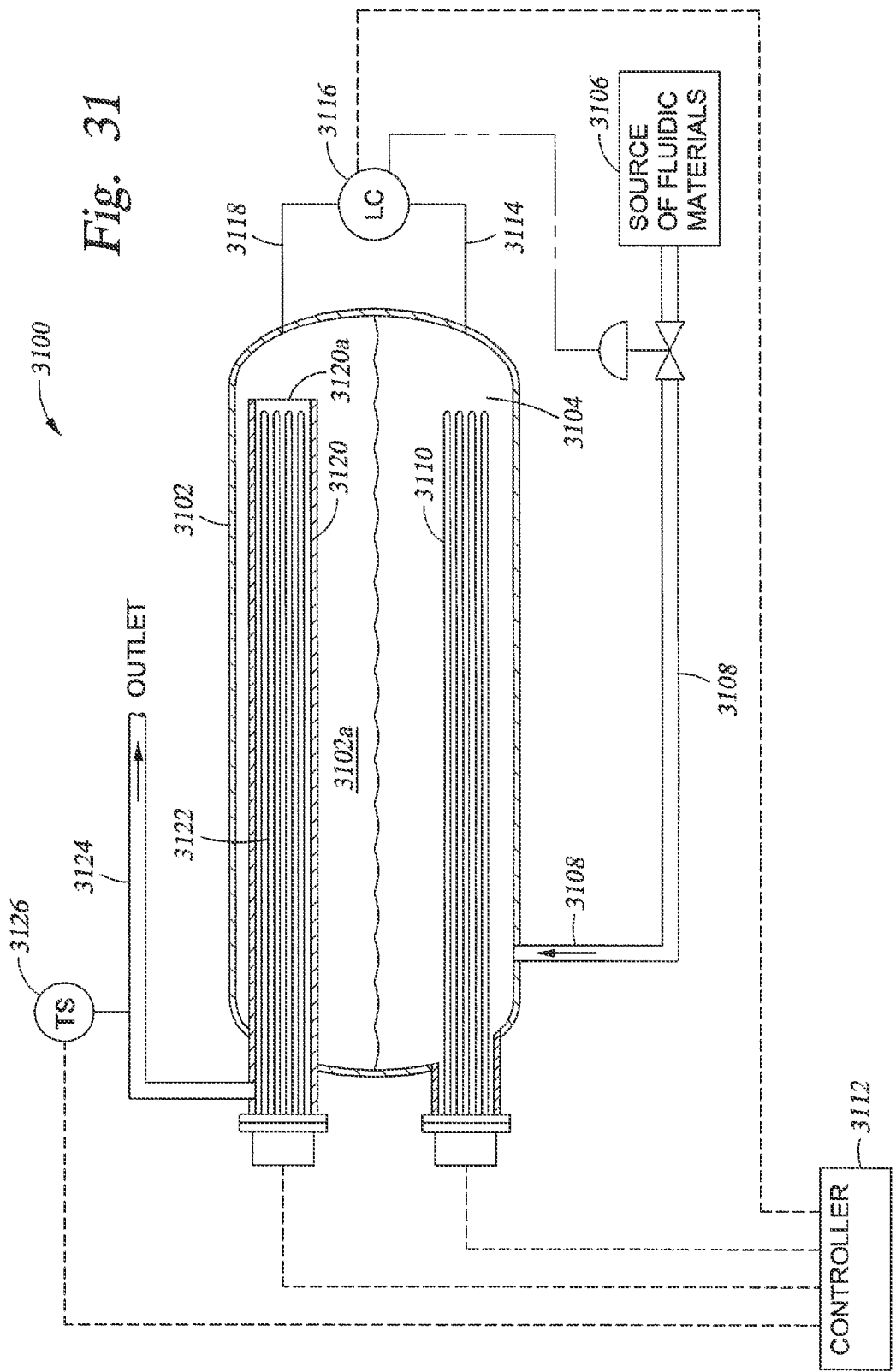
FIG. 31 is a schematic illustration of an exemplary embodiment of a system for heating and vaporizing fluidic materials.

Referring now to FIG. 31, an exemplary embodiment of a system 3100 for heating and vaporizing fluidic materials includes a vessel 3102 that defines an inner chamber 3102a for containing fluidic materials 3104. A source 3106 of fluidic materials is operably coupled to a lower end portion of the vessel 3102 by an inlet passage 3108. One or more heater elements 3110 are positioned within the lower end portion of the vessel 3102 which are also operably coupled to a controller 3112 for controlling the operation of the heater elements.

A passage 3114 connects the lower end portion of the vessel 3102 with a level controller 3116 that is operably coupled to the controller 3112. A passage 3118 connects the level controller 3116 with an upper end portion of the vessel 3102 proximate an open end 3120a of a vessel 3120 positioned in the upper end portion of the vessel 3102. In an exemplary embodiment, the level controller 3116 includes one or more flow control valves for controlling the flow of fluidic materials from the passage 3114 to the passage 3118. One or more heater elements 3122 are positioned within the vessel 3120 which are also operably coupled to a controller 3112 for controlling the operation of the heater elements.

A passage 3124 connects another end portion of the vessel 3120 for exhausting fluidic materials from the system 3100 for use by another device. A temperature sensor 3126 is operably coupled to the passage 3124 and the controller 3112 for generating signals representative of the operating temperature of the fluidic materials within the passage 3124.

In an exemplary embodiment, during the operation of the system 3100, fluidic materials are conveyed from the source 3106 through the passage 3108 and into the lower end portion of the vessel 3102. In an exemplary embodiment, the fluidic materials within the source 3106 may includes liquid and/or gaseous materials. Within the vessel 3102, the fluidic materials are heated by operation of the heater elements 3110 under the control of the controller 3112. In an exemplary embodiment, heating of the fluidic materials within the lower end portion of the vessel 3102 by operation of the heater elements 3110 pressurizes the inner chamber 3102a of the vessel and may also, at least to some extent, vaporize at least a portion of the fluidic materials therein.

In an exemplary embodiment, fluidic materials within the lower end portion of the vessel 3102 may then be conveyed into the interior of the upper end of the vessel 3102a wherein at least a portion of the fluidic materials may enter the open end 3120a of the vessel 3120 through the passages 3114 and 3118 by operation of the level controller 3116 under the control of the controller 3112. The fluidic materials that are conveyed into the interior of the vessel 3120 are then heated by operation of the heater elements 3122. In an exemplary embodiment, heating of the fluidic materials within the interior of the vessel 3120 by operation of the heater elements 3122 will further pressurize the fluidic materials and may also completely vaporize the materials therein.

The materials within the interior of the vessel 3120 may then be conveyed out of the vessel through the passage 3124 for further processing and/or use. In an exemplary embodiment, the operating temperature of the materials within the passage 3124 are monitored by the temperature sensor 3126. In this manner, feedback control of the system 3100 may be provided in which a desired operating temperature of the materials within the passage 3124 is used as a set point in a feedback control system implemented by the controller 3112 that may, for example, be a second order feedback control system.

Figure 32:
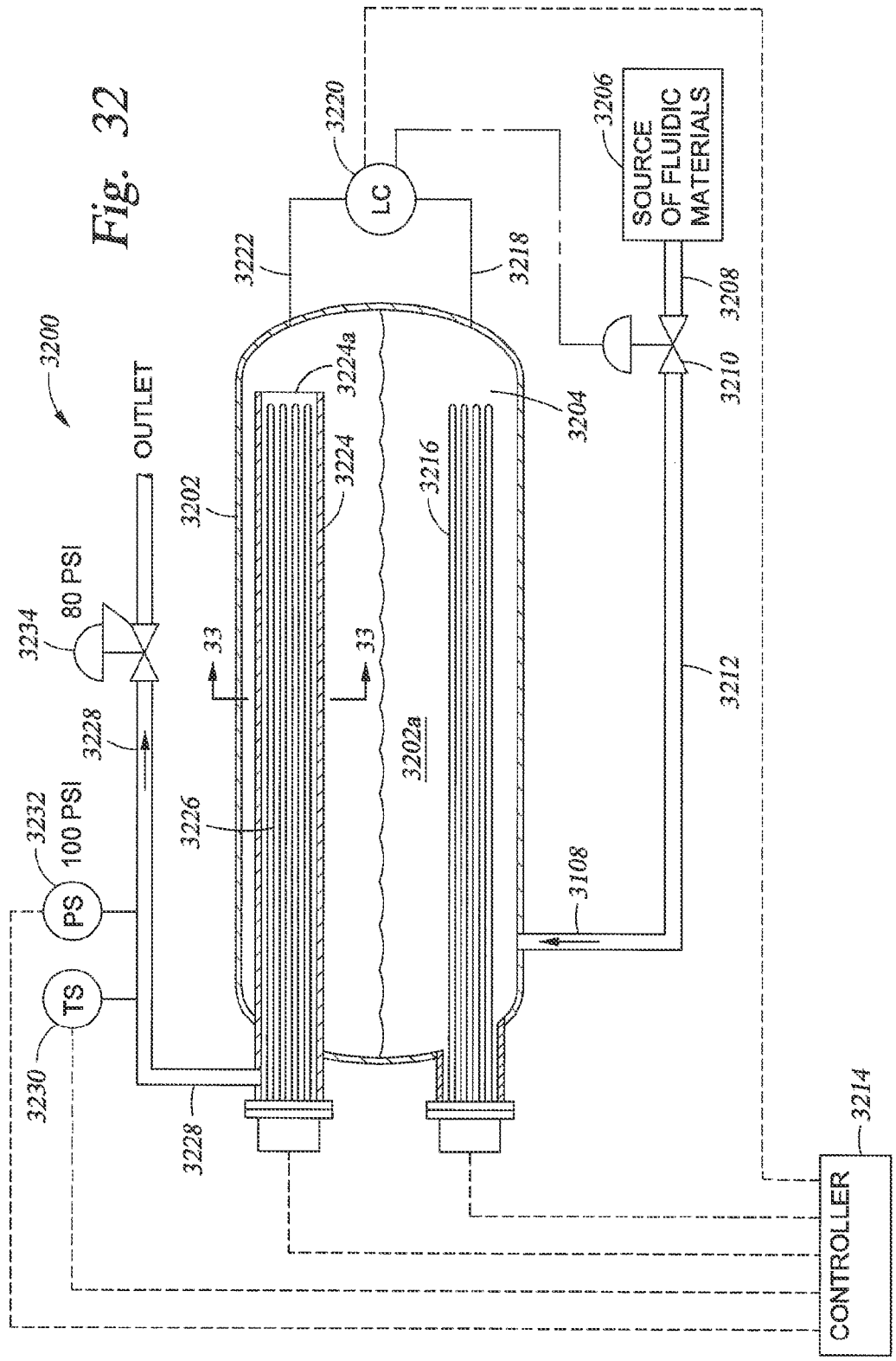
FIG. 32 is a schematic illustration of an exemplary embodiment of a system for heating and vaporizing fluidic materials.
Figure 33:
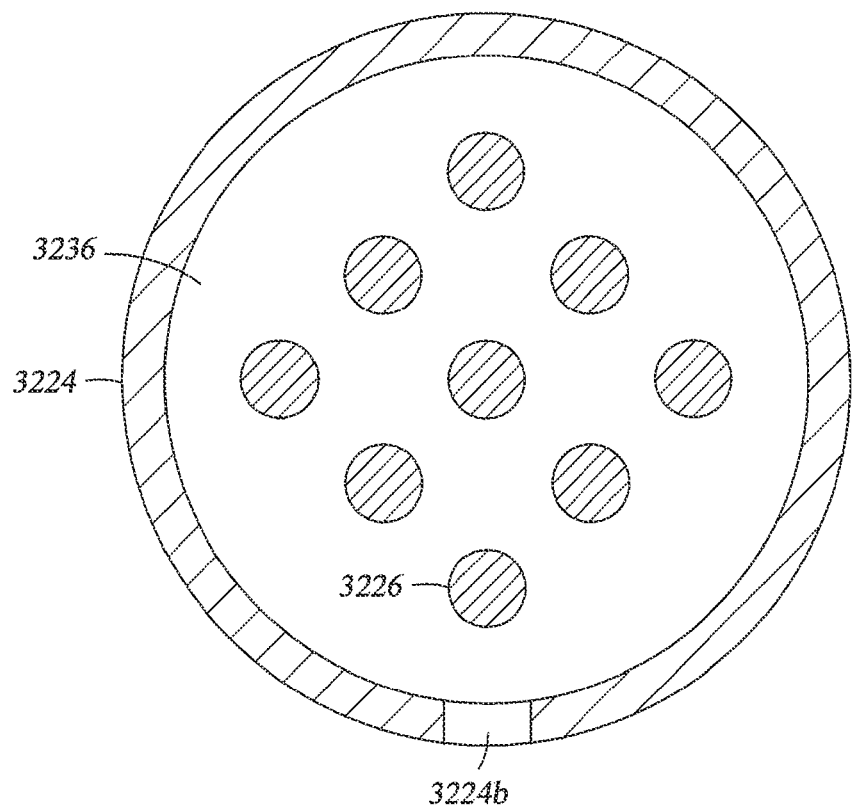
FIG. 33 is a fragmentary cross sectional view of the vessel, heater elements and coalescing filter material of the system of FIG. 32.

Referring now to FIGS. 32 and 33, an exemplary embodiment of a system 3200 for heating and vaporizing fluidic materials includes a vessel 3202 that defines an inner chamber 3202a for containing fluidic materials 3204. A source 3206 of fluidic materials is operably coupled to a lower end portion of the vessel 3202 by an inlet passage 3208, a flow control valve 3210 and an inlet passage 3212. In an exemplary embodiment, the flow control valve 3210 is also operably coupled to a controller 3214 for controlling the operation of the flow control valve. One or more heater elements 3216 are positioned within the lower end portion of the vessel 3202 which are also operably coupled to the controller 3214 for controlling the operation of the heater elements.

A passage 3218 connects the lower end portion of the vessel 3202 with a level controller 3220 that may also be operably coupled to the controller 3214. A passage 3222 connects the level controller 3220 with an upper end portion of the vessel 3202 proximate an open end 3224a of a vessel 3224 positioned with an upper portion of the vessel 3202. In an exemplary embodiment, the level controller 3220 includes one or more flow control valves for controlling the flow of fluidic materials from the passage 3218 to the passage 3222. One or more heater elements 3226 are positioned within the vessel 3224 which are also operably coupled to the controller 3214 for controlling the operation of the heater elements.

A passage 3228 connects another end portion of the vessel 3224 for exhausting fluidic materials from the system 3200 for use by another device. A temperature sensor 3230 and a pressure sensor 3232 are operably coupled to the passage 3228 and the controller 3214 for generating signals representative of the operating temperature and pressure of the fluidic materials within the passage 3228. A pressure relief valve 3234 is also operably coupled to the passage 3228 for releasing pressure from the passage if the operating pressure exceeds the set point of the valve.

In an exemplary embodiment, as illustrated in FIG. 33, in an exemplary embodiment, the vessel 3224 includes at least one drainage passage 3224b defined in a lower end portion of the vessel for allowing liquids to drain out of the vessel 3224. In an exemplary embodiment, the vessel 3224 further includes a coalescing filter material 3236 positioned within the vessel that also surrounds at least some of the heater elements 3226 positioned within the vessel for enhancing the coalescence of liquid droplets within the vessel that may then be exhausted from the vessel through the passages 3224b.

In an exemplary embodiment, during the operation of the system 3200, fluidic materials are conveyed from the source 3206 through the passage 3208, the flow control valve 3210 and the passage 3212 and into the lower end portion of the vessel 3202. In an exemplary embodiment, the fluidic materials within the source 3206 may includes liquid and/or gaseous materials. Within the vessel 3202, the fluidic materials are heated by operation of the heater elements 3216 under the control of the controller 3214. In an exemplary embodiment, heating of the fluidic materials within the lower end portion of the vessel 3202 by operation of the heater elements 3216 pressurizes the inner chamber 3202a of the vessel and may also, at least to some extent, vaporize at least a portion of the fluidic materials therein.

In an exemplary embodiment, fluidic materials within the lower end portion of the vessel 3202 may then be conveyed into the interior of the upper end portion of the vessel 3202 through the passages 3218 and 3222 by operation of the level controller 3220 under the control of the controller 3214. In an exemplary embodiment, at least a portion of the fluidic materials that are conveyed into the interior of the upper end portion of the vessel 3202 may thereby enter the open end 3224a of the vessel 3224. In an exemplary embodiment, the amount of fluidic materials within the vessel 3202 is further controlled by operation of the flow control valve 3210 and/or the level controller 3220.

The fluidic materials that are conveyed into the interior of the vessel 3224 are then heated by operation of the heater elements 3226. In an exemplary embodiment, heating of the fluidic materials within the interior of the vessel 3224 by operation of the heater elements 3226 will further pressurize the fluidic materials and may also completely vaporize the materials therein. In an exemplary embodiment, liquid droplets may coalesce on the coalescing filter 3236 within the vessel 3224 and be exhausted from the vessel through the passages 3224b. In an exemplary embodiment, during operation, the coalescing filter 3236 permits more heavy components, e.g., liquid droplets, to be separated from the flow stream which may also lower the dew point of the remaining components of the flow stream.

The materials within the interior of the vessel 3224 may then be conveyed out of the vessel through the passage 3228 for further processing and/or use. In an exemplary embodiment, the operating temperature and/or pressure of the materials within the passage 3228 are monitored by the temperature and pressure sensors, 3230 and 3232. In this manner, feedback control of the system 3200 may be provided in which a desired operating temperature and/or pressure of the materials within the passage 3228 are used as set points in a feedback control system implemented by the controller 3214 that may, for example, be a second order feedback control system.

In an exemplary embodiment, the systems 3100 and 3200 may include or omit one or more elements of the exemplary embodiments of the present disclosure.

Figure 34:
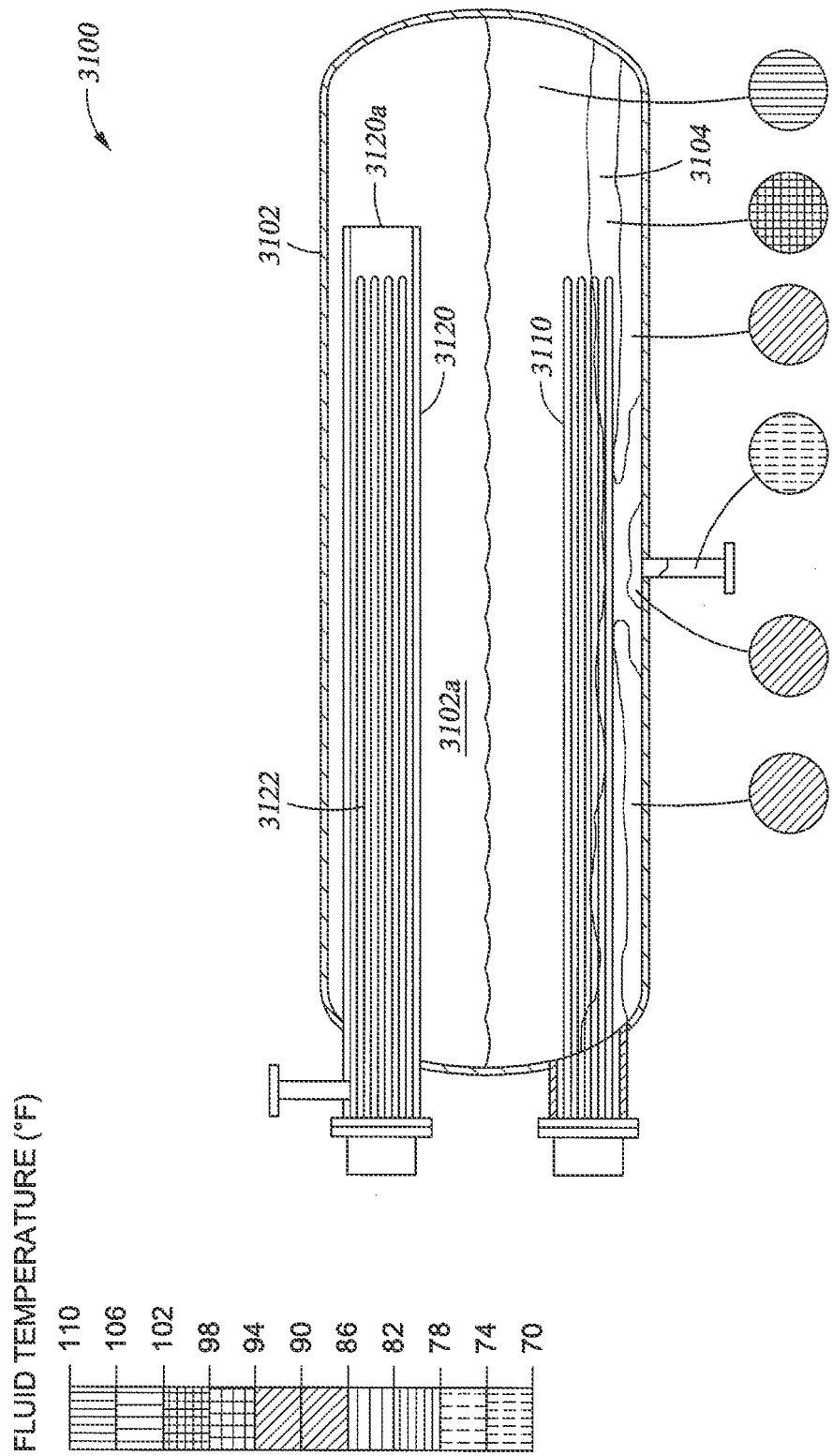
FIG. 34 is an illustration of an exemplary experimental embodiment of the system of FIG. 31.

Referring now to FIG. 34, an exemplary experimental embodiment of the system 3100 was created using a numerical model that was predictive of operational results that illustrates heating and boiling of the fluidic materials 3104 within the inner chamber 3102a of the vessel 3102.

Figure 35:
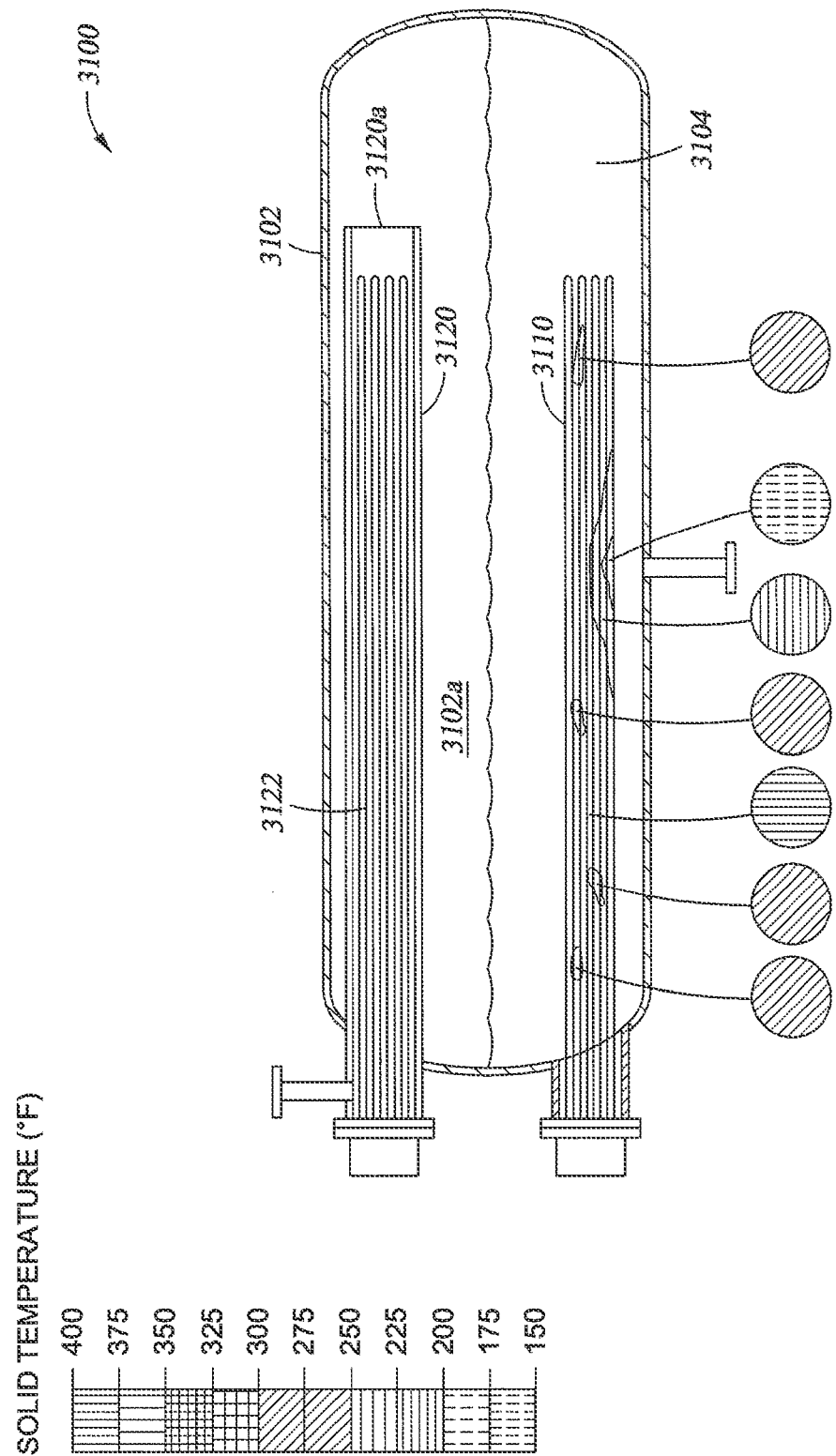
FIG. 35 is an illustration of an exemplary experimental embodiment of the system of FIG. 31.

Referring now to FIG. 35, an exemplary experimental embodiment of the system 3100 was created using a numerical model that was predictive of operational results that illustrates the operating temperature of the heater elements 3110 during the heating and boiling of the fluidic materials 3104 within the inner chamber 3102a of the vessel 3102.

Figure 36:
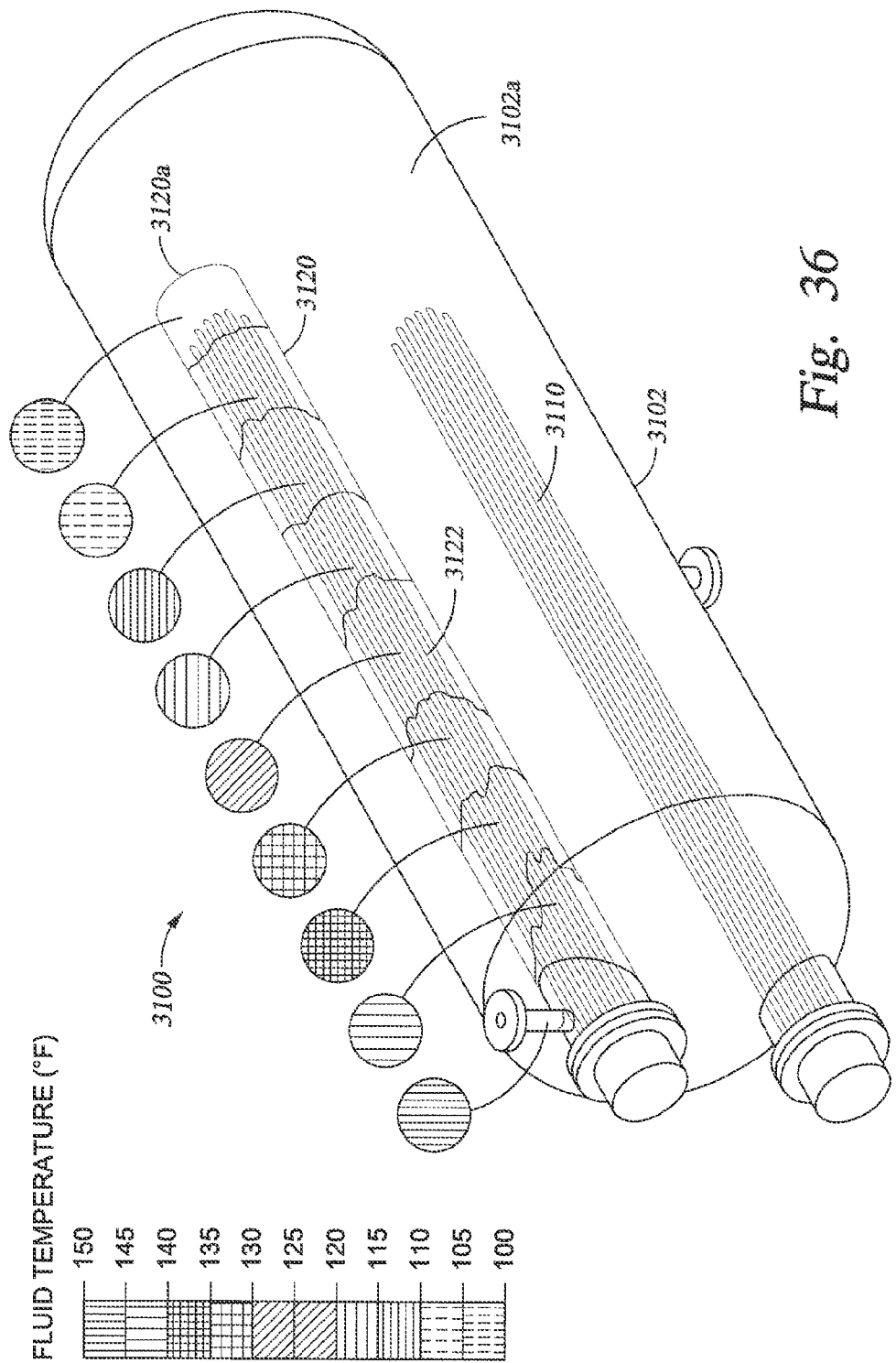
FIG. 36 is an illustration of an exemplary experimental embodiment of the system of FIG. 31.

Referring now to FIG. 36, an exemplary experimental embodiment of the system 3100 was created using a numerical model that was predictive of operational results that illustrates the operating temperature of the superheated gas within the inner chamber 3102a of the vessel 3102 and within the vessel 3120.

Figure 37:
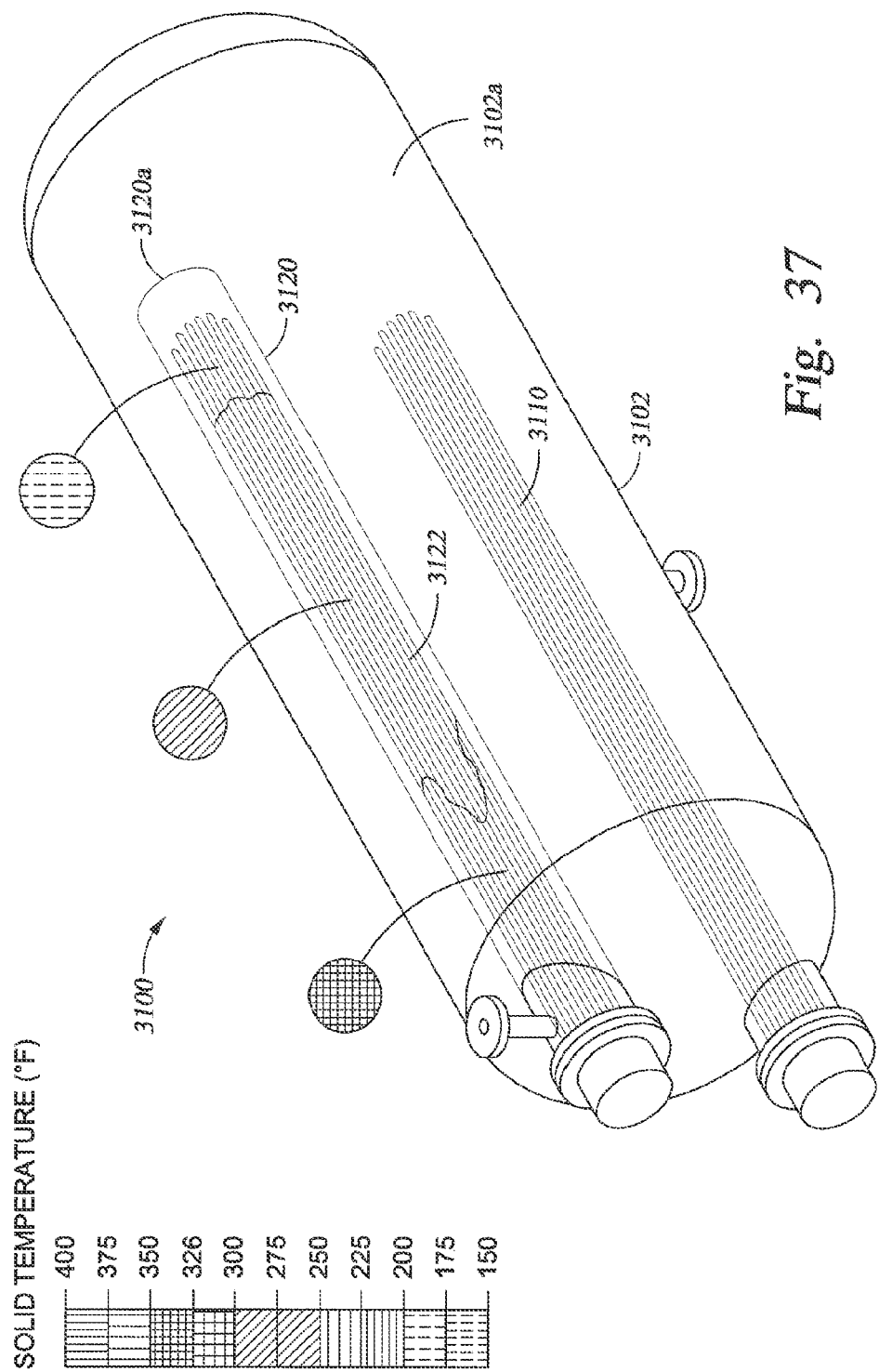
FIG. 37 is an illustration of an exemplary experimental embodiment of the system of FIG. 31.

Referring now to FIG. 37, an exemplary experimental embodiment of the system 3100 was created using a numerical model that was predictive of operational results that illustrates the operating temperature of the heating elements 3122 within the vessel 3120 during the superheating of the gas within the inner chamber 3102a of the vessel 3102 and within the vessel 3120.

The exemplary experimental results illustrated in FIGS. 34-37 were unexpected.

In an exemplary embodiment, during operation of the system 3100, sub-cooled liquid enters the bottom portion of the vessel 3102. The heating elements 3110 then raise enthalpy of the liquid until it boils. Saturated vapor then enters the open end 3120a of the vessel 3120. Operation of the heating elements 3122 within the vessel 3120 then superheat the vapor to at least about 50° F. above the dew point.

In an exemplary embodiment, during operation of the system 3200, sub-cooled liquid enters the bottom portion of the vessel 3202. The heating elements 3216 then raise enthalpy of the liquid until it boils. Saturated vapor then enters the open end 3224a of the vessel 3224. Operation of the heating elements 3226 within the vessel 3224 then superheat the vapor to at least about 50° F. above the dew point.

Figure 38:
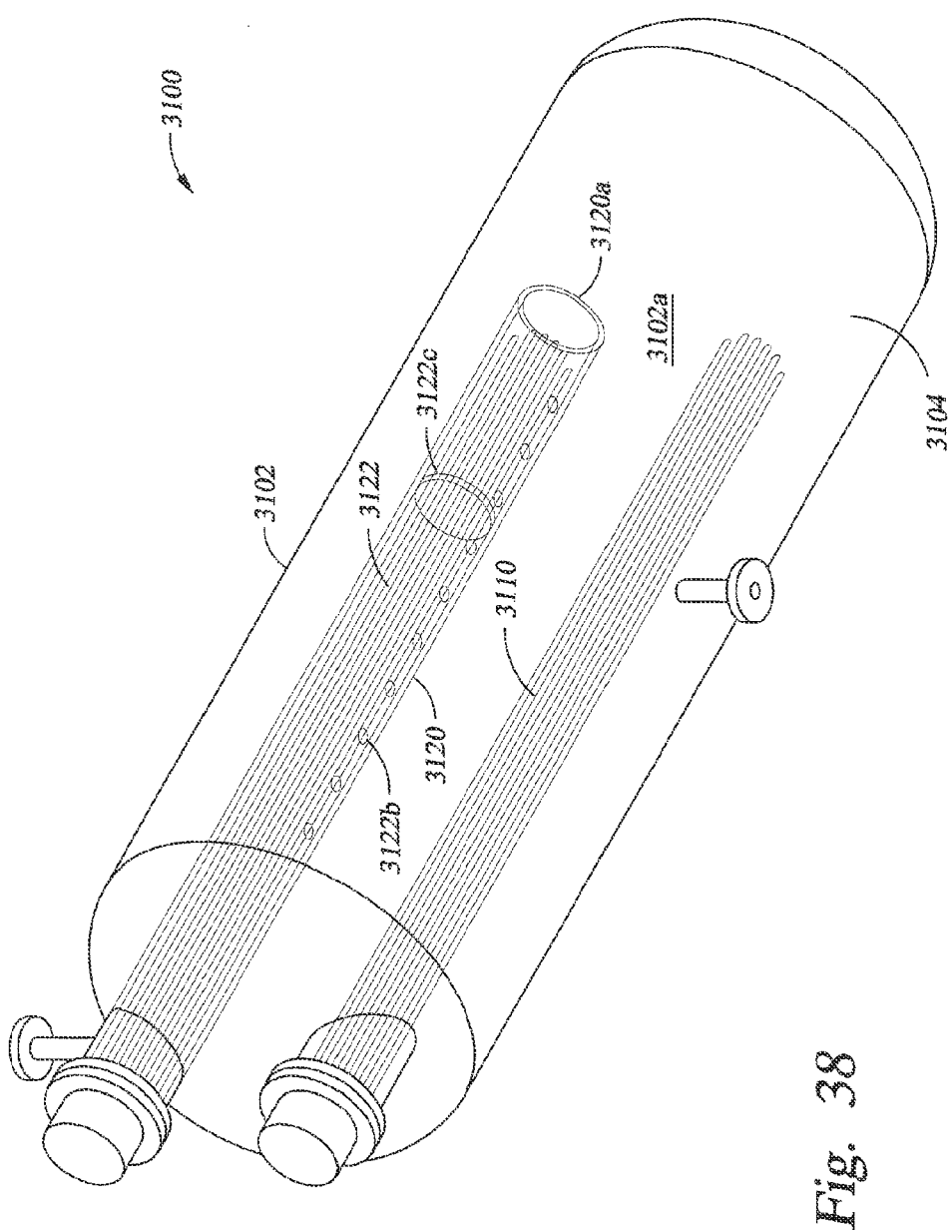
FIG. 38 is a fragmentary schematic illustration of an exemplary embodiment of a system for heating and vaporizing fluidic materials.

In an exemplary embodiment, as illustrated in FIG. 38, the vessel 3120 of the system 3100 that contains the heating elements 3122 includes a plurality of spaced apart slots 3122b on a bottom portion and one or more mesh pads 3122c are positioned within the interior of the vessel 3120. In an exemplary embodiment, during operation of the system 3100, as entrained liquid droplets pass through the heated mesh pad 3122c, the lighter molecules vaporize and the heavier molecules coalesce and fall through the slots 3122b provided in the bottom wall of the vessel 3120. As a result, the separation process yields a greater than one stage of separation, less heat is required to super heat the saturated gas vapor, and the mess pads 3122c enhance the transfer of heat from the heating elements 3122 to the gas vapor.

Figure 39:
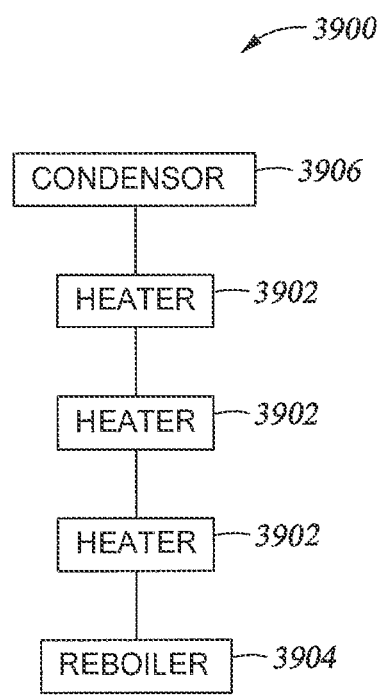
FIG. 39 is a schematic illustration of an exemplary embodiment of a multi-stage distillation column assembly that includes one or more of the heaters 3100 and/or 3200 in series.

Referring now to FIG. 39, an exemplary embodiment of a distillation column assembly 3900 includes a plurality of heaters 3902, one or more of which may include one or more of the systems 3100 and/or 3200, that are coupled in series between a reboiler 3904 and a condenser 3906 to provide a multi-stage distillation column. In particular, the outlet of each of the systems 3100 and/or 3200 are operably coupled to the inlet of the next systems 3100 and/or 3200 in series fashion. The general design and operation of distillation column assemblies, other than the design and operation of the systems 3100 and/or 3200, is well known to persons having ordinary skill in the art. During operation, the outlet of each of the systems 3100 and/or 3200 are used to provide a source of a hydrocarbon fraction. Thus, the systems 3100 and/or 3200 provide a more effective, efficient and controlled substitute for the conventional fractioning stages that are employed in a multi-stage distillation column. In this manner, different hydrocarbon components may be extracted within each heater 3902 of the assembly 3900.

An apparatus for conditioning feed gas has been described that includes an outer tubular housing; an inner tubular housing that defines a passageway positioned within the outer tubular housing, wherein an end of the passageway is adapted to be operably coupled to an outlet stream of fluidic materials; a plurality of spaced apart baffles positioned within the passageway of the inner tubular housing, wherein each baffle defines at least one passageway; one or more heating elements positioned within the passageway of the inner tubular housing, wherein each heating element extends through a corresponding passageway in each of the baffles; and an annular passageway defined between the inner and outer tubular housings, wherein an inlet of the annular passageway is adapted to be operably coupled to an input stream of fluidic material, and wherein an outlet of the annular passageway is operably coupled to another end of the passageway of the inner tubular housing. In an exemplary embodiment, the outer tubular housing ranges from 4 inch, schedule 40 pipe to 24 inch, schedule 40 pipe; and wherein the inner tubular housing ranges from 3 inch, schedule 10 pipe to 20 inch, schedule 10 pipe. In an exemplary embodiment, the outer tubular housing is fabricated from materials selected from the group consisting of low carbon steel, 304 stainless steel, and 304H stainless steel; and the inner tubular housing is fabricated from materials selected from the group consisting of H grade stainless steel, 316H stainless steel, and chromoly steel. In an exemplary embodiment, the spacing of the baffles in a longitudinal direction within the passageway of the inner tubular housing ranges from about 2 to 60 inches. In an exemplary embodiment, the spacing of the baffles in a longitudinal direction within the passageway of the inner tubular housing is about equal to the internal diameter of the inner tubular housing. In an exemplary embodiment, the internal diameters of the passageways of the baffles are greater than the external diameters of the corresponding heating elements. In an exemplary embodiment, the internal diameters of the passageways of the baffles are at least about 10% greater than the external diameters of the corresponding heating elements. In an exemplary embodiment, the number of heating elements ranges from about 3 to 360. In an exemplary embodiment, the average center-to-center spacing of the heating elements ranges from about 1 to 5 inches. In an exemplary embodiment, the outside diameter of the heating elements are about 0.475 inches and the inside diameters of the passages, 214a and 216a, through the baffles, 214 and 216, are about $\frac{1}{16}$ to about $\frac{1}{4}$ of an inch larger. In an exemplary embodiment, the inside diameters of the passages, 214a and 216a, through the baffles, 214 and 216, are at least $\frac{1}{4}$ of an inch larger in diameter to allow for easier assembly.

A method for conditioning feed gas has been described that includes feeding an inlet stream of gas into an outer passageway in a first direction; then feeding the inlet stream of gas into an inner passageway in a second direction, in opposition to the first direction; heating the inlet stream of gas within the inner passageway; and impeding the flow of the inlet stream of gas within the inner passageway. In an exemplary embodiment, the method further includes heating the inlet stream of gas within the outer passageway. In an exemplary embodiment, the method further includes heating the inlet stream of gas within the outer passageway by transmitting heat from the inlet stream of gas within the inner passageway. In an exemplary embodiment, heating the inlet stream of gas within the inner passageway includes positioning a plurality of heating elements within the inner passageway. In an exemplary embodiment, impeding the flow of the inlet stream of gas within the inner passageway includes constricting the flow of the inlet stream of gas proximate the heating elements within the inner passageway. In an exemplary embodiment, impeding the flow of the inlet stream of gas within the inner passageway includes constricting the flow of the inlet stream of gas within the inner passageway.

An apparatus for conditioning feed gas has been described that includes an outer tubular housing; an inner tubular housing that defines a passageway and is positioned within the outer tubular housing, wherein an end of the passageway is adapted to be operably coupled to an outlet stream of fluidic materials; a plurality of baffle assemblies positioned within the passageway of the inner tubular housing; one or more heating elements positioned within the passageway of the inner tubular housing; and an annular passageway defined between the inner and outer tubular housings, wherein an inlet of the annular passageway is adapted to be operably coupled to an inlet stream of fluidic material, and wherein an outlet of the annular passageway is operably coupled to another end of the passageway of the inner tubular housing; wherein one or more of the baffle assemblies comprise a first baffle element and a second baffle element; wherein the first and second baffle elements each define one or more passages; wherein the first and second baffle elements are positioned in different planes; and wherein one or more of the heating elements extend through one or more of the passageways of one or more of the first and second baffle elements of one or more of the baffle assemblies. In an exemplary embodiment, the outer tubular housing ranges from 4 inch, schedule 40 pipe to 24 inch, schedule 40 pipe; and wherein the inner tubular housing ranges from 3 inch, schedule 10 pipe to 20 inch, schedule 10 pipe. In an exemplary embodiment, the outer tubular housing is fabricated from materials selected from the group consisting of low carbon steel, 304 stainless steel, and 304H stainless steel; and wherein the inner tubular housing is fabricated from materials selected from the group consisting of H grade stainless steel, 316H stainless steel, and chromoly steel. In an exemplary embodiment, the spacing of the baffles in a longitudinal direction within the passageway of the inner tubular housing ranges from about 2 to 60 inches. In an exemplary embodiment, the spacing of the baffle assemblies in a longitudinal direction within the passageway of the inner tubular housing is about equal to the internal diameter of the inner tubular housing. In an exemplary embodiment, the internal diameters of the passageways of the first and second baffle elements are greater than the external diameters of the corresponding heating elements. In an exemplary embodiment, the internal diameters of the passageways of the first and second baffle elements are at least about 10% greater than the external diameters of the corresponding heating elements. In an exemplary embodiment, the number of heating elements ranges from about 3 to 360. In an exemplary embodiment, the average center to center spacing of the heating elements ranges from about 1 to 5 inches. In an exemplary embodiment, the outside diameters of the heating elements are about 0.475 inches and the inside diameters of the corresponding passageways through the first and second baffle elements are about $\frac{1}{16}$" to about $\frac{1}{4}$" of an inch larger in diameter. In an exemplary embodiment, the inside diameters of the corresponding passageways through the first and second baffle elements are at least about $\frac{1}{4}$ of an inch larger in diameter to allow for easier assembly. In an exemplary embodiment, each of the first and second baffle elements comprise an outer peripheral arcuate portion that mates with the inner tubular housing and another outer peripheral portion that does not mate with the inner tubular housing. In an exemplary embodiment, the baffle assemblies and the inner tubular housing define a serpentine flow path for the passage of fluidic materials therethrough. In an exemplary embodiment, the angular spacing between the planes of the first and second baffle elements ranges from about 15 to 75 degrees. In an exemplary embodiment, the lateral spacing of the baffle assemblies within the passageway of the inner tubular housing ranges from intimate contact to about several times the internal diameter of the inner tubular housing. In an exemplary embodiment, the baffle assemblies are adapted to shear the flow of fluidic materials within the passageway of the inner tubular housing. In an exemplary embodiment, the baffle assemblies are adapted to cause the fluidic materials within the passageway of the inner tubular housing to flow over the heating elements at an angle to the heating elements. In an exemplary embodiment, the baffle assemblies are adapted to cause the fluidic materials within the passageway of the inner tubular housing to mix over the heating elements at an angle to the heating elements.

A method for conditioning feed gas has been described that includes feeding an inlet stream of gas into an outer passageway in a first direction; then feeding the inlet stream of gas into an inner passageway, positioned within the outer passageway, in a second direction, in opposition to the first direction; heating the inlet stream of gas within the inner passageway; and impeding the flow of the inlet stream of gas within the inner passageway using a plurality of baffle elements that are positioned in different planes. In an exemplary embodiment, the method further includes heating the inlet stream of gas within the outer passageway. In an exemplary embodiment, the method further includes heating the inlet stream of gas within the outer passageway by transmitting heat from the inlet stream of gas within the inner passageway. In an exemplary embodiment, heating the inlet stream of gas within the inner passageway includes positioning a plurality of heating elements within the inner passageway. In an exemplary embodiment, impeding the flow of the inlet stream of gas within the inner passageway includes constricting the flow of the inlet stream of gas proximate the heating elements within the inner passageway. In an exemplary embodiment, impeding the flow of the inlet stream of gas within the inner passageway includes constricting the flow of the inlet stream of gas within the inner passageway. In an exemplary embodiment, impeding the flow of the inlet stream of gas within the inner passageway includes creating a serpentine flow of the inlet stream of gas within the inner passageway. In an exemplary embodiment, impeding the flow of the inlet stream of gas within the inner passageway further includes constricting the flow of the inlet stream of gas proximate the heating elements within the inner passageway. In an exemplary embodiment, the angular spacing between the planes of the baffle elements ranges from about 15 to 75 degrees. In an exemplary embodiment, the lateral spacing of the baffle elements within the inner passageway ranges from intimate contact to about several times the internal diameter of the inner tubular housing. In an exemplary embodiment, the method further includes shearing the flow of the inlet stream of gas within the inner passageway. In an exemplary embodiment, the method further includes flowing the inlet stream of gas within the inner passageway at an angle over one or more heating elements. In an exemplary embodiment, the method further includes mixing the inlet stream of gas within the inner passageway over one or more heating elements. In an exemplary embodiment, heating the inlet stream of gas within the inner passageway includes providing one or more heating elements within the inner passageway; and wherein impeding the flow of the inlet stream of gas within the inner passageway includes causing the inlet stream of gas to flow in a direction transverse to the heating elements.

A system for conditioning feed gas has been described that includes means for feeding an inlet stream of gas into an outer passageway in a first direction; means for then feeding the inlet stream of gas into an inner passageway in a second direction, in opposition to the first direction; means for heating the inlet stream of gas within the inner passageway; and means for impeding the flow of the inlet stream of gas within the inner passageway. In an exemplary embodiment, the system further includes means for heating the inlet stream of gas within the outer passageway. In an exemplary embodiment, the system further includes means for heating the inlet stream of gas within the outer passageway by transmitting heat from the inlet stream of gas within the inner passageway. In an exemplary embodiment, the means for heating the inlet stream of gas within the inner passageway comprises means for positioning a plurality of heating elements within the inner passageway. In an exemplary embodiment, the means for impeding the flow of the inlet stream of gas within the inner passageway comprises means for constricting the flow of the inlet stream of gas proximate the heating elements within the inner passageway. In an exemplary embodiment, the means for impeding the flow of the inlet stream of gas within the inner passageway includes means for constricting the flow of the inlet stream of gas within the inner passageway. In an exemplary embodiment, the means for impeding the flow of the inlet stream of gas within the inner passageway includes means for creating a serpentine flow of the inlet stream of gas within the inner passageway. In an exemplary embodiment, the means for impeding the flow of the inlet stream of gas within the inner passageway further includes means for constricting the flow of the inlet stream of gas proximate the heating elements within the inner passageway. In an exemplary embodiment, the system further includes means for shearing the flow of the inlet stream of gas within the inner passageway. In an exemplary embodiment, the system further includes means for flowing the inlet stream of gas within the inner passageway at an angle to heating elements. In an exemplary embodiment, the system further includes means for mixing the inlet stream of gas within the inner passageway over heating elements. In an exemplary embodiment, means for heating the inlet stream of gas within the inner passageway comprises means for providing one or more heating elements within the inner passageway; and wherein means for impeding the flow of the inlet stream of gas within the inner passageway comprises means for causing the inlet stream of gas to flow in a direction transverse to the heating elements.

A baffle assembly for use in a tubular housing has been described that includes a first baffle element that defines one or more first passageways; a second baffle element that defines one or more second passageways; and a hinge coupled between the first and second baffle elements for permitting the first and second baffle elements to be positioned in different planes; wherein the first baffle element comprises an outer peripheral arcuate portion that mates with a portion of the interior surface of the tubular housing and another peripheral portion that does not mate with the interior surface of the tubular housing; and wherein the second baffle element comprises an outer peripheral arcuate portion that mates with a portion of the interior surface of the tubular housing and another peripheral portion that does not mate with the interior surface of the tubular housing. In an exemplary embodiment, when the first and second baffle elements are positioned in a common plane, the baffle assembly includes a circular outer peripheral profile. In an exemplary embodiment, when the first and second baffle elements are positioned in a common plane, the baffle assembly comprises a semi-circular outer peripheral profile. In an exemplary embodiment, the hinge defines one or more passageways. In an exemplary embodiment, the hinge includes a base member; a first hinge coupled to the base member for pivoting the first baffle element; and a second hinge coupled to the base member for pivoting the second baffle element. In an exemplary embodiment, the baffle assembly further includes a third baffle element pivotally coupled to the hinge that defines one or more third passageways; and a fourth baffle element pivotally coupled to the hinge that defines one or more fourth passageways; wherein the third baffle element comprises an outer peripheral arcuate portion that mates with a portion of the interior surface of the tubular housing and another peripheral portion that does not mate with the interior surface of the tubular housing; and wherein the fourth baffle element comprises an outer peripheral arcuate portion that mates with a portion of the interior surface of the tubular housing and another peripheral portion that does not mate with the interior surface of the tubular housing. In an exemplary embodiment, the first, second, third and further baffle elements may be positioned in corresponding different planes.

A method for conditioning feed gas has been described that includes heating an inlet stream of gas within a passageway; and impeding the flow of the inlet stream of gas within the passageway using a plurality of baffle elements that are positioned in different planes. In an exemplary embodiment, heating the inlet stream of gas within the passageway includes positioning a plurality of heating elements within the passageway. In an exemplary embodiment, impeding the flow of the inlet stream of gas within the passageway includes constricting the flow of the inlet stream of gas proximate the heating elements within the passageway. In an exemplary embodiment, impeding the flow of the inlet stream of gas within the passageway includes constricting the flow of the inlet stream of gas within the passageway. In an exemplary embodiment, impeding the flow of the inlet stream of gas within the passageway includes creating a serpentine flow of the inlet stream of gas within the passageway. In an exemplary embodiment, impeding the flow of the inlet stream of gas within the passageway further includes constricting the flow of the inlet stream of gas proximate the heating elements within the passageway. In an exemplary embodiment, the angular spacing between the planes of the baffle elements ranges from about 15 to 75 degrees. In an exemplary embodiment, the lateral spacing of the baffle elements within the passageway ranges from intimate contact to about several times the internal diameter of the passageway. In an exemplary embodiment, the method further includes shearing the flow of the inlet stream of gas within the passageway. In an exemplary embodiment, the method further includes flowing the inlet stream of gas within the passageway at an angle over one or more heating elements. In an exemplary embodiment, the method further includes mixing the inlet stream of gas within the passageway over one or more heating elements. In an exemplary embodiment, heating the inlet stream of gas within the passageway includes providing one or more heating elements within the passageway; and impeding the flow of the inlet stream of gas within the passageway includes causing the inlet stream of gas to flow in a direction transverse to the heating elements.

A system for conditioning feed gas has been described that includes means for heating an inlet stream of gas within a passageway; and means for impeding the flow of the inlet stream of gas within the passageway using a plurality of baffle elements that are positioned in different planes. In an exemplary embodiment, the means for heating the inlet stream of gas within the passageway includes means for positioning a plurality of heating elements within the passageway. In an exemplary embodiment, the means for impeding the flow of the inlet stream of gas within the passageway includes means for constricting the flow of the inlet stream of gas proximate the heating elements within the passageway. In an exemplary embodiment, the means for impeding the flow of the inlet stream of gas within the passageway includes means for constricting the flow of the inlet stream of gas within the passageway. In an exemplary embodiment, the means for impeding the flow of the inlet stream of gas within the passageway includes means for creating a serpentine flow of the inlet stream of gas within the passageway. In an exemplary embodiment, the means for impeding the flow of the inlet stream of gas within the passageway further includes means for constricting the flow of the inlet stream of gas proximate the heating elements within the passageway. In an exemplary embodiment, the angular spacing between the planes of the baffle elements ranges from about 15 to 75 degrees. In an exemplary embodiment, the lateral spacing of the baffle elements within the passageway ranges from intimate contact to about several times the internal diameter of the passageway. In an exemplary embodiment, the system further includes means for shearing the flow of the inlet stream of gas within the passageway. In an exemplary embodiment, the system further includes means for flowing the inlet stream of gas within the passageway at an angle over one or more heating elements. In an exemplary embodiment, the system further includes means for mixing the inlet stream of gas within the passageway over one or more heating elements. In an exemplary embodiment, the means for heating the inlet stream of gas within the passageway includes providing one or more heating elements within the passageway; and the means for impeding the flow of the inlet stream of gas within the passageway includes causing the inlet stream of gas to flow in a direction transverse to the heating elements.

An apparatus for conditioning feed gas has been described that includes an outer tubular housing; an inner tubular housing that defines a passageway and is positioned within the outer tubular housing, wherein an end of the passageway is adapted to be operably coupled to an outlet stream of fluidic materials; a plurality of baffle assemblies positioned within the passageway of the inner tubular housing; one or more heating elements positioned within the passageway of the inner tubular housing; and an annular passageway defined between the inner and outer tubular housings, wherein an inlet of the annular passageway is adapted to be operably coupled to an inlet stream of fluidic material, and wherein an outlet of the annular passageway is operably coupled to another end of the passageway of the inner tubular housing; wherein one or more of the baffle assemblies comprise a first baffle element and a second baffle element; wherein the first and second baffle elements each define one or more passages; wherein the first and second baffle elements are positioned in different planes; and wherein one or more of the heating elements extend through one or more of the passageways of one or more of the first and second baffle elements of one or more of the baffle assemblies. In an exemplary embodiment, the outer tubular housing ranges from 4 inch, schedule 40 pipe to 24 inch, schedule 40 pipe; and the inner tubular housing ranges from 3 inch, schedule 10 pipe to 20 inch, schedule 10 pipe. In an exemplary embodiment, the outer tubular housing is fabricated from materials selected from the group consisting of low carbon steel, 304 stainless steel, and 304H stainless steel; and the inner tubular housing is fabricated from materials selected from the group consisting of H grade stainless steel, 316H stainless steel, and chromoly steel. In an exemplary embodiment, the spacing of the baffles in a longitudinal direction within the passageway of the inner tubular housing ranges from about 2 to 60 inches. In an exemplary embodiment, the spacing of the baffle assemblies in a longitudinal direction within the passageway of the inner tubular housing is about equal to the internal diameter of the inner tubular housing. In an exemplar) embodiment, the internal diameters of the passageways of the first and second baffle elements are greater than the external diameters of the corresponding heating elements. In an exemplary embodiment, the internal diameters of the passageways of the first and second baffle elements are at least about 10% greater than the external diameters of the corresponding heating elements. In an exemplary embodiment, the number of heating elements ranges from about 3 to 360. In an exemplary embodiment, the average center to center spacing of the heating elements ranges from about 1 to 5 inches. In an exemplary embodiment, the outside diameters of the heating elements are about 0.475 inches and the inside diameters of the corresponding passageways through the first and second baffle elements are about $\frac{1}{16}$ to about $\frac{1}{4}$ of an inch larger in diameter. In an exemplary embodiment, the inside diameters of the corresponding passageways through the first and second baffle elements are at least about $\frac{1}{4}$ of an inch larger in diameter to allow for easier assembly. In an exemplary embodiment, each of the first and second baffle elements comprise an outer peripheral arcuate portion that mates with the inner tubular housing and another outer peripheral portion that does not mate with the inner tubular housing. In an exemplary embodiment, the baffle assemblies and the inner tubular housing define a serpentine flow path for the passage of fluidic materials therethrough. In an exemplary embodiment, the angular spacing between the planes of the first and second baffle elements ranges from about 15 to 75 degrees. In an exemplary embodiment, the lateral spacing of the baffle assemblies within the passageway of the inner tubular housing ranges from intimate contact to about several times the internal diameter of the inner tubular housing. In an exemplary embodiment, the baffle assemblies are adapted to shear the flow of fluidic materials within the passageway of the inner tubular housing. In an exemplary embodiment, the baffle assemblies are adapted to cause the fluidic materials within the passageway of the inner tubular housing to flow over the heating elements at an angle to the heating elements. In an exemplary embodiment, the baffle assemblies are adapted to cause the fluidic materials within the passageway of the inner tubular housing to mix over the heating elements at an angle to the heating elements. In an exemplary embodiment, a heat transfer coefficient within the inner tubular housing ranges from about 12.3 to about 33 Btu/hr*ft$^2$*° F. In an exemplary embodiment, an operating temperature of the heating elements ranges from about 757 to about 1147° F. In an exemplary embodiment, a heat transfer coefficient within the inner tubular housing ranges from about 12.3 to about 33 Btu/hr*f*° F.; and an operating temperature of the heating elements ranges from about 757 to about 1147° F.

A method for conditioning feed gas has been described that includes feeding an inlet stream of gas into an outer passageway in a first direction; then feeding the inlet stream of gas into an inner passageway, positioned within the outer passageway, in a second direction, in opposition to the first direction; heating the inlet stream of gas within the inner passageway; and impeding the flow of the inlet stream of gas within the inner passageway using a plurality of baffle elements that are positioned in different planes. In an exemplary embodiment, the method further includes heating the inlet stream of gas within the outer passageway. In an exemplary embodiment, the method further includes heating the inlet stream of gas within the outer passageway by transmitting heat from the inlet stream of gas within the inner passageway. In an exemplary embodiment, heating the inlet stream of gas within the inner passageway comprises positioning a plurality of heating elements within the inner passageway. In an exemplary embodiment, impeding the flow of the inlet stream of gas within the inner passageway comprises constricting the flow of the inlet stream of gas proximate the heating elements within the inner passageway. In an exemplary embodiment, impeding the flow of the inlet stream of gas within the inner passageway comprises constricting the flow of the inlet stream of gas within the inner passageway. In an exemplary embodiment, impeding the flow of the inlet stream of gas within the inner passageway comprises creating a serpentine flow of the inlet stream of gas within the inner passageway. In an exemplary embodiment, impeding the flow of the inlet stream of gas within the inner passageway further comprises constricting the flow of the inlet stream of gas proximate the heating elements within the inner passageway. In an exemplary embodiment, the angular spacing between the planes of the baffle elements ranges from about 15 to 75 degrees. In an exemplary embodiment, the lateral spacing of the baffle elements within the inner passageway ranges from intimate contact to about several times the internal diameter of the inner tubular housing. In an exemplary embodiment, the method further includes shearing the flow of the inlet stream of gas within the inner passageway. In an exemplary embodiment, the method further includes flowing the inlet stream of gas within the inner passageway at an angle over one or more heating elements. In an exemplary embodiment, the method further includes mixing the inlet stream of gas within the inner passageway over one or more heating elements. In an exemplary embodiment, heating the inlet stream of gas within the inner passageway comprises providing one or more heating elements within the inner passageway; and impeding the flow of the inlet stream of gas within the inner passageway comprises causing the inlet stream of gas to flow in a direction transverse to the heating elements. In an exemplary embodiment, a heat transfer coefficient within the inner passageway ranges from about 12.3 to about 33 Btu/hr*ft$^2$*° F. In an exemplary embodiment, heating the inlet stream within the inner passageway comprises positioning one or more heating elements within the inner passageway; and wherein an operating temperature of the heating elements ranges from about 757 to about 1147° F. In an exemplary embodiment, heating the inlet stream within the inner passageway comprises positioning one or more heating elements within the inner passageway; a heat transfer coefficient within the inner passageway ranges from about 12.3 to about 33 Btu/hr*ft$^2$*° F.; and an operating temperature of the heating elements ranges from about 757 to about 1147° F.

A system for conditioning feed gas has been described that includes means for feeding an inlet stream of gas into an outer passageway in a first direction; means for then feeding the inlet stream of gas into an inner passageway in a second direction, in opposition to the first direction; means for heating the inlet stream of gas within the inner passageway; and means for impeding the flow of the inlet stream of gas within the inner passageway. In an exemplary embodiment, the system further includes means for heating the inlet stream of gas within the outer passageway. In an exemplary embodiment, the system further includes means for heating the inlet stream of gas within the outer passageway by transmitting heat from the inlet stream of gas within the inner passageway. In an exemplary embodiment, means for heating the inlet stream of gas within the inner passageway comprises means for positioning a plurality of heating elements within the inner passageway. In an exemplary embodiment, means for impeding the flow of the inlet stream of gas within the inner passageway comprises means for constricting the flow of the inlet stream of gas proximate the heating elements within the inner passageway. In an exemplary embodiment, means for impeding the flow of the inlet stream of gas within the inner passageway comprises means for constricting the flow of the inlet stream of gas within the inner passageway. In an exemplary embodiment, means for impeding the flow of the inlet stream of gas within the inner passageway comprises means for creating a serpentine flow of the inlet stream of gas within the inner passageway. In an exemplary embodiment, means for impeding the flow of the inlet stream of gas within the inner passageway comprises means for constricting the flow of the inlet stream of gas proximate the heating elements within the inner passageway. In an exemplary embodiment, the system further includes means for shearing the flow of the inlet stream of gas within the inner passageway. In an exemplary embodiment, the system further includes means for flowing the inlet stream of gas within the inner passageway at an angle to heating elements. In an exemplary embodiment, the system further includes means for mixing the inlet stream of gas within the inner passageway over heating elements. In an exemplary embodiment, means for heating the inlet stream of gas within the inner passageway comprises means for providing one or more heating elements within the inner passageway; and means for impeding the flow of the inlet stream of gas within the inner passageway comprises means for causing the inlet stream of gas to flow in a direction transverse to the heating elements. In an exemplary embodiment, a heat transfer coefficient within the inner passageway ranges from about 12.3 to about 33 Btu/hr*ft*° F. In an exemplary embodiment, an operating temperature of the means for heating the inlet stream of gas within the inner passageway ranges from about 757 to about 1147° F. In an exemplary embodiment, a heat transfer coefficient within the inner passageway ranges from about 12.3 to about 33 Btu/hr*ft*° F.; and an operating temperature of the means for heating the inlet stream of gas within the inner passageway ranges from about 757 to about 1147° F.

A baffle assembly for use in a tubular housing has been described that includes a first baffle element that defines one or more first passageways; a second baffle element that defines one or more second passageways; and a hinge coupled between the first and second baffle elements for permitting the first and second baffle elements to be positioned in different planes; wherein the first baffle element comprises an outer peripheral arcuate portion that mates with a portion of the interior surface of the tubular housing and another peripheral portion that does not mate with the interior surface of the tubular housing; and wherein the second baffle element comprises an outer peripheral arcuate portion that mates with a portion of the interior surface of the tubular housing and another peripheral portion that does not mate with the interior surface of the tubular housing. In an exemplary embodiment, the first and second baffle elements are positioned in a common plane, the baffle assembly comprises a circular outer peripheral profile. In an exemplary embodiment, the first and second baffle elements are positioned in a common plane, the baffle assembly comprises a semi-circular outer peripheral profile. In an exemplary embodiment, the hinge defines one or more passageways. In an exemplary embodiment, the hinge comprises a base member; a first hinge coupled to the base member for pivoting the first baffle element; and a second hinge coupled to the base member for pivoting the second baffle element. In an exemplary embodiment, the baffle assembly further includes a third baffle element pivotally coupled to the hinge that defines one or more third passageways; and a fourth baffle element pivotally coupled to the hinge that defines one or more fourth passageways; wherein the third baffle element comprises an outer peripheral arcuate portion that mates with a portion of the interior surface of the tubular housing and another peripheral portion that does not mate with the interior surface of the tubular housing; and wherein the fourth baffle element comprises an outer peripheral arcuate portion that mates with a portion of the interior surface of the tubular housing and another peripheral portion that does not mate with the interior surface of the tubular housing. In an exemplary embodiment, the first, second, third and further baffle elements may be positioned in corresponding different planes.

A method for controlling the flow of a feed gas through a passageway containing one or more heating elements has been described that includes impeding the flow of the inlet stream of gas within the passageway using a plurality of baffle elements that are positioned in different planes. In an exemplary embodiment, impeding the flow of the inlet stream of gas within the passageway comprises constricting the flow of the inlet stream of gas proximate the heating elements within the passageway. In an exemplary embodiment, impeding the flow of the inlet stream of gas within the passageway comprises constricting the flow of the inlet stream of gas within the passageway. In an exemplary embodiment, impeding the flow of the inlet stream of gas within the passageway comprises creating a serpentine flow of the inlet stream of gas within the passageway. In an exemplary embodiment, impeding the flow of the inlet stream of gas within the passageway further comprises constricting the flow of the inlet stream of gas proximate the heating elements within the passageway. In an exemplary embodiment, the angular spacing between the planes of the baffle elements ranges from about 15 to 75 degrees. In an exemplary embodiment, the lateral spacing of the baffle elements within the passageway ranges from intimate contact to about several times the internal diameter of the passageway. In an exemplary embodiment, the method further includes shearing the flow of the inlet stream of gas within the passageway. In an exemplary embodiment, the method further includes flowing the inlet stream of gas within the passageway at an angle over one or more heating elements. In an exemplary embodiment, the method further includes mixing the inlet stream of gas within the passageway over one or more heating elements. In an exemplary embodiment, impeding the flow of the inlet stream of gas within the passageway comprises causing the inlet stream of gas to flow in a direction transverse to the heating elements.

A system for controlling the flow of a feed gas through a passageway containing one or more heating elements has been described that includes means for introducing the feed gas into the passageway; and means for impeding the flow of the inlet stream of gas within the passageway using a plurality of baffle elements that are positioned in different planes. In an exemplary embodiment, means for impeding the flow of the inlet stream of gas within the passageway comprises means for constricting the flow of the inlet stream of gas proximate the heating elements within the passageway. In an exemplary embodiment, means for impeding the flow of the inlet stream of gas within the passageway comprises means for constricting the flow of the inlet stream of gas within the passageway. In an exemplary embodiment, means for impeding the flow of the inlet stream of gas within the passageway comprises means for creating a serpentine flow of the inlet stream of gas within the passageway. In an exemplary embodiment, means for impeding the flow of the inlet stream of gas within the passageway further comprises means for constricting the flow of the inlet stream of gas proximate the heating elements within the passageway. In an exemplary embodiment, the angular spacing between the planes of the baffle elements ranges from about 15 to 75 degrees. In an exemplary embodiment, the lateral spacing of the baffle elements within the passageway ranges from intimate contact to about several times the internal diameter of the passageway. In an exemplary embodiment the system further includes means for shearing the flow of the inlet stream of gas within the passageway. In an exemplary embodiment, the system further includes means for flowing the inlet stream of gas within the passageway at an angle over one or more heating elements. In an exemplary embodiment, the system further includes means for mixing the inlet stream of gas within the passageway over one or more heating elements. In an exemplary embodiment, means for impeding the flow of the inlet stream of gas within the passageway comprises means for causing the inlet stream of gas to flow in a direction transverse to the heating elements.

An apparatus for conditioning feed gas has been described that includes a tubular housing that defines a passageway, wherein an end of the passageway is adapted to be operably coupled to an inlet stream of fluidic materials and another end of the passageway is adapted to be operably coupled to an outlet stream of materials; a plurality of baffle assemblies positioned within the passageway of the tubular housing; and one or more heating elements positioned within the passageway of the tubular housing; wherein one or more of the baffle assemblies comprise a first baffle element and a second baffle element; wherein the first and second baffle elements each define one or more passages; wherein the first and second baffle elements are positioned in different planes; and wherein one or more of the heating elements extend through one or more of the passageways of one or more of the first and second baffle elements of one or more of the baffle assemblies. In an exemplary embodiment, the spacing of the baffles in a longitudinal direction within the passageway of the tubular housing ranges from about 2 to 60 inches. In an exemplary embodiment, the spacing of the baffle assemblies in a longitudinal direction within the passageway of the tubular housing is about equal to the internal diameter of the tubular housing. In an exemplary embodiment, the internal diameters of the passageways of the first and second baffle elements are greater than the external diameters of the corresponding heating elements. In an exemplary embodiment, the internal diameters of the passageways of the first and second baffle elements are at least about 10%, greater than the external diameters of the corresponding heating elements. In an exemplary embodiment, the number of heating elements ranges from about 3 to 360. In an exemplary embodiment, the average center to center spacing of the heating elements ranges from about 1 to 5 inches. In an exemplary embodiment, the outside diameters of the heating elements are about 0.475 inches and the inside diameters of the corresponding passageways through the first and second baffle elements are about $1/16$ to about $1/4$ of an inch larger in diameter. In an exemplary embodiment, the inside diameters of the corresponding passageways through the first and second baffle elements are at least about $1/4$ of an inch larger in diameter to allow for easier assembly. In an exemplary embodiment, each of the first and second baffle elements comprise an outer peripheral arcuate portion that mates with the tubular housing and another outer peripheral portion that does not mate with the tubular housing. In an exemplary embodiment, the baffle assemblies and the inner tubular housing define a serpentine flow path for the passage of fluidic materials therethrough. In an exemplary embodiment, the angular spacing between the planes of the first and second baffle elements ranges from about 15 to 75 degrees. In an exemplary embodiment, the lateral spacing of the baffle assemblies within the passageway of the tubular housing ranges from intimate contact to about several times the internal diameter of the tubular housing. In an exemplary embodiment, the baffle assemblies are adapted to shear the flow of fluidic materials within the passageway of the tubular housing. In an exemplary embodiment, the baffle assemblies are adapted to cause the fluidic materials within the passageway of the tubular housing to flow over the heating elements at an angle to the heating elements. In an exemplary embodiment, the baffle assemblies are adapted to cause the fluidic materials within the passageway of the tubular housing to mix over the heating elements at an angle to the heating elements. In an exemplary embodiment, a heat transfer coefficient within the tubular housing ranges from about 12.3 to about 33 Btu/hr*f*° F. In an exemplary embodiment, an operating temperature of the heating elements ranges from about 757 to about 1147° F. In an exemplary embodiment, a heat transfer coefficient within the tubular housing ranges from about 12.3 to about 33 Btu/hr*f$^2$*° F.; and an operating temperature of the heating elements ranges from about 757 to about 1147° F.

A method for conditioning feed gas has been described that includes heating an inlet stream of gas within a passageway; and impeding the flow of the inlet stream of gas within the passageway using a plurality of baffle elements that are positioned in different planes. In an exemplary embodiment, heating the inlet stream of gas within the passageway comprises positioning a plurality of heating elements within the passageway. In an exemplary embodiment, impeding the flow of the inlet stream of gas within the passageway comprises constricting the flow of the inlet stream of gas proximate the heating elements within the passageway. In an exemplary embodiment, impeding the flow of the inlet stream of gas within the passageway comprises constricting the flow of the inlet stream of gas within the passageway. In an exemplary embodiment, impeding the flow of the inlet stream of gas within the passageway comprises creating a serpentine flow of the inlet stream of gas within the passageway. In an exemplary embodiment, impeding the flow of the inlet stream of gas within the passageway further comprises constricting the flow of the inlet stream of gas proximate the heating elements within the passageway. In an exemplary embodiment, the angular spacing between the planes of the baffle elements ranges from about 15 to 75 degrees. In an exemplary embodiment, the lateral spacing of the baffle elements within the passageway ranges from intimate contact to about several times the internal diameter of the passageway. In an exemplary embodiment, the method further includes shearing the flow of the inlet stream of gas within the passageway. In an exemplary embodiment, the method further includes flowing the inlet stream of gas within the passageway at an angle over one or more heating elements. In an exemplary embodiment, the method further includes mixing the inlet stream of gas within the passageway over one or more heating elements. In an exemplary embodiment, heating the inlet stream of gas within the passageway comprises providing one or more heating elements within the passageway; and impeding the flow of the inlet stream of gas within the passageway comprises causing the inlet stream of gas to flow in a direction transverse to the heating elements. In an exemplary embodiment, a heat transfer coefficient within the passageway ranges from about 12.3 to about 33 Btu/hr*ft*° F. In an exemplary embodiment, an operating temperature of the heating elements ranges from about 757 to about 1147° F. In an exemplary embodiment, a heat transfer coefficient within the passageway ranges from about 12.3 to about 33 Btu/hr*ft$^2$*° F.; and an operating temperature of the heating elements ranges from about 757 to about 1147° F.

A system for conditioning feed gas has been described that includes means for heating an inlet stream of gas within a passageway; and means for impeding the flow of the inlet stream of gas within the passageway using a plurality of baffle elements that are positioned in different planes. In an exemplary embodiment, means for heating the inlet stream of gas within the passageway comprises means for positioning a plurality of heating elements within the passageway. In an exemplary embodiment, means for impeding the flow of the inlet stream of gas within the passageway comprises means for constricting the flow of the inlet stream of gas proximate the heating elements within the passageway. In an exemplary embodiment, means for impeding the flow of the inlet stream of gas within the passageway comprises means for constricting the flow of the inlet stream of gas within the passageway. In an exemplary embodiment, means for impeding the flow of the inlet stream of gas within the passageway comprises means for creating a serpentine flow of the inlet stream of gas within the passageway. In an exemplary embodiment, means for impeding the flow of the inlet stream of gas within the passageway further comprises means for constricting the flow of the inlet stream of gas proximate the heating elements within the passageway. In an exemplary embodiment, the angular spacing between the planes of the baffle elements ranges from about 15 to 75 degrees. In an exemplary embodiment, the lateral spacing of the baffle elements within the passageway ranges from intimate contact to about several times the internal diameter of the passageway. In an exemplary embodiment, the system further includes means for shearing the flow of the inlet stream of gas within the passageway. In an exemplary embodiment, the system further includes means for flowing the inlet stream of gas within the passageway at an angle over one or more heating elements. In an exemplary embodiment, the system further includes means for mixing the inlet stream of gas within the passageway over one or more heating elements. In an exemplary embodiment, means for heating the inlet stream of gas within the passageway comprises providing one or more heating elements within the passageway; and wherein means for impeding the flow of the inlet stream of gas within the passageway comprises means for causing the inlet stream of gas to flow in a direction transverse to the heating elements. In an exemplary embodiment, a heat transfer coefficient within the passageway ranges from about 12.3 to about 33 Btu/hr*ft$^2$*° F. In an exemplary embodiment, an operating temperature of the heating elements ranges from about 757 to about 1147° F. In an exemplary embodiment, a heat transfer coefficient within the passageway ranges from about 12.3 to about 33 Btu/hr*fV*° F.; and an operating temperature of the heating elements ranges from about 757 to about 1147° F.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more aspects of the exemplary embodiments may be omitted or combined with one or more aspects of the other exemplary embodiments. Accordingly, the scope of protection is not limited to the embodiments described, but is only limited by the claims that follow, the scope of which shall include all equivalents of the subject matter of the claims.

The invention claimed is:

1. A method for heating fluidic materials, comprising:
   within a common vessel, heating liquid materials within a lower portion of the common vessel using first immersion heaters and heating gaseous materials within an upper portion of the common vessel using second immersion heaters.

2. The method of claim 1, further comprising:
   controlling a level of liquid materials within the lower portion of the common vessel.

3. The method of claim 1, wherein heating gaseous materials within the upper portion of the common vessel comprises:
   heating gaseous materials within the upper portion of the common vessel within another vessel positioned within the upper portion of the common vessel.

4. The method of claim 3, further comprising:
   coalescing liquids within the interior of the other vessel.

5. The method of claim 4, further comprising:
   exhausting coalesced liquids out of the interior of the other vessel and into a lower end portion of the common vessel.

6. The method of claim 3, further comprising:
   impeding the flow of materials within at least one of the common vessel and the other vessel using a plurality of baffle elements that are positioned in different planes.

7. The method of claim 6, wherein impeding the flow of materials within at least one of the common vessel and the other vessel using a plurality of baffle elements that are positioned in different planes comprises constricting the flow of the materials proximate the heaters within at least one of the common vessel and the other vessel.

8. The method of claim 6, wherein impeding the flow of the materials within at least one of the common vessel and the other vessel comprises creating a serpentine flow of the materials within at least one of the common vessel and the other vessel.

9. The method of claim 6, wherein the angular spacing between the planes of the baffle elements ranges from about 15 to 75 degrees.

10. The method of claim 6, wherein the lateral spacing of the baffle elements within at least one of the common vessel and the other vessel ranges from intimate contact to about several times the internal diameter of at least one of the common vessel and the other vessel.

11. The method of claim 6, further comprising:
    shearing the flow of the materials within at least one of the common vessel and the other vessel.

12. The method of claim 6, further comprising:
    flowing the materials within at least one of the common vessel and the other vessel at an angle over one or more heaters.

13. The method of claim 6, further comprising:
    mixing the materials within at least one of the common vessel and the other vessel over one or more heaters.

14. The method of claim 6, wherein impeding the flow of materials within at least one of the common vessel and the other vessel comprises causing the materials within at least one of the common vessel and the other vessel to flow in a direction transverse to the heaters.

15. The method of claim 6, wherein a heat transfer coefficient within at least one of the common vessel and the other vessel ranges from about 12.3 to about 33 Btu/hr*ft*° F.

16. The method of claim 6, wherein an operating temperature of the heaters ranges from about 757 to about 1147° F.

17. The method of claim 6, wherein a heat transfer coefficient within at least one of the common vessel and the other vessel ranges from about 12.3 to about 33 Btu/hr*f²° F.; and wherein an operating temperature of the heaters ranges from about 757 to about 1147° F.

18. A method of operating a distillation column assembly, comprising:
- within one or more common vessels, heating liquid materials within a lower portion of each of the common vessels using first immersion heaters and heating gaseous materials within an upper portion of one or more of the common vessels using second immersion heaters;
- condensing at least a portion of the gaseous materials; and
- reboiling at least a portion of the liquid materials.

* * * * *